(12) United States Patent
Kotwal et al.

(10) Patent No.: US 12,248,434 B2
(45) Date of Patent: Mar. 11, 2025

(54) FILE ANALYTICS SYSTEMS INCLUDING EXAMPLES PROVIDING METRICS ADJUSTED FOR APPLICATION OPERATION

(71) Applicant: NUTANIX, INC., San Jose, CA (US)

(72) Inventors: Ketan Kotwal, Maharashtra (IN); Pankaj Kumar Sinha, San Jose, CA (US); Sagar Gupta, Maharashtra (IN); Yugank Dubey, Maharashtra (IN)

(73) Assignee: Nutanix, Inc., San Jose, CA (US)

( * ) Notice: Subject to any disclaimer, the term of this patent is extended or adjusted under 35 U.S.C. 154(b) by 147 days.

(21) Appl. No.: 17/304,086

(22) Filed: Jun. 14, 2021

(65) Prior Publication Data

US 2022/0318203 A1 Oct. 6, 2022

(30) Foreign Application Priority Data

Mar. 31, 2021 (IN) .............................. 202111015328
Apr. 30, 2021 (IN) .............................. 202111019886

(51) Int. Cl.
*G06F 16/17* (2019.01)
*G06F 16/182* (2019.01)

(52) U.S. Cl.
CPC ........ *G06F 16/1734* (2019.01); *G06F 16/182* (2019.01)

(58) Field of Classification Search
CPC .. G06F 16/1734; G06F 16/182; G06F 16/188; G06F 16/168
USPC ....................................................... 707/827
See application file for complete search history.

(56) References Cited

U.S. PATENT DOCUMENTS

| | | |
|---|---|---|
| 5,276,867 A | 1/1994 | Kenley et al. |
| 5,615,363 A | 3/1997 | Jenness |
| 5,664,144 A | 9/1997 | Yanal et al. |
| 5,870,555 A | 2/1999 | Pruett et al. |
| 5,873,085 A | 2/1999 | Enoki et al. |
| 5,924,096 A | 7/1999 | Draper et al. |
| 6,055,543 A | 4/2000 | Christensen et al. |
| 6,085,234 A | 7/2000 | Pitts et al. |

(Continued)

FOREIGN PATENT DOCUMENTS

| | | |
|---|---|---|
| CN | 105100210 A | 11/2015 |
| CN | 108090118 A | 5/2018 |

(Continued)

OTHER PUBLICATIONS

US 11,048,595 B2, 06/2021, Venkatesh et al. (withdrawn)

(Continued)

*Primary Examiner* — Hicham Skhoun
(74) *Attorney, Agent, or Firm* — Stoel Rives LLP

(57) ABSTRACT

Examples of file analytics systems are described that may obtain event data from a virtualized file server. The event data may be aggregated and/or filtered to provide metrics which may be adjusted based on the operation of an application used to accomplish a user action. For example, actions relating to an application's temporary file handling may be aggregated and/or excluded when reporting metrics for the virtualized file server. To facilitate reporting of metrics, the file analytics system may provide a lineage index storing an association between files related through operation of the application used to accomplish the user action.

29 Claims, 10 Drawing Sheets

(56) References Cited

U.S. PATENT DOCUMENTS

| | | | |
|---|---|---|---|
| 6,101,508 A | 8/2000 | Wolff | |
| 6,212,531 B1 | 4/2001 | Blea et al. | |
| 6,289,356 B1 | 9/2001 | Hitz et al. | |
| 6,341,340 B1 | 1/2002 | Tsukerman et al. | |
| 6,442,602 B1 | 8/2002 | Choudhry | |
| 6,539,381 B1 | 3/2003 | Prasad et al. | |
| 6,539,382 B1 | 3/2003 | Byrne et al. | |
| 6,963,914 B1 | 11/2005 | Breitbart et al. | |
| 6,968,345 B1 | 11/2005 | Muhlestein | |
| 7,120,631 B1 | 10/2006 | Vahalia et al. | |
| 7,146,524 B2 | 12/2006 | Patel et al. | |
| 7,159,056 B2 | 1/2007 | Goldick | |
| 7,162,467 B2 | 1/2007 | Eshleman et al. | |
| 7,356,679 B1 | 4/2008 | Le et al. | |
| 7,366,738 B2 | 4/2008 | Yorke et al. | |
| 7,409,511 B2 | 8/2008 | Edwards et al. | |
| 7,506,213 B1 | 3/2009 | Cabrera et al. | |
| 7,548,939 B2 | 6/2009 | Kalach et al. | |
| 7,606,868 B1 | 10/2009 | Le et al. | |
| 7,702,843 B1 | 4/2010 | Chen et al. | |
| 7,725,671 B2 | 5/2010 | Prahlad et al. | |
| 7,739,316 B2 | 6/2010 | Thompson et al. | |
| 7,752,492 B1 | 7/2010 | Armangau et al. | |
| 7,752,669 B2 | 7/2010 | Palliyil et al. | |
| 7,774,391 B1 | 8/2010 | Le et al. | |
| 7,805,469 B1 | 9/2010 | Nagaralu et al. | |
| 7,805,511 B1 | 9/2010 | Panicker et al. | |
| 7,840,533 B2 | 11/2010 | Prahlad et al. | |
| 7,890,529 B1 | 2/2011 | Srinivasan et al. | |
| 7,937,453 B1 | 5/2011 | Hayden et al. | |
| 8,095,810 B2 | 1/2012 | Matsuzawa et al. | |
| 8,095,931 B1 | 1/2012 | Chen et al. | |
| 8,261,268 B1 | 9/2012 | Forgette | |
| 8,352,482 B2 | 1/2013 | Hansen | |
| 8,352,608 B1 | 1/2013 | Keagy et al. | |
| 8,365,167 B2 | 1/2013 | Beaty et al. | |
| 8,396,890 B2 | 3/2013 | Lim | |
| 8,407,448 B1 | 3/2013 | Hayden et al. | |
| 8,447,728 B2 | 5/2013 | Prahlad et al. | |
| 8,463,617 B2 | 6/2013 | Ranous et al. | |
| 8,473,462 B1 | 6/2013 | Banerjee | |
| 8,484,163 B1 | 7/2013 | Yucel et al. | |
| 8,484,356 B1 | 7/2013 | Douglis et al. | |
| 8,510,836 B1 * | 8/2013 | Nachenberg | G06F 21/565 726/25 |
| 8,539,076 B2 | 9/2013 | Nakano et al. | |
| 8,543,790 B2 | 9/2013 | Chen et al. | |
| 8,549,518 B1 | 10/2013 | Aron et al. | |
| 8,549,650 B2 | 10/2013 | Hanson | |
| 8,584,239 B2 | 11/2013 | Aziz et al. | |
| 8,601,473 B1 | 12/2013 | Aron et al. | |
| 8,635,351 B2 | 1/2014 | Astete et al. | |
| 8,676,958 B1 | 3/2014 | Hendon et al. | |
| 8,688,660 B1 | 4/2014 | Sivasubramanian et al. | |
| 8,706,692 B1 | 4/2014 | Luthra et al. | |
| 8,725,679 B2 | 5/2014 | Nair et al. | |
| 8,751,515 B1 | 6/2014 | Xing et al. | |
| 8,762,335 B2 | 6/2014 | Prahlad et al. | |
| 8,805,951 B1 | 8/2014 | Faibish et al. | |
| 8,825,848 B1 | 9/2014 | Dotan et al. | |
| 8,838,923 B2 | 9/2014 | Prahlad et al. | |
| 8,843,459 B1 | 9/2014 | Aston et al. | |
| 8,843,997 B1 | 9/2014 | Hare | |
| 8,850,130 B1 | 9/2014 | Aron et al. | |
| 8,863,124 B1 | 10/2014 | Aron | |
| 8,898,668 B1 | 11/2014 | Costea et al. | |
| 8,914,429 B2 | 12/2014 | Pitts | |
| 8,935,563 B1 | 1/2015 | Rajaa et al. | |
| 8,949,557 B2 | 2/2015 | Kamei et al. | |
| 8,966,188 B1 | 2/2015 | Bardale | |
| 8,972,637 B1 | 3/2015 | Hushon, Jr. et al. | |
| 8,983,952 B1 | 3/2015 | Zhang et al. | |
| 8,984,027 B1 | 3/2015 | Patwardhan et al. | |
| 8,996,783 B2 | 3/2015 | Huang et al. | |
| 9,009,106 B1 | 4/2015 | Aron et al. | |
| 9,043,567 B1 | 5/2015 | Modukuri et al. | |
| 9,069,708 B2 | 6/2015 | Gill et al. | |
| 9,152,628 B1 | 10/2015 | Stacey et al. | |
| 9,154,535 B1 | 10/2015 | Harris | |
| 9,201,698 B2 | 12/2015 | Ashok et al. | |
| 9,201,704 B2 | 12/2015 | Chang et al. | |
| 9,201,887 B1 | 12/2015 | Earl et al. | |
| 9,213,513 B2 | 12/2015 | Hartz et al. | |
| 9,244,674 B2 | 1/2016 | Waterman et al. | |
| 9,244,969 B1 | 1/2016 | Love et al. | |
| 9,256,475 B1 | 2/2016 | Aron et al. | |
| 9,256,812 B2 | 2/2016 | Bhatt et al. | |
| 9,268,586 B2 | 2/2016 | Voccio et al. | |
| 9,274,817 B1 | 3/2016 | Fan et al. | |
| 9,286,298 B1 | 3/2016 | Gillett, Jr. | |
| 9,292,327 B1 | 3/2016 | Von Thenen et al. | |
| 9,311,327 B1 | 4/2016 | Xing | |
| 9,336,132 B1 | 5/2016 | Aron et al. | |
| 9,348,702 B2 | 5/2016 | Hsu et al. | |
| 9,372,710 B2 | 6/2016 | Kenchammana-hosekote et al. | |
| 9,405,566 B2 | 8/2016 | Chawla et al. | |
| 9,411,628 B2 | 8/2016 | Bezbaruah et al. | |
| 9,430,255 B1 | 8/2016 | Beda, III et al. | |
| 9,442,952 B2 | 9/2016 | Preslan et al. | |
| 9,448,887 B1 | 9/2016 | Ben Dayan et al. | |
| 9,456,049 B2 | 9/2016 | Soundararajan et al. | |
| 9,497,257 B1 | 11/2016 | Love et al. | |
| 9,503,542 B1 | 11/2016 | Wang et al. | |
| 9,513,946 B2 | 12/2016 | Sevigny et al. | |
| 9,535,907 B1 | 1/2017 | Stringham | |
| 9,563,555 B2 | 2/2017 | Flynn et al. | |
| 9,571,561 B2 | 2/2017 | Jang | |
| 9,588,977 B1 | 3/2017 | Wang et al. | |
| 9,619,257 B1 | 4/2017 | Aron et al. | |
| 9,639,428 B1 | 5/2017 | Boda et al. | |
| 9,652,265 B1 | 5/2017 | Narayanasamy et al. | |
| 9,658,899 B2 | 5/2017 | Jenkins | |
| 9,690,670 B1 | 6/2017 | Paulzagade et al. | |
| 9,733,958 B2 | 8/2017 | Cui et al. | |
| 9,740,436 B2 | 8/2017 | Fiebrich-kandler et al. | |
| 9,740,472 B1 | 8/2017 | Sohi et al. | |
| 9,740,723 B2 | 8/2017 | Prahlad et al. | |
| 9,747,287 B1 | 8/2017 | Bhardwaj et al. | |
| 9,762,460 B2 | 9/2017 | Pawlowski et al. | |
| 9,766,912 B1 | 9/2017 | Jorgensen | |
| 9,772,866 B1 | 9/2017 | Aron et al. | |
| 9,798,573 B1 | 10/2017 | Koshy | |
| 9,838,415 B2 | 12/2017 | Powers et al. | |
| 9,846,701 B2 | 12/2017 | Faitelson et al. | |
| 9,846,706 B1 | 12/2017 | Basov et al. | |
| 9,853,978 B2 | 12/2017 | Tellvik et al. | |
| 9,870,291 B2 | 1/2018 | Bezbaruah et al. | |
| 9,870,370 B2 | 1/2018 | Faitelson et al. | |
| 9,904,724 B1 | 2/2018 | Chaulk et al. | |
| 9,940,154 B2 | 4/2018 | Ramani et al. | |
| 9,946,573 B2 | 4/2018 | Mcdermott | |
| 10,009,215 B1 | 6/2018 | Shorey | |
| 10,050,862 B2 | 8/2018 | Nambiar et al. | |
| 10,083,022 B2 | 9/2018 | Fukui et al. | |
| 10,084,873 B2 | 9/2018 | Dornemann | |
| 10,095,506 B2 | 10/2018 | Gopalapura Venkatesh et al. | |
| 10,101,989 B2 | 10/2018 | Sinha et al. | |
| 10,114,706 B1 | 10/2018 | Chougala et al. | |
| 10,127,059 B2 | 11/2018 | Astete et al. | |
| 10,133,619 B1 | 11/2018 | Nagpal et al. | |
| 10,140,115 B2 | 11/2018 | Fukui et al. | |
| 10,152,233 B2 | 12/2018 | Xu et al. | |
| 10,152,606 B2 | 12/2018 | Faitelson et al. | |
| 10,210,048 B2 | 2/2019 | Sancheti | |
| 10,248,657 B2 | 4/2019 | Prahlad et al. | |
| 10,311,153 B2 | 6/2019 | Mason, Jr. et al. | |
| 10,318,743 B2 | 6/2019 | Sinha et al. | |
| 10,394,547 B2 | 8/2019 | Fukui et al. | |
| 10,419,426 B2 | 9/2019 | Bakshan et al. | |
| 10,452,853 B2 | 10/2019 | Grafi | |
| 10,516,688 B2 | 12/2019 | Tamir et al. | |
| 10,521,116 B2 | 12/2019 | Parthasarathy | |
| 10,523,592 B2 | 12/2019 | Byers et al. | |
| 10,530,742 B2 | 1/2020 | Shah et al. | |

(56) References Cited

U.S. PATENT DOCUMENTS

| | | |
|---|---|---|
| 10,536,482 B2 | 1/2020 | Gabaev et al. |
| 10,540,164 B2 | 1/2020 | Bafna et al. |
| 10,540,165 B2 | 1/2020 | Bafna et al. |
| 10,540,166 B2 | 1/2020 | Arikatla et al. |
| RE47,896 E | 3/2020 | Liberman Ben-ami et al. |
| 10,594,582 B2 | 3/2020 | Joshi et al. |
| 10,594,730 B1 | 3/2020 | Summers et al. |
| 10,628,587 B2 | 4/2020 | Stepanek et al. |
| 10,635,558 B2 | 4/2020 | Wu et al. |
| 10,719,305 B2 | 7/2020 | Sinha et al. |
| 10,719,306 B2 | 7/2020 | Deshmukh et al. |
| 10,719,307 B2 | 7/2020 | Kanada et al. |
| 10,728,090 B2 | 7/2020 | Deshmukh et al. |
| 10,762,060 B1 | 9/2020 | Faulkner et al. |
| 10,809,998 B2 | 10/2020 | Gopalapura Venkatesh et al. |
| 10,817,203 B1 | 10/2020 | Anand et al. |
| 10,824,455 B2 | 11/2020 | Arikatla et al. |
| 10,831,465 B2 | 11/2020 | Sharpe et al. |
| 10,838,708 B2 | 11/2020 | Sinha et al. |
| 10,853,486 B2 | 12/2020 | Faitelson |
| 10,855,631 B2 | 12/2020 | Faitelson et al. |
| 10,949,192 B2 | 3/2021 | Gopalapura Venkatesh et al. |
| 10,949,385 B2 | 3/2021 | Cronan |
| 11,036,690 B2 * | 6/2021 | Bhagwat ............. G06F 16/1827 |
| 11,057,422 B2 | 7/2021 | Ranum et al. |
| 11,086,826 B2 | 8/2021 | Thummala et al. |
| 11,106,447 B2 | 8/2021 | Gupta et al. |
| 11,275,755 B2 * | 3/2022 | Palus ................. G06F 16/2282 |
| 11,334,533 B2 | 5/2022 | Kumar et al. |
| 11,341,236 B2 | 5/2022 | Miller et al. |
| 11,347,843 B2 | 5/2022 | Suwad et al. |
| 11,360,860 B2 | 6/2022 | Khandkar et al. |
| 11,455,290 B1 | 9/2022 | Brahmadesam et al. |
| 11,537,713 B2 | 12/2022 | Rajasekharan et al. |
| 11,632,394 B1 | 4/2023 | Rodriguez et al. |
| 11,698,965 B2 | 7/2023 | Constantinescu et al. |
| 11,755,736 B1 | 9/2023 | Vasudeva et al. |
| 12,182,364 B2 | 12/2024 | Parker et al. |
| 2002/0069196 A1 | 6/2002 | Betros et al. |
| 2002/0120763 A1 | 8/2002 | Miloushev et al. |
| 2003/0014442 A1 | 1/2003 | Shiigi et al. |
| 2003/0115218 A1 | 6/2003 | Bobbitt et al. |
| 2003/0163597 A1 | 8/2003 | Hellman et al. |
| 2003/0182301 A1 | 9/2003 | Patterson et al. |
| 2003/0195942 A1 | 10/2003 | Muhlestein et al. |
| 2004/0030822 A1 | 2/2004 | Rajan et al. |
| 2004/0054777 A1 | 3/2004 | Ackaouy et al. |
| 2004/0078440 A1 | 4/2004 | Potter et al. |
| 2004/0103104 A1 | 5/2004 | Hara et al. |
| 2004/0181425 A1 | 9/2004 | Schwerin-wenzel et al. |
| 2004/0199734 A1 | 10/2004 | Rajamani et al. |
| 2004/0210591 A1 | 10/2004 | Hirschfeld et al. |
| 2004/0225742 A1 | 11/2004 | Loaiza et al. |
| 2004/0267832 A1 | 12/2004 | Wong et al. |
| 2005/0044197 A1 | 2/2005 | Lai |
| 2005/0120160 A1 | 6/2005 | Plouffe et al. |
| 2005/0120180 A1 | 6/2005 | Schombach et al. |
| 2005/0125503 A1 | 6/2005 | Iyengar et al. |
| 2005/0172078 A1 | 8/2005 | Wu et al. |
| 2005/0193043 A1 | 9/2005 | Hoover |
| 2005/0193221 A1 | 9/2005 | Yoneyama |
| 2005/0193245 A1 | 9/2005 | Hayden et al. |
| 2005/0226059 A1 | 10/2005 | Kavuri et al. |
| 2005/0228798 A1 | 10/2005 | Shepard et al. |
| 2005/0267941 A1 | 12/2005 | Addante et al. |
| 2006/0010227 A1 | 1/2006 | Atluri |
| 2006/0047685 A1 | 3/2006 | Dearing et al. |
| 2006/0053139 A1 | 3/2006 | Marzinski et al. |
| 2006/0080445 A1 | 4/2006 | Chang et al. |
| 2006/0167921 A1 | 7/2006 | Grebus et al. |
| 2006/0206536 A1 | 9/2006 | Sawdon et al. |
| 2006/0206901 A1 | 9/2006 | Chan |
| 2006/0224918 A1 | 10/2006 | Koike |
| 2006/0225065 A1 | 10/2006 | Chandhok et al. |
| 2006/0235850 A1 | 10/2006 | Hazelwood et al. |
| 2006/0271510 A1 | 11/2006 | Harward et al. |
| 2006/0271931 A1 | 11/2006 | Harris et al. |
| 2007/0022129 A1 | 1/2007 | Bahar et al. |
| 2007/0038913 A1 | 2/2007 | Allen et al. |
| 2007/0088669 A1 | 4/2007 | Jaschek et al. |
| 2007/0100905 A1 * | 5/2007 | Masters ................ G06F 21/568 |
| 2007/0171921 A1 | 7/2007 | Wookey et al. |
| 2007/0179995 A1 | 8/2007 | Prahlad et al. |
| 2007/0180302 A1 | 8/2007 | Allen et al. |
| 2007/0185934 A1 | 8/2007 | Cannon et al. |
| 2007/0198550 A1 | 8/2007 | Irving et al. |
| 2007/0244899 A1 | 10/2007 | Faitelson et al. |
| 2007/0250930 A1 | 10/2007 | Aziz et al. |
| 2007/0300220 A1 | 12/2007 | Seliger et al. |
| 2008/0040388 A1 * | 2/2008 | Petri .................... G06F 16/907 |
| 2008/0040483 A1 | 2/2008 | Nakatani et al. |
| 2008/0071997 A1 | 3/2008 | Loaiza et al. |
| 2008/0098194 A1 | 4/2008 | Hashimoto et al. |
| 2008/0104349 A1 | 5/2008 | Maruyama et al. |
| 2008/0104589 A1 | 5/2008 | Mocrory et al. |
| 2008/0133486 A1 | 6/2008 | Fitzgerald et al. |
| 2008/0134178 A1 | 6/2008 | Fitzgerald et al. |
| 2008/0189468 A1 | 8/2008 | Schmidt et al. |
| 2008/0201414 A1 | 8/2008 | Amir et al. |
| 2008/0201457 A1 | 8/2008 | London |
| 2008/0208909 A1 | 8/2008 | Rowley |
| 2008/0244222 A1 | 10/2008 | Supalov et al. |
| 2008/0256138 A1 | 10/2008 | Sim-tang |
| 2008/0270677 A1 | 10/2008 | Kolakowski |
| 2008/0282350 A1 | 11/2008 | Khilnani et al. |
| 2008/0320499 A1 | 12/2008 | Suit |
| 2008/0320583 A1 | 12/2008 | Sharma et al. |
| 2009/0006801 A1 | 1/2009 | Shultz et al. |
| 2009/0037430 A1 | 2/2009 | Mukkamala et al. |
| 2009/0100248 A1 | 4/2009 | Kami |
| 2009/0158082 A1 | 6/2009 | Jain et al. |
| 2009/0171971 A1 | 7/2009 | Goddard et al. |
| 2009/0193272 A1 | 7/2009 | Matsuzawa et al. |
| 2009/0216975 A1 | 8/2009 | Halperin et al. |
| 2009/0228889 A1 | 9/2009 | Yoshida |
| 2009/0248870 A1 | 10/2009 | Kamei et al. |
| 2009/0249470 A1 | 10/2009 | Litvin et al. |
| 2009/0254572 A1 | 10/2009 | Redlich et al. |
| 2009/0265780 A1 | 10/2009 | Korkus et al. |
| 2009/0271412 A1 | 10/2009 | Lacapra et al. |
| 2009/0287887 A1 | 11/2009 | Matsuki et al. |
| 2009/0288084 A1 | 11/2009 | Astete et al. |
| 2010/0023521 A1 | 1/2010 | Arcese et al. |
| 2010/0027552 A1 | 2/2010 | Hill |
| 2010/0030825 A1 | 2/2010 | Matsuzawa et al. |
| 2010/0070725 A1 | 3/2010 | Prahlad et al. |
| 2010/0082716 A1 | 4/2010 | Agetsuma et al. |
| 2010/0082774 A1 | 4/2010 | Pitts |
| 2010/0095289 A1 | 4/2010 | Nguyen et al. |
| 2010/0138921 A1 | 6/2010 | Na et al. |
| 2010/0161657 A1 | 6/2010 | Cha et al. |
| 2010/0162268 A1 | 6/2010 | Thomas et al. |
| 2010/0169392 A1 | 7/2010 | Lev et al. |
| 2010/0174745 A1 | 7/2010 | Ryan et al. |
| 2010/0214908 A1 | 8/2010 | Ralev |
| 2010/0241785 A1 | 9/2010 | Chen et al. |
| 2010/0250824 A1 | 9/2010 | Belay |
| 2010/0275205 A1 | 10/2010 | Nakajima |
| 2011/0010560 A1 | 1/2011 | Etchegoyen |
| 2011/0022694 A1 | 1/2011 | Dalal et al. |
| 2011/0022695 A1 | 1/2011 | Dalal et al. |
| 2011/0022812 A1 | 1/2011 | Van Der L. et al. |
| 2011/0022883 A1 | 1/2011 | Hansen |
| 2011/0047340 A1 | 2/2011 | Olson et al. |
| 2011/0078318 A1 | 3/2011 | Desai et al. |
| 2011/0119763 A1 | 5/2011 | Wade et al. |
| 2011/0125835 A1 | 5/2011 | Soltis |
| 2011/0137879 A1 | 6/2011 | Dubey et al. |
| 2011/0161299 A1 | 6/2011 | Prahlad et al. |
| 2011/0178831 A1 | 7/2011 | Ravichandran |
| 2011/0179414 A1 | 7/2011 | Goggin et al. |
| 2011/0184993 A1 | 7/2011 | Chawla et al. |
| 2011/0185292 A1 | 7/2011 | Chawla et al. |
| 2011/0196899 A1 | 8/2011 | Hughes et al. |

(56) References Cited

U.S. PATENT DOCUMENTS

| | | |
|---|---|---|
| 2011/0225574 A1 | 9/2011 | Khalidi et al. |
| 2011/0239213 A1 | 9/2011 | Aswani et al. |
| 2011/0251992 A1 | 10/2011 | Bethlehem et al. |
| 2011/0252208 A1 | 10/2011 | Ali et al. |
| 2011/0255538 A1 | 10/2011 | Srinivasan et al. |
| 2011/0265076 A1 | 10/2011 | Thorat et al. |
| 2011/0271279 A1 | 11/2011 | Pate |
| 2011/0276578 A1 | 11/2011 | Allalouf et al. |
| 2011/0276963 A1 | 11/2011 | Wu et al. |
| 2011/0283277 A1 | 11/2011 | Castillo et al. |
| 2011/0289561 A1 | 11/2011 | Ivanov et al. |
| 2011/0295806 A1 | 12/2011 | Erofeev |
| 2011/0307729 A1 | 12/2011 | Matsuzawa et al. |
| 2011/0320690 A1 | 12/2011 | Petersen et al. |
| 2012/0005440 A1 | 1/2012 | Nakao et al. |
| 2012/0011401 A1 | 1/2012 | Ranganathan et al. |
| 2012/0017114 A1 | 1/2012 | Timashev et al. |
| 2012/0023495 A1 | 1/2012 | Machida |
| 2012/0030456 A1 | 2/2012 | Wu et al. |
| 2012/0054546 A1 | 3/2012 | Kampouris et al. |
| 2012/0054736 A1 | 3/2012 | Arcese et al. |
| 2012/0081395 A1 | 4/2012 | Adi et al. |
| 2012/0084381 A1 | 4/2012 | Alladi et al. |
| 2012/0151484 A1 | 6/2012 | Frank et al. |
| 2012/0166866 A1 | 6/2012 | Rao et al. |
| 2012/0233463 A1 | 9/2012 | Holt et al. |
| 2012/0254445 A1 | 10/2012 | Kawamoto et al. |
| 2012/0254567 A1 | 10/2012 | Umbehocker |
| 2012/0266162 A1 | 10/2012 | Baron |
| 2012/0272237 A1 | 10/2012 | Baron |
| 2012/0278473 A1 | 11/2012 | Griffiths |
| 2012/0290630 A1 | 11/2012 | Aizman et al. |
| 2012/0304247 A1 | 11/2012 | Badger et al. |
| 2012/0310881 A1 | 12/2012 | Shadmon |
| 2012/0310892 A1 | 12/2012 | Dam et al. |
| 2012/0324183 A1 | 12/2012 | Chiruvolu et al. |
| 2013/0006938 A1 | 1/2013 | Prahlad et al. |
| 2013/0046740 A1 | 2/2013 | Li et al. |
| 2013/0047160 A1 | 2/2013 | Conover |
| 2013/0055018 A1 | 2/2013 | Joshi et al. |
| 2013/0061110 A1 | 3/2013 | Zvibel |
| 2013/0061167 A1 | 3/2013 | Rhodes et al. |
| 2013/0066930 A1 | 3/2013 | Kamei et al. |
| 2013/0117744 A1 | 5/2013 | Klein et al. |
| 2013/0132674 A1 | 5/2013 | Sundrani |
| 2013/0145222 A1 | 6/2013 | Birdsall |
| 2013/0151888 A1 | 6/2013 | Bhattiprolu et al. |
| 2013/0152085 A1 | 6/2013 | D Amore et al. |
| 2013/0185716 A1 | 7/2013 | Yin et al. |
| 2013/0198738 A1 | 8/2013 | Reddin et al. |
| 2013/0212345 A1 | 8/2013 | Nakajima |
| 2013/0227379 A1 | 8/2013 | Gupta et al. |
| 2013/0227552 A1 | 8/2013 | Reddin et al. |
| 2013/0227566 A1 | 8/2013 | Higuchi et al. |
| 2013/0232491 A1 | 9/2013 | Radhakrishnan et al. |
| 2013/0246335 A1 | 9/2013 | Ahuja et al. |
| 2013/0246705 A1 | 9/2013 | Diare |
| 2013/0247036 A1 | 9/2013 | Fujiwara |
| 2013/0262396 A1 | 10/2013 | Kripalani et al. |
| 2013/0283267 A1 | 10/2013 | Cooper et al. |
| 2013/0297869 A1 | 11/2013 | Mills et al. |
| 2014/0006708 A1 | 1/2014 | Huynh et al. |
| 2014/0025796 A1 | 1/2014 | Vibhor et al. |
| 2014/0059392 A1 | 2/2014 | Ren et al. |
| 2014/0089354 A1 | 3/2014 | Gonsalves et al. |
| 2014/0095544 A1 | 4/2014 | Eshel et al. |
| 2014/0095555 A1 | 4/2014 | Kim et al. |
| 2014/0095816 A1 | 4/2014 | Hsu et al. |
| 2014/0115182 A1 | 4/2014 | Sabaa et al. |
| 2014/0123138 A1 | 5/2014 | Lee et al. |
| 2014/0146055 A1 | 5/2014 | Bala et al. |
| 2014/0149794 A1 | 5/2014 | Shetty et al. |
| 2014/0149983 A1 | 5/2014 | Bonilla et al. |
| 2014/0173199 A1 | 6/2014 | Gupta et al. |
| 2014/0181116 A1 | 6/2014 | Wang |
| 2014/0188808 A1 | 7/2014 | Wolf et al. |
| 2014/0189429 A1 | 7/2014 | Gill et al. |
| 2014/0189677 A1 | 7/2014 | Curzi et al. |
| 2014/0189685 A1 | 7/2014 | Kripalani |
| 2014/0189686 A1 | 7/2014 | Masters et al. |
| 2014/0196038 A1 | 7/2014 | Kottomtharayil et al. |
| 2014/0201177 A1 | 7/2014 | Suryanarayan et al. |
| 2014/0201725 A1 | 7/2014 | Tian et al. |
| 2014/0207824 A1 | 7/2014 | Brandwine et al. |
| 2014/0230024 A1 | 8/2014 | Uehara et al. |
| 2014/0237464 A1 | 8/2014 | Waterman et al. |
| 2014/0250300 A1 | 9/2014 | Runkis et al. |
| 2014/0279909 A1 | 9/2014 | Sudarsanam et al. |
| 2014/0310710 A1 | 10/2014 | Lubsey et al. |
| 2014/0337576 A1 | 11/2014 | Burton et al. |
| 2014/0359612 A1 | 12/2014 | D'Amato et al. |
| 2014/0372717 A1 | 12/2014 | Ciu et al. |
| 2015/0006788 A1 | 1/2015 | Liu et al. |
| 2015/0007172 A1 | 1/2015 | Hudzia et al. |
| 2015/0007180 A1 | 1/2015 | Sharp et al. |
| 2015/0026682 A1 | 1/2015 | Singh et al. |
| 2015/0032690 A1 | 1/2015 | Hoque et al. |
| 2015/0039735 A1 | 2/2015 | Zeyliger et al. |
| 2015/0039837 A1 | 2/2015 | Quan et al. |
| 2015/0081644 A1 | 3/2015 | Pitts |
| 2015/0082432 A1 | 3/2015 | Eaton et al. |
| 2015/0095788 A1 | 4/2015 | Thiele et al. |
| 2015/0106802 A1 | 4/2015 | Ivanov et al. |
| 2015/0124622 A1 | 5/2015 | Kovvali et al. |
| 2015/0142745 A1 | 5/2015 | Tekade et al. |
| 2015/0142747 A1 | 5/2015 | Zou |
| 2015/0178019 A1 | 6/2015 | Hegdal et al. |
| 2015/0205639 A1 | 7/2015 | Matsumoto et al. |
| 2015/0207815 A1 | 7/2015 | Cai et al. |
| 2015/0213032 A1 | 7/2015 | Powell et al. |
| 2015/0220324 A1 | 8/2015 | Arcese et al. |
| 2015/0229656 A1 | 8/2015 | Shieh |
| 2015/0242291 A1 | 8/2015 | Chang et al. |
| 2015/0278046 A1 | 10/2015 | Zellermayer et al. |
| 2015/0293830 A1 | 10/2015 | Bhide et al. |
| 2015/0293896 A1 | 10/2015 | Runkis et al. |
| 2015/0301903 A1 | 10/2015 | Mutha et al. |
| 2015/0032653 A1 | 11/2015 | Cui et al. |
| 2015/0324217 A1 | 11/2015 | Shilmover et al. |
| 2015/0331757 A1 | 11/2015 | Durge et al. |
| 2015/0347440 A1 | 12/2015 | Habouzit et al. |
| 2015/0347542 A1 | 12/2015 | Sullivan et al. |
| 2015/0378761 A1 | 12/2015 | Sevigny et al. |
| 2016/0055065 A1 | 2/2016 | Haustein et al. |
| 2016/0063272 A1 | 3/2016 | Sharma et al. |
| 2016/0070492 A1 | 3/2016 | Cherubini et al. |
| 2016/0077988 A1 | 3/2016 | Tipton et al. |
| 2016/0078068 A1 | 3/2016 | Agrawal et al. |
| 2016/0085480 A1 | 3/2016 | Chiu et al. |
| 2016/0085574 A1 | 3/2016 | Dornemann et al. |
| 2016/0087861 A1 | 3/2016 | Kuan et al. |
| 2016/0110214 A1 | 4/2016 | Vincent et al. |
| 2016/0110267 A1 | 4/2016 | Earl et al. |
| 2016/0124665 A1 | 5/2016 | Jain et al. |
| 2016/0162371 A1 | 6/2016 | Prabhu et al. |
| 2016/0171241 A1 | 6/2016 | Yun |
| 2016/0179416 A1 | 6/2016 | Mutha et al. |
| 2016/0179419 A1 | 6/2016 | Yamaguchi et al. |
| 2016/0188232 A1 | 6/2016 | Ramachandran et al. |
| 2016/0188407 A1 | 6/2016 | Bronnikov et al. |
| 2016/0202916 A1 | 7/2016 | Cui et al. |
| 2016/0210204 A1 | 7/2016 | Clark et al. |
| 2016/0216993 A1 | 7/2016 | Beckwith et al. |
| 2016/0224363 A1 | 8/2016 | Joy |
| 2016/0301766 A1 | 10/2016 | Ionescu et al. |
| 2016/0321291 A1 | 11/2016 | Malhotra et al. |
| 2016/0328226 A1 | 11/2016 | Arya et al. |
| 2016/0335134 A1 | 11/2016 | Gupta et al. |
| 2016/0357611 A1 | 12/2016 | Sapuram et al. |
| 2016/0359697 A1 | 12/2016 | Scheib et al. |
| 2016/0359887 A1 | 12/2016 | Yadav et al. |
| 2016/0378528 A1 | 12/2016 | Zamir |
| 2016/0378616 A1 | 12/2016 | Wigmore et al. |
| 2017/0004131 A1 | 1/2017 | Ben Dayan et al. |

(56) References Cited

U.S. PATENT DOCUMENTS

| | | |
|---|---|---|
| 2017/0005990 A1 | 1/2017 | Birger et al. |
| 2017/0012904 A1 | 1/2017 | Matzek et al. |
| 2017/0019457 A1 | 1/2017 | Latha R et al. |
| 2017/0024152 A1 | 1/2017 | Bhagi et al. |
| 2017/0024224 A1 | 1/2017 | Bakke et al. |
| 2017/0034189 A1 | 2/2017 | Powell |
| 2017/0039078 A1 | 2/2017 | Chen et al. |
| 2017/0039218 A1 | 2/2017 | Prahlad et al. |
| 2017/0048223 A1 | 2/2017 | Anantha Padmanaban et al. |
| 2017/0063907 A1 | 3/2017 | Muddu et al. |
| 2017/0068469 A1 | 3/2017 | Shankar et al. |
| 2017/0075921 A1 | 3/2017 | Benton et al. |
| 2017/0090776 A1 | 3/2017 | Kowles |
| 2017/0091047 A1 | 3/2017 | Bangalore et al. |
| 2017/0109184 A1 | 4/2017 | Ramani et al. |
| 2017/0115909 A1 | 4/2017 | Wade et al. |
| 2017/0116050 A1 | 4/2017 | Thukkaram et al. |
| 2017/0116210 A1 | 4/2017 | Park et al. |
| 2017/0142134 A1 | 5/2017 | Gilbert |
| 2017/0147446 A1 | 5/2017 | Zhang et al. |
| 2017/0160983 A1 | 6/2017 | Fiske et al. |
| 2017/0177638 A1 | 6/2017 | Bhosale et al. |
| 2017/0206074 A1 | 7/2017 | Arcese et al. |
| 2017/0206207 A1 | 7/2017 | Bondurant et al. |
| 2017/0208113 A1 | 7/2017 | Douros et al. |
| 2017/0220661 A1 | 8/2017 | Cao et al. |
| 2017/0228300 A1 | 8/2017 | Thomas et al. |
| 2017/0235507 A1 | 8/2017 | Sinha et al. |
| 2017/0235562 A1 | 8/2017 | Bafna et al. |
| 2017/0235563 A1 | 8/2017 | Bafna et al. |
| 2017/0235589 A1* | 8/2017 | Gopalapura Venkatesh ................ G06F 3/0683 718/1 |
| 2017/0235590 A1 | 8/2017 | Sinha et al. |
| 2017/0235591 A1 | 8/2017 | Kanada et al. |
| 2017/0235653 A1 | 8/2017 | Arikatla et al. |
| 2017/0235654 A1 | 8/2017 | Deshmukh et al. |
| 2017/0235751 A1 | 8/2017 | Gupta et al. |
| 2017/0235758 A1 | 8/2017 | Gopalapura Venkatesh et al. |
| 2017/0235760 A1 | 8/2017 | Sharpe et al. |
| 2017/0235761 A1 | 8/2017 | Bafna et al. |
| 2017/0235762 A1 | 8/2017 | Sharpe et al. |
| 2017/0235763 A1 | 8/2017 | Gopalapura Venkatesh et al. |
| 2017/0235764 A1 | 8/2017 | Sharpe et al. |
| 2017/0235950 A1 | 8/2017 | Gopalapura Venkatesh et al. |
| 2017/0237529 A1 | 8/2017 | Eriksson et al. |
| 2017/0242599 A1 | 8/2017 | Patnaik et al. |
| 2017/0262346 A1 | 9/2017 | Pradhan et al. |
| 2017/0277556 A1 | 9/2017 | Ishii et al. |
| 2017/0277903 A1 | 9/2017 | Christodorescu et al. |
| 2017/0279674 A1 | 9/2017 | Zhu |
| 2017/0286228 A1 | 10/2017 | Redko et al. |
| 2017/0286442 A1 | 10/2017 | Xie et al. |
| 2017/0302589 A1 | 10/2017 | Leafe et al. |
| 2017/0371724 A1 | 12/2017 | Wagner et al. |
| 2018/0004509 A1 | 1/2018 | Narasimhan et al. |
| 2018/0004656 A1 | 1/2018 | Battaje et al. |
| 2018/0004766 A1 | 1/2018 | Darling |
| 2018/0039649 A1 | 2/2018 | Fine et al. |
| 2018/0062993 A1 | 3/2018 | Wu et al. |
| 2018/0089224 A1 | 3/2018 | Muthuswamy et al. |
| 2018/0089226 A1 | 3/2018 | Ben Dayan et al. |
| 2018/0107674 A1 | 4/2018 | Cantwell et al. |
| 2018/0121035 A1 | 5/2018 | Filippi et al. |
| 2018/0129426 A1 | 5/2018 | Aron et al. |
| 2018/0137014 A1 | 5/2018 | Li et al. |
| 2018/0143845 A1 | 5/2018 | Chawla et al. |
| 2018/0145960 A1 | 5/2018 | Bakshan et al. |
| 2018/0157521 A1 | 6/2018 | Arikatla et al. |
| 2018/0157522 A1 | 6/2018 | Bafna et al. |
| 2018/0157561 A1 | 6/2018 | Venkatesh et al. |
| 2018/0157677 A1 | 6/2018 | Bafna et al. |
| 2018/0157752 A1 | 6/2018 | Arikatla et al. |
| 2018/0157860 A1 | 6/2018 | Nair et al. |
| 2018/0159729 A1 | 6/2018 | Deshmukh et al. |
| 2018/0159826 A1 | 6/2018 | Msan et al. |
| 2018/0173731 A1 | 6/2018 | Nazari et al. |
| 2018/0205787 A1 | 7/2018 | Ben Dayan et al. |
| 2018/0253192 A1 | 9/2018 | Varadharajan et al. |
| 2018/0276390 A1 | 9/2018 | Grafi |
| 2018/0278602 A1 | 9/2018 | Koushik et al. |
| 2018/0287902 A1 | 10/2018 | Chitalia et al. |
| 2018/0330108 A1* | 11/2018 | Gordon ............... G06F 21/6218 |
| 2018/0332105 A1 | 11/2018 | Huang et al. |
| 2018/0349703 A1 | 12/2018 | Rathod |
| 2018/0357251 A1 | 12/2018 | Kumarasamy et al. |
| 2018/0367557 A1 | 12/2018 | Brown et al. |
| 2018/0373762 A1 | 12/2018 | Faitelson et al. |
| 2019/0026101 A1 | 1/2019 | Gopalapura Venkatesh et al. |
| 2019/0034240 A1 | 1/2019 | Nabi et al. |
| 2019/0073265 A1 | 3/2019 | Brennan et al. |
| 2019/0079747 A1 | 3/2019 | Sinha et al. |
| 2019/0108340 A1 | 4/2019 | Bedhapudi et al. |
| 2019/0129808 A1 | 5/2019 | Acharya et al. |
| 2019/0171527 A1 | 6/2019 | Mutalik et al. |
| 2019/0179711 A1 | 6/2019 | Luo et al. |
| 2019/0182294 A1 | 6/2019 | Rieke et al. |
| 2019/0196718 A1 | 6/2019 | Pai et al. |
| 2019/0207925 A1 | 7/2019 | Anantha Padmanaban et al. |
| 2019/0332683 A1 | 10/2019 | Thummala et al. |
| 2019/0347418 A1 | 11/2019 | Strogov et al. |
| 2019/0354513 A1 | 11/2019 | Kumar et al. |
| 2019/0370227 A1 | 12/2019 | Gupta et al. |
| 2019/0392053 A1 | 12/2019 | Chalakov et al. |
| 2020/0007530 A1 | 1/2020 | Mohamad Abdul et al. |
| 2020/0026612 A1 | 1/2020 | Ben Dayan et al. |
| 2020/0034069 A1 | 1/2020 | Batra et al. |
| 2020/0036647 A1 | 1/2020 | Gupta et al. |
| 2020/0081704 A1 | 3/2020 | Bafna et al. |
| 2020/0081733 A1 | 3/2020 | Buck et al. |
| 2020/0125580 A1 | 4/2020 | Shao |
| 2020/0137157 A1 | 4/2020 | Joseph et al. |
| 2020/0174975 A1 | 6/2020 | Shaw et al. |
| 2020/0218614 A1 | 7/2020 | Adduri et al. |
| 2020/0241972 A1 | 7/2020 | Dain et al. |
| 2020/0250306 A1 | 8/2020 | Pendyala et al. |
| 2020/0272492 A1 | 8/2020 | Guturi et al. |
| 2020/0274869 A1 | 8/2020 | Tahenakos et al. |
| 2020/0301880 A1 | 9/2020 | George et al. |
| 2020/0302081 A1 | 9/2020 | Faitelson et al. |
| 2020/0358621 A1 | 11/2020 | Ngo |
| 2020/0380000 A1 | 12/2020 | Busjaeger et al. |
| 2020/0396286 A1 | 12/2020 | Nallathambi et al. |
| 2021/0004353 A1 | 1/2021 | Jain et al. |
| 2021/0044604 A1 | 2/2021 | Annen et al. |
| 2021/0141630 A1 | 5/2021 | Sharpe et al. |
| 2021/0152581 A1 | 5/2021 | Hen et al. |
| 2021/0160257 A1 | 5/2021 | Elyashiv et al. |
| 2021/0165783 A1 | 6/2021 | Deshpande et al. |
| 2021/0182392 A1 | 6/2021 | Hargrove |
| 2021/0200641 A1 | 7/2021 | Bafna et al. |
| 2021/0216234 A1 | 7/2021 | Singler et al. |
| 2021/0224233 A1 | 7/2021 | Bafna et al. |
| 2021/0226998 A1 | 7/2021 | Narayanaswamy et al. |
| 2021/0247973 A1 | 8/2021 | Gupta et al. |
| 2021/0255926 A1 | 8/2021 | Wang et al. |
| 2021/0279227 A1 | 9/2021 | Peercy et al. |
| 2021/0303537 A1 | 9/2021 | Liang et al. |
| 2022/0012134 A1 | 1/2022 | Chatterjee et al. |
| 2022/0114006 A1 | 4/2022 | Raghavan et al. |
| 2022/0131879 A1* | 4/2022 | Naik ................... H04L 63/1416 |
| 2022/0188719 A1* | 6/2022 | Ramaswamy ........ G06F 21/552 |
| 2022/0197748 A1 | 6/2022 | Behera et al. |
| 2022/0210093 A1 | 6/2022 | Kumar et al. |
| 2022/0318099 A1 | 10/2022 | Kotwal et al. |
| 2022/0318204 A1 | 10/2022 | Sinha et al. |
| 2022/0318208 A1 | 10/2022 | Tripathi et al. |
| 2022/0342866 A1 | 10/2022 | Kotwal |
| 2023/0039072 A1* | 2/2023 | Shomo ................ G06F 16/2358 |
| 2023/0142344 A1 | 5/2023 | Nakar |
| 2023/0289443 A1 | 9/2023 | Sinha et al. |
| 2023/0325353 A1 | 10/2023 | Gursha et al. |

(56) References Cited

U.S. PATENT DOCUMENTS

| | | |
|---|---|---|
| 2024/0111733 A1 | 4/2024 | Pathak et al. |
| 2024/0168923 A1 | 5/2024 | Sinha et al. |

FOREIGN PATENT DOCUMENTS

| | | | |
|---|---|---|---|
| CN | 110516005 | A | 11/2019 |
| CN | 110519112 | A | 11/2019 |
| CN | 110569269 | A | 12/2019 |
| CN | 106663056 | B | 2/2020 |
| CN | 111078653 | A | 4/2020 |
| CN | 112883009 | A | 6/2021 |
| CN | 114840487 | A | 8/2022 |
| CN | 115314320 | A | 11/2022 |
| CN | 115827556 | A | 3/2023 |
| EP | 1039380 | A2 | 9/2000 |
| EP | 1145496 | A2 | 10/2001 |
| EP | 1189138 | A2 | 3/2002 |
| EP | 1062581 | B1 | 10/2003 |
| EP | 1214663 | B1 | 6/2006 |
| EP | 1677188 | A2 | 7/2006 |
| EP | 1979814 | A2 | 10/2008 |
| EP | 2759942 | A1 | 7/2014 |
| EP | 2179371 | B1 | 4/2019 |
| KR | 102024142 | B1 | 9/2019 |
| WO | 2010050944 | A1 | 5/2010 |
| WO | 2012058482 | A1 | 5/2012 |
| WO | 2012126177 | A2 | 9/2012 |
| WO | 2016014035 | A1 | 1/2016 |
| WO | 2016018446 | A1 | 2/2016 |
| WO | 2017196974 | A1 | 11/2017 |
| WO | 2017223265 | A1 | 12/2017 |
| WO | 2018014650 | A1 | 1/2018 |
| WO | 2019226365 | A1 | 11/2019 |
| WO | 2020190669 | A1 | 9/2020 |
| WO | 2021082157 | A1 | 5/2021 |
| WO | 2021089196 | A1 | 5/2021 |

OTHER PUBLICATIONS

"Nutanix Files Guide"; Nutanix; Sep. 14, 2018; pp. all.
"Setting up and Using Acropolis File Services (AFS) on Nutanix AOS 5.0"; Virtual Dennis—Sharing Technical Tips Learned the Hard Way; Posted Dec. 30, 2016; pp. all.
U.S. Appl. No. 17/129,425, titled "Parallel Change File Tracking in a Distributed File Server Virtual Machine (FSVM) Architecture", filed Dec. 21, 2020; pp. all.
U.S. Appl. No. 17/180,257 titled "Virtualized File Server User Views" filed Feb. 19, 2021, pp. all.
Bas van Kaam "New in AOS 5.0: Nutanix Acropolis File Services"; basvankaam.com; Jan. 5, 2017; pp. all.
Cano, Ignacio et al. "Curator: Self-Managing Storage for Enterprise Clusters"; University of Washington; published Mar. 2017; pp. all.
Dell: "High Availability and Data Protection With Dell EMC Isilon Scale-Out NAS"; Jul. 2019, Dell Inc., pp. all.
Jay Bounds "High-Availability (HA) Pair Controller Configuration Overview and Best Practices"; NetApp; Feb. 2016; pp. all.
Jorge Costa "High Availability Setup Using Veritas Cluster Server and NetApp Synchronous SnapMirror—One button Failover/Failback with SnapMirror Sync and Veritas Cluster Server"; NetApp Community; Nov. 18, 2010; pp. all.
NetApp "Preparing Storage Systems for Snapmirror Replication"; Apr. 2005, NetApp, Inc., pp. all.
NetApp; "Clustered Data Ontap 8.2 File Access Management Guide for CIFS"; Feb. 2014 (year 2014); pp. all.
Ruth, Paul "Autonomic Live Adaption of Virtual Computational Environments in a Multi-Domain Infrastructure"; 2006 IEEE International Conference on Autonomic Computing, 2006, downloaded Apr. 26, 2021; pp. 5-14.
U.S. Appl. No. 17/169,137 titled "Virtualized File Server Data Sharing" filed Feb. 5, 2021, pp. all.
U.S. Appl. No. 17/238,001 titled "Cloning Virtualized File Servers" filed Apr. 22, 2021, pp. all.
U.S. Appl. No. 17/302,343 titled "Disaster Recovery for Distributed File Servers, Including Metadata Fixers" filed Apr. 30, 2021, pp. all.
U.S. Appl. No. 17/364,453 titled "Virtualized Server Systems and Methods Including Domain Joining Techniques" filed Jun. 30, 2021, pp. all.
U.S. Appl. No. 17/443,009, titled "Scope-Based Distributed Lock Infrastructure for Virtualized File Server" filed Jul. 19, 2021, pp. all.
U.S. Appl. No. 17/448,315 tilled "Virtualized File Server" filed Sep. 21, 2021, pp. all.
U.S. Appl. No. 15/829,602 entitled "Handling Permissions for Virtualized File Servers", filed Dec. 1, 2017, pp. all.
Young-Woo Jung et al. "Standard-Based Vitrual Infrastructure Resource Management for Distributed and Heterogeneous Servers"; Feb. 15, 2009; ICACT; pp. all.
U.S. Appl. No. 15/966,943 titled "Virtualized Server Systems and Methods Including Domain Joining Techniques" filed Apr. 30, 2018, pp. all.
U.S. Appl. No. 16/687,327, titled "Virtualized File Server Rolling Upgrade", filed Nov. 19, 2019, pp. all.
U.S. Appl. No. 17/091,758 titled "Virtualized File Server Distribution Across Clusters", filed Nov. 6, 2020, pp. all.
U.S. Appl. No. 16/942,929 titled "Method Using Access Information in a Distributed File Server Virtual Machine (FSVM) Architecture, Including Web Access"; filed Jul. 30, 2020, pp. all.
Dell EMC; Dell EMC Isilon OneFS Operating System; Scale-out NAS to maximize the data capital and business value of your unstructured data; Aug. 2020, pp. all.
Dell EMC; White Paper; Dell EMC Isilon OneFS Operating System; Powering the Isilon Scale-Out Storage Platform; Dec. 2019, pp. all.
EMC Isilon OneFS Operating System; Powering scale-out storage for the new world of Big Data in the enterprise; www.EMC.com; captured Feb. 2020, pp. all.
Isilon OneFS, Version 8.0.1; Web Administration Guide; Published Oct. 2016, pp. all.
U.S. Appl. No. 15/833,255, entitled "Cloning Virtualized File Servers", filed Dec. 6, 2017, pp. all.
U.S. Appl. No. 15/833,391, entitled "Virtualized Server Systems and Methods Including Scaling of File System Virtual Machines", filed Dec. 6, 2017, pp. all.
U.S. Appl. No. 15/422,220, entitled "Virtualized File Server" filed Feb. 1, 2017, pp. all.
U.S. Appl. No. 15/829,340, entitled "Configuring Network Segmentation for a Virtualization Environment", filed Dec. 1, 2017, pp. all.
U.S. Appl. No. 15/829,731, entitled "Transparent Referrals for Distributed File Servers", filed Dec. 1, 2017, pp. all.
U.S. Appl. No. 15/829,781, entitled "Virtualized Server Systems and Methods Including Load Balancing for Virtualized File Servers", filed Dec. 1, 2017, pp. all.
U.S. Appl. No. 15/832,310 entitled "Disaster Recovery for Distributed File Servers, Including Metadata Fixers", filed Dec. 5, 2017, pp. all.
U.S. Appl. No. 16/140,250 titled "Virtualized File Server Data Sharing" filed Sep. 24, 2018, pp. all.
U.S. Appl. No. 16/160,618 titled "Virtualized File Server Backup to Cloud" filed Oct. 15, 2018, pp. all.
U.S. Appl. No. 16/944,323 titled "Actions Based on File Tagging in a Distributed File Server Virtual Machine (FSVM) Environment", filed Jul. 31, 2020, pp. all.
VMware vSphere VMFS "Technical Overview and Best Practices", a VMware Technical White Paper updated for VMware vSphere 5.1, Version 3.0; Nov. 27, 2012, pp. all.
"Administering VMware vSAN—VMware vSphere 7.0", 2015-2020, pp. 1-114.
"Backup vSAN 7 File Share with Veeam Backup & Replication 10", Sysadmin Stories, https://www.sysadminstories.com/2020/06/backup-vsan-7-file-share-with-veeam.html Jun. 2, 2020, pp. 1-7.
"Characteristics of a vSAN Cluster", May 31, 2019, pp. 1-2.
"Designing and Sizing Virtual SAN Fault Domains", Administering VMware Virtual SAN; VMware vSphere 6.5; vSAN 6.6; https://

(56) References Cited

OTHER PUBLICATIONS docs.vmware.com/en/VMware-vShpere/6.5/virtual-san-66-adminstration-guide.pdf captured Aug. 20, 2021, 2017, pp. 34.
"Enabling or disabling SMB automatic node referrals", NetApp https://docs.netapp.com/ontap-9/index.jsp?topic=%2Fcom.netapp.doc.cdot-famg-cifs%2FGUID-AC7E8515-3A4C-4BB5-A8C8-38B565C952E0.html Captured Sep. 19, 2019, pp. all.
"Guaranteeing throughput with QoS", NetApp https://docs.netapp.com/ontap-9/index.jsp?topic=%2Fcom.netapp.doc.pow-perf-mon%2FGUID-77DF9BAF-4ED7-43F6-AECE-95DFB0680D2F.html Captured Sep. 19, 2019, pp. all.
"How to troubleshoot the 'Autolocation' feature in Clustered Data ONTAP", NetApp https://kb.netapp.com/app/answer_view/a_id/1030857/loc/en_US#_highlight Captured Sep. 19, 2019, pp. all.
"How to Troubleshoot the 'Autolocation' feature in Clustered Data ONTAP—Results", NetApp https://kb.netapp.com/app/results/kw/autolocation/ Captured Sep. 19, 2019, pp. all.
"Hybrid Cloud Storage with Cloudian HyperStore and Amazon S3", Cloudian Inc.; www.cloudian.com, Aug. 2014, pp. all.
"Improving client response time by providing SMB automatic node referrals with Auto Location", NetApp https://library.netapp.com/ecmdocs/ECMP1196891/html/GUID-0A5772A4-A6D7-4A00-AC2A-92B868C5B3B5.html Captured Sep. 19, 2019, pp. all.
"Managing Workloads", NetApp https://docs.netapp.com/ontap-9/index.jsp?topic=%2Fcom.netapp.doc.pow-perf-mon%2FGUID-13D35FC5-AF37-4BBD-8A8E-B10B41451A16.html captured Sep. 19, 2019, pp. all.
"Nutanix AFS—Introduction & Steps for Setting Up", Retrieved from https ://virtual building blocks.com/2018/01/03/nutanix-afs-introduction-steps-for-setting-up/ (Year: 2018), Jan. 3, 2018, pp. 1-23.
"Path Failover and Virtual Machines", vSphere Storage; Update 2; VMware vSphere 7.0; VMware ESXi 7.0; vCenter Server 7.0; https://docs.vmware.com/en/VMware-vSphere/7.0/vsphere-esxi-vcenter-server-702-storage-guide.pdf Jun. 25, 2021, pp. 238.
"Protect Your Data With Netapp Element Software", Solution Brief; NetApp, 2018, pp. all.
"Tech TopX: AHV One Click Upgrade", Screen captures from YouTube video clip entitled "Tech TopX: AHV One Click Upgrade," 13 pages, uploaded on Dec. 8, 2015 by user "Nutanix University". Retrieved from Internet: https://www.youtube.com/watch?v=3dALdzw6qZM Dec. 8, 2015, pp. all.
"Understanding Multipathing and Failover", vSphere Storage; VMware vSphere 7.0; VMware ESXi 7.0; vCenter Server 7.0 https://docs.vmware.com/en/VMware-vSphere/7.0/vsphere-esxi-vcenter-server-702-storage-guide.pdf Jun. 25, 2021, pp. 234-268.
"Virtual Disk Manager User's Guide: Virtual Disk Development Kit", vmware.com, 2008, pp. 1-12.
"VMware vCenter Server: Centrally Mananged Virtual Infrastructure Delivered with Confidence", VMWare Datasheet; https://www.vmware.com/content/dam/digitalmarketing/vmware/en/pdf/products/vCenter/vmware-vcenter-server-datasheet.pdf captured Aug. 20, 2021, 2015, pp. 1-2.
"VMware VSAN 7.0 Release Notes", VMware; https://docs.vmware.com/en/VMware-vSphere/7.0/rn/vmware-vsan-70-release-notes.html Mar. 8, 2021, pp. 1-12.
"VSAN 7.0 U2 Proof of Concept Guide", VMwareStorage; https://images.core.vmware.com/sites/default/files/resource/vsan_70_u2_proof_of_concept_guide_noindex.pdf printed May 18, 2021, Apr. 2021, pp. 1-267.
"VSAN File Services Tech Note | VMware", updated Mar. 8, 2021, pp. 1-7.
"VSAN Health Service—File Service—File Server Health (77165)", VMware, Knowledge Base; https://kb.vmware.com/s/article/77165, May 15, 2021, pp. 1-5.
"VSAN Monitoring and Troubleshooting—VMware vSphere 7.0", https://docs.vmware.com/ 2018, pp. 1-61.
"VSAN Performance Graphs in the vSphere Web Client (2144493)", Nov. 9, 2020, pp. 1-42.
"VSan Planning and Deployment", Update 2 VMWare vSphere 6.7; VMware vSAN 6.7; https://docs.vmware.com/en/VMware-vSphere/6.7/vsan-673-planning-deployment-guide.pdf Aug. 20, 2019, pp. 1-85.
"VSan Stretched Cluster Guide", VMwareStorage; https://images.core.vmware.com/sites/default/files/resource/vsan_stretched_cluster_guide_noindex.pdf printed Jun. 24, 2021, Jun. 2020, pp. 1-62.
"VSphere Availability—VMware vSphere 6.7", https://docs.vmware.com/, Jan. 11, 2019, pp. 1-105.
"vSphere Storage—VMware vSphere 6.7", https://docs.vmware.com/, Jan. 4, 2021, pp. 1-382.
Bhardwaj, Rishi "The Wonderful World of Distributed Systems and the Art of Metadata Management", Nutanix, Inc., https://www.nutanix.com/blog/the-wonderful-world-of-distributed-systems-and-metadata-management captured Aug. 19, 2021, Sep. 24, 2015, pp. 1-8.
Birk, Ryan "How it Works: Understanding vSAN Architecture Components", altaro.com, Feb. 28, 2018, pp. 1-10.
Cormac "Native File Services for vSAN 7", CormacHogan.com, Mar. 11, 2020, pp. 1-23.
Feroce, Danilo "Leveraging VMware vSAM for Highly Available Management Clusters", VMware, Inc., Version 2.9, VMware, Inc., Jan. 2018, pp. 1-22.
Fojta, Tomas "Quotas and Quota Policies in VMware Cloud Director—Tom Fojta's Blog", Nov. 6, 2020, pp. 1-4.
Fojta, Tomas "vSAN File Services with vCloud Director—Tom Fojta's Blog", (wordpress.com) ("Fojta Blog"), Apr. 6, 2020, captured Feb. 11, 2021; pp. 1-8.
Hogan, Cormac "New updates from Nutanix—NOS 3.0 and NX-3000", https://cormachogan.com/2012/12/20/new-from-nutanix-nos-3-0-nx-3000/ Dec. 20, 2012, pp. 1-7.
Kemp, Erik "NetApp SolidFire SnapMirror Architecture and Configuration", Technical Report, NetApp, Dec. 2017, pp. all.
Kleyman, Bill "How Cloud Computing Changes Storage Tiering", https://www.datacenterknowledge.com captured Jun. 4, 2019, Nov. 12, 2015, pp. all.
Leibovici, Andre "Nutanix One-Click Upgrade now takes care of Firmware and Hypervisor too!", https://myvirtualcloud.net/nutanix-one-click-upgrade-now-takes-care-of-firmware-and-hypervisor-too/ Jul. 31, 2014, pp. 1-4.
Rajendran, Cedric "Working with vSAN Health Checks", VMware vSan Virtual Blocks Blog; https://blogs.vmware.com/virtualblocks/2019/07/18/working-with-vsan-health-checks/ Jul. 18, 2019, pp. 1-6.
Seget, Vladan "VMware vSAN 7 now with native file services and quotas", May 1, 2020, pp. all.
Seget, Vladan "VMware vSphere 7.0 and vSAN storage improvements", Apr. 1, 2020, pp. 1-12.
Sturniolo, Andy "VMware vSAN File Services and Veeam", Veeam Blog, https://www.veeam.com/blog/veeam-backup-vsan-file-services.html, Jul. 22, 2020, pp. 1-9.
"Configuring Active Directory Lookup for UNIX GID and UID Information" O'Reilly Media, Inc. https://learning.oreilly.com/library/view/windows-server-2012/9780133116007/ch09lev2sec6.html pp. 1-2.
"Small office server and UID translation", Unix & Linux, https://unix.stackexchange.com/questions/373747/small-office-server-and-uid-translation Jul. 2017, pp. 1-5.
Bigler, Rene "Nutanix File Analytics", Dready's Blog, https://dreadysblog.com/2019/04/12/nutanix-file-analytics/ Apr. 12, 2019; pp. 1-12.
McGhee, Mike "File Auditing and Analytics for your Nutanix Files Enterprise Cloud", Nutanix, Inc. https://next.nutanix.com/community-blog-154/file-auditing-and-analytics-for-your-nutanix-files-enterprise-cloud-31950# Mar. 1, 2019, pp. 1-9.
McGhee, Mike "Nutanix Files: File Analytics", Nutanix, Inc. https://next.nutanix.com/nutanix-files-71/nutanix-files-file-analytics-33179 Aug. 22, 2019, pp. all.
Mercier, Jeff "Nutanix Files Analytics At-A-Glance (Part I)", World Wide Technology, https://www.wwt.com/article/nutanix-files-analytics-at-a-glance-part-i May 23, 2019; pp. 1-12.

(56) References Cited

OTHER PUBLICATIONS

Mercier, Jeff "Nutanix Files Analytics At-A-Glance (Part II)", World Wide Technology, https://www.wwt.com/article/nutanix-files-analytics-at-a-glance-part-ii May 23, 2019; pp. 1-9.
Mercier, Jeff "Nutanix Files Analytics At-A-Glance (Part III)", World Wide Technology, https://www.wwt.com/article/nutanix-files-analytics-at-a-glance-part-iii Jun. 7, 2019; pp. 1-12.
Poitras, Steven. "The Nutanix Bible" (Oct. 15, 2013), from http://stevenpoitras.com/the-nutanix-bible/ (Publication date based on indicated capture date by Archive.org; first publication date unknown); pp. all.
Poitras, Steven. "The Nutanix Bible" (Jan. 11, 2014), from http://stevenpoitras.com/the-nutanix-bible/ (Publication date based on indicated capture date by Archive.org; first publication date unknown); pp. all.
Poitras, Steven. "The Nutanix Bible" (Jun. 20, 2014), from http://stevenpoitras.com/the-nutanix-bible/ (Publication date based on indicated capture date by Archive.org; first publication date unknown); pp. all.
Poitras, Steven. "The Nutanix Bible" (Jan. 7, 2015), from http:/stevenpoitras.com/the-nutanix-bible/ (Publication date based on indicated capture date by Archive.org; first publication date unknown); pp. all.
Poitras, Steven. "The Nutanix Bible" (Jun. 9, 2015), from http://stevenpoitras.com/the-nutanix-bible/ (Publication date based on indicated capture date by Archive.org; first publication date unknown); pp. all.
Poitras, Steven. "The Nutanix Bible" (Sep. 4, 2015), from https://nutanixbible.com/; pp. all.
Poitras, Steven. "The Nutanix Bible" (Jan. 12, 2016), from https://nutanixbible.com/ ; pp. all.
Poitras, Steven. "The Nutanix Bible" (Jun. 9, 2016), from https://nutanixbible.com/; pp. all.
Poitras, Steven. "The Nutanix Bible" (Jan. 3, 2017), from https://nutanixbible.com/; pp. all.
Poitras, Steven. "The Nutanix Bible" (Jun. 8, 2017), from https://nutanixbible.com/; pp. all.
Poitras, Steven. "The Nutanix Bible" (Jan. 3, 2018), from https://nutanixbible.com/; pp. all.
Poitras, Steven. "The Nutanix Bible" (Jun. 25, 2018), from https://nutanixbible.com/; pp. all.
Poitras, Steven. "The Nutanix Bible" (Jan. 8, 2019), from https://nutanixbible.com/; pp. all.
Poitras, Steven. "The Nutanix Bible" (Jul. 25, 2019), from https://nutanixbible.com/; pp. all.
Poitras, Steven. "The Nutanix Bible" (Sep. 17, 2019), from https://nutanixbible.com/; pp. all.
Poitras, Steven. "The Nutanix Bible" (Mar. 2, 2020), from https://nutanixbible.com/; pp. all.
Poitras, Steven. "The Nutanix Bible" (Sep. 1, 2020), from https://nutanixbible.com/; pp. all.
Poitras, Steven. "The Nutanix Bible" (Mar. 2, 2021), from https://nutanixbible.com/; pp. all.
"Citrix XenDesktop 7.1 on Microsoft Hyper-V Server 2012 R2 on Nutanix Virtual Computing Platform", Citrix APAC Solutions, Jun. 25, 2014, pp. 1-94.
U.S. Appl. No. 17/693,206 titled "Title of Invention: Malicious Activity Detection, Validation, and Remediation in Virtualized File Servers" filed Mar. 11, 2022.
Berger, Victor , "Anomaly detection in user behavior of websites using Hierarchical Temporal Memories", KTH Royal Institute of Technology | School of Computer Science and Communication http://www.diva-portal.org/smash/get/diva2:1094877/FULLTEXT01.pdf, 2017, pp. 1-40.
Matos, David , et al., "RockFS: Cloud-backed File System Resilience to Client-Side Attacks", INESC-ID, Instituto Superior Tecnico, Universidade de Lisboa, Portugal Technical University of Munich, Department of Informatics, Germany, Nov. 26, 2018, pp. 107-119.
Mehnaz, Shagufta , et al., "A Fine-grained Approach for Anomaly Detection in File System Accesses", Dept. of Computer Science | University of West Lafayette http://library.usc.edu.ph/ACM/SIGSAC%202017/codaspy/p3.pdf, Mar. 24, 2017, pp. 1-12.
Wang, Xiaobin , et al., "An abnormal file access behavior detection approach based on file path diversity", Institution of Engineering and Technology https://ieeexplore.ieee.org/abstract/document/6913685, Oct. 2014, pp. 1-5.
U.S. Appl. No. 17/452,144 titled "Malicious Activity Detection and Remediation in Virtualized File Servers" filed Oct. 25, 2021, pp. all pages of the application as filed.
"CryptoSpike Demo: Ransomware protection for NetApp files" https://www.youtube.com/watch?v=jdh-ehkHDMQ [youtube.com] Sep. 13, 2019; captured Oct. 22, 2021; pp. 1-8.
"Ransomeware Protection for NetApp", https://www.catalogicsoftware.com/products/cryptospike/ [protect-us.mimecast.com], 2021; captured Oct. 25, 2021; pp. all.
Delaney, Darragh "5 Methods For Detecting Ransomware Activity", https://www.rapid7.com/blog/post/2016/05/16/methods-for-detecting-ransomware-activity/ [protect-us.mimecast.com], May 16, 2016; pp. all.
Derschmitz "Ransomware protection for files with NetApp and CryptoSpike", https://derschmitz.com/2020/01/24/ransomware-protection-for-files-with-netapp-and-cryptospike/ [protect-us.mimecast.com], Jan. 24, 2020; pp. all.
U.S. Appl. No. 17/304,044 titled "File Analytics Systems and Methods Including Retrieving Metadata From FileSystem Snapshots" filed Jun. 14, 2021.
U.S. Appl. No. 17/304,055 titled "Virtualized File Servers and Methods to Persistently Store File System Eventdata" filed Jun. 14, 2021.
U.S. Appl. No. 17/304,062, titled "File Analytics Systems and Methods Including Receiving and Processing FileSystem Event Data in Order" filed Jun. 14, 2021.
U.S. Appl. No. 17/304,096, titled File Analytics Systems and Methods: filed Jun. 14, 2021.
Poitras, Steven , "The Nutanix Bible", https://nutanixbible.com/, Apr. 9, 2019, pp. all.
U.S. Appl. No. 18/183,883 titled "Data Analytics Systems for File Systems Including Examples of Path Generation" filed Mar. 13, 2023.
U.S. Appl. No. 18/499,144 titled "Ransomware Detection and/or Remediation as a Service in File Server Systems" filed Oct. 31, 2023.
"Cisco Ransomware Defense", https://www.cisco.com/c/dam/global/en_ca/assets/pdfs/at-a-glance-c45-737465.pdf., 2016, pp. 1-2.
"The rise of ransomware", https://www.cisco.com/c/dam/en/us/solutions/collateral/enterprise-networks/ransomware-defense/at-a-glance-c45-737465.pdf, 2017, pp. 1-2.
Padioleau, Yoann , et al., "A Logic File System", https://hal.archives-ouvertes.fr/hal-03214497/document, Jun. 2003, pp. 99-112.
Zemlyanaya, D. , et al., "Virus signature detection algorithm", https://www.researchgate.net/publication/357414139_Virus_signature_detection_algorithm, 2021, pp. 1-8.
"Incident Response Playbook: Ransom Response for S3", https://github.com/aws-samples/aws-customer-playbook-framework/blob/main/docs/Ransom_Response_S3.md, 2021, pp. 10.
"Ransomware Protection", https://forum.photostructure.com/t/ransomware-protection/428, Mar. 2021, pp. 3.
Padilla,, Kenneth , "Dell EMC Unity: Cloud Tiering Appliance (CTA)", https ://www. del l technologies. co ml asseUen-us/prod ucts/storage/i ndustry-market/h 16376-del l-e m c-u ni ty-cl oud-tieri ng-appl iance. pdf, 2021.
Werber, Mat , "Query Amazon S3 Analytics data with Amazon Athena", https://aws.amazon.com/blogs/storage/query-amazon-s3-analytics-data-with-amazon-athena/, Jan. 7, 2020, pp. 7.

* cited by examiner

FILE ANALYTICS SYSTEMS INCLUDING EXAMPLES PROVIDING METRICS ADJUSTED FOR APPLICATION OPERATION

CROSS REFERENCE TO RELATED APPLICATIONS

This application claims priority to Indian Provisional Application No. 202111015328 filed Mar. 31, 2021 and Indian Provisional Application No. 202111019886 filed Apr. 30, 2021. The aforementioned applications are incorporated herein by reference, in their entirety, for any purpose.

TECHNICAL FIELD

Examples described herein relate generally to distributed file server systems. Examples of file analytics systems are described which may obtain events from the distributed file server, and generate metrics based on the same. Examples of file analytics systems that adjust metrics based on operation of one or more applications are described.

BACKGROUND

Data, including files, are increasingly important to enterprises and individuals. The ability to store significant corpuses of files is important to operation of many modern enterprises. Existing systems that store enterprise data may be complex or cumbersome to interact with in order to quickly or easily establish what actions have been taken with respect to the enterprise's data and what attention may be needed from an administrator.

When users interact with files through applications, the applications may take a variety of actions to accomplish the operation requested by the user. The actions taken by the application may obscure an overall view of performance of the file repository and/or the user.

DETAILED DESCRIPTION

Figure 1:
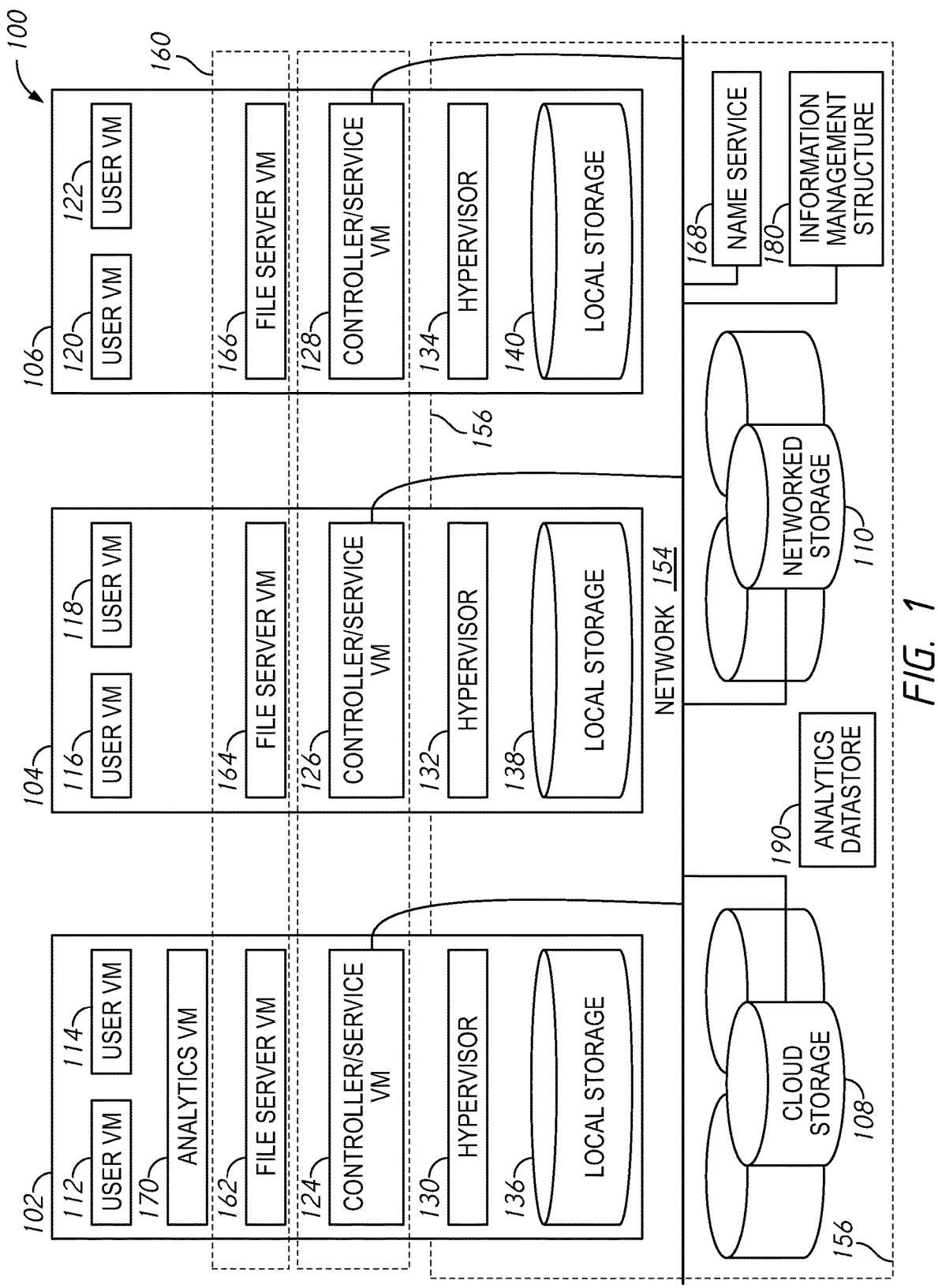
FIG. 1 is a schematic illustration of a distributed computing system hosting a virtualized file server and a file analytics system arranged in accordance with examples described herein.

Examples described herein include metadata and events based file analytics systems for hyper-converged scale out distributed file storage systems. Embodiments presented herein disclose a file analytics system which may to retrieve, organize, aggregate, and/or analyze information pertaining to a file system. Information about the file system may be stored in an analytics datastore. The file analytics system may query or monitor the analytics datastore to provide information to an administrator) in the form of display interfaces, reports, and alerts and/or notifications. In some examples, the file analytics system may be hosted on a computing node, whether standalone or on a cluster of computing nodes. In some examples, the file analytics system may interface with a file system managed by a distributed virtualized file server (VFS) hosted on a cluster of computing nodes. An example VFS may provide for shared storage (e.g., across an enterprise), failover and backup functionalities, as well as scalability and security of data stored on the VFS.

In some situations, a user of a file system may take an action through an application which may cause additional files to be created and/or other events to occur. These additional files and/or other events may be ancillary to the user's action and may be due to the internal operation of the application. The additional files and/or other events created and/or taken by the application responsive to the user action may cause the event data sent by the file system to the analytics system to include events which do not pertain to the user's action, but to the application's internal activity taken to accomplish the requested action. This may obscure reporting on particular metrics—such as actions taken by a user, number of files in the system, or other metrics. In order to obtain metrics which reflect the user action, and reduce or eliminate ancillary actions taken by applications to accomplish the user action, examples of file analytics systems described herein may filter event data to select certain events associated with the user action (e.g., to discard certain events associated with operation of the application). These filtered events may then be used for reporting, rather than the entirety of the event data. Moreover, in some examples, the operation of the application may cause one or more additional files to be generated (e.g., one or more temporary files). Examples of files analytics systems described herein may provide a lineage index which stores associations between files requested to be manipulated by a user and files created by an application responsive to the user request (e.g., temporary files). The lineage index may be accessed by file analytics systems described herein so that the file analytics system may analyze a set of events corresponding to both the requested file and the application-created file(s) (e.g., temporary files(s)). This full set of events may be filtered in some examples to remove application-originated events ancillary to the user's action. The filtered event data may be used for reporting, which may be more accurate than the initial event data including all events, including internal application-generated events.

Certain details are set forth herein to provide an understanding of described embodiments of technology. However, other examples may be practiced without various of these particular details. In some instances, well-known circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

Examples of file analytics systems are described herein. During operation, the file analytics system may retrieve metadata associated with the file system, configuration and/or user information from the file system, and/or event data from the file system.

The metadata collection process may involve gathering data on the overall size and structure of the file system, as well as details for each data item (e.g., file, folder, directory, share, etc.) in the file system. Those details may include name, ID, file extension (e.g., type), size, or other information about the data item. In some examples, the metadata collection process may use a snapshot of the file system to retrieve the metadata, such as a snapshot provided by a disaster recovery application.

To capture configuration information, the file analytics system may use an application programming interface (API) architecture to request the configuration information. The configuration information may include user information, a number of shares, deleted shares, created shares, etc.

To capture event data, the file analytics system may interface with the file server using a messaging system publisher/subscriber message system) to receive event data. Received event data may be stored by the file analytics system in the analytics datastore. The event data may include data related to various operations performed with the file system, such as creating, deleting, reading, opening, editing, moving, modifying, etc., a file, folder, directory, share, etc., within the file system. The event information may indicate an event type (e.g., create, read, edit, delete), a user associated with the event, an event time, etc. Examples of events which may be supported in some examples include file open, file write, rename, file create, file read, file delete, security change, directory create, directory delete, file open/permission denied, file close, set attribute. Accordingly, events may be file server audit events (e.g., SMB audit events).

In some examples, the file analytics system and/or the corresponding file system may include protections to prevent and/or reduce event data from being lost. For example, the file system may be configured to store event data until it is consumed by the file analytics tool. For example, if the file analytics tool becomes unavailable, the file system may store the event data until the file analytics tool becomes available. The file analytics tool and/or the file system may further include architecture to prevent and/or reduce event data from being processed out of chronological order.

In some examples, the file analytics system may perform a metadata collection process. The metadata collection process may be performed wholly and/or partially in parallel with receipt of event data via the messaging system in some examples. The file analytics system may reconcile information captured via the metadata collection process with event data information. The reconciliation may prevent and/or reduce the incidence of older data from overwriting newer data. In some examples, the reconciliation process may ensure that the metadata is accurate.

The file analytics system may generate reports, including predetermined reports and/or customizable reports. The reports may be related to aggregate and/or specific user activity; aggregate file system activity; specific file, directory, share, etc., activity; etc.; or any combination of thereof.

In some examples, the file analytics system may be configured to analyze the received event data to detect irregular, anomalous, and/or malicious activity within the file system. For example, the file analytics system may detect malicious software activity (e.g., ransomware) or anomalous user activity (e.g., deleting a large amount of files, deleting a large share, etc.). In some examples, because the metadata is kept up-to-date based on events occurring in the file system, the reports generated by the file analytics system and/or the analysis conducted by the file analytics system may be presented and/or updated in real-time (e.g., including events occurring within the past day, hour, minute, second, or other time interval).

As previously described, the file analytics system may retrieve, organize, aggregate, and/or analyze information corresponding to a file system managed by a distributed VFS. Accordingly, the file analytics system may interface with multiple instances of processes (such as multiple file server virtual machines (VMs) and/or multiple containers) that make up the distributed VFS to retrieve the information. In some examples, the file analytics system may be hosted in a virtualized environment (e.g., hosted on a VM and/or in a container).

Examples described herein provide analytics which may be used, for example, to collect, analyze, and display data about a virtualized file system. Virtualization may be advantageous in modem business and computing environments in part because of the resource utilization advantages provided by virtualized computing systems. Without virtualization, if a physical machine is limited to a single dedicated process, function, and/or operating system, then during periods of inactivity by that process, function, and/or operating system, the physical machine is not utilized to perform useful work. This may be wasteful and inefficient if there are users on other physical machines which are currently waiting for computing resources. To address this problem, virtualization allows multiple VMs and/or containers to share the underlying physical resources so that during periods of inactivity by one VM and/or container, other VMs and/or containers can take advantage of the resource availability to process workloads. This can produce efficiencies for the utilization of physical devices, and can result in reduced redundancies and better resource cost management.

Furthermore, virtualized computing systems may be used to not only utilize the processing power of the physical devices but also to aggregate the storage of the individual physical devices to create a logical storage pool where the data may be distributed across the physical devices but appears to the virtual machines and/or containers to be part of the system that the virtual machine and/or container is hosted on. Such systems may operate using metadata, which may be distributed and replicated any number of times across the system, to locate the indicated data.

FIG. 1 is a schematic illustration of a distributed computing system 100 hosting a virtualized file server and a file analytics system arranged in accordance with examples described herein. The system 100 which may be a virtualized system and/or a clustered virtualized system, includes a virtualized file server (VFS) 160 and an analytics VM 170. While shown as a virtual machine, examples of analytics applications may be implemented using one or more virtual machines, containers or both. The analytics application, e.g., analytics VM 170, may retrieve, organize, aggregate, and/or analyze information pertaining to the VFS 160. Data collected by the analytics application may be stored in an analytics datastore 190. The analytics datastore may be distributed across the various storage devices shown in FIG.

1 in some examples. While shown as hosted in a same computing system cluster as hosts the VFS 160, the analytics VM 170 and/or analytics datastore may in other examples be outside the cluster and in communication with the cluster. In some examples the analytics VM and/or analytics data store may be provided as a hosted solution in one or more cloud computing platforms.

The system of FIG. 1 can be implemented using a distributed computing system. Distributed computing systems generally include multiple computing nodes (e.g., physical computing resources)—host machines 102, 106, and 104 are shown in FIG. 1—that may manage shared storage, which may be arranged in multiple tiers. The storage may include storage that is accessible through network 154, such as, by way of example and not limitation, cloud storage 108 (e.g., which may be accessible through the Internet), network-attached storage 110 (NAS) (e.g., which may be accessible through a LAN), or a storage area network (SAN). Examples described herein may also or instead permit local storage 136, 138, and 140 that is incorporated into or directly attached to the host machine and/or appliance to be managed as part of storage pool 156. Accordingly, the storage pool may include local storage of one or more of the computing nodes in the system, storage accessible through a network, or both local storage of one or more of the computing nodes in the system and storage accessible over a network. Examples of local storage may include solid state drives (SSDs), hard disk drives (HDDs, and/or "spindle drives"), optical disk drives, external drives (e.g., a storage device connected to a host machine via a native drive interface or a serial attached SCSI interface), or any other direct-attached storage. These storage devices, both direct-attached and/or network-accessible, collectively form storage pool 156. Virtual disks (or "vDisks") may be structured from the physical storage devices in storage pool 156. A vDisk generally refers to a storage abstraction that is exposed by a component (e.g., a virtual machine, hypervisor, and/or container described herein) to be used by a client (e.g., a user VM, such as user VM 112). In examples described herein, controller VMs—e.g., controller VM 124, 126, and/or 128 of FIG. 1 may provide access to vDisks. In other examples, access to vDisks may additionally or instead be provided by one or more hypervisors (e.g., hypervisor 130, 132, and/or 134). In some examples, the vDisk may be exposed via iSCSI ("internet small computer system interface") or NFS ("network file system") and may be mounted as a virtual disk on the user VM. In some examples, vDisks may be organized into one or more volume groups (VGs).

Each host machine 102, 106, 104 may run virtualization software. Virtualization software may include one or more virtualization managers (e.g., one or more virtual machine managers, such as one or more hypervisors, and/or one or more container managers). Examples of hypervisors include NUTANIX AHV, VMWARE ESX(I), MICROSOFT HYPER-V, DOCKER hypervisor, and REDHAT KVM. Examples of container managers including Kubernetes. The virtualization software shown in FIG. 1 includes hypervisors 130, 132, and 134 which may create, manage, and/or destroy user VMs, as well as manage the interactions between the underlying hardware and user VMs. While hypervisors are shown in FIG. 1, containers may be used additionally or instead in other examples. User VMs may run one or more applications that may operate as "clients" with respect to other elements within system 100. While shown as virtual machines in FIG. 1, containers may be used to implement client processes in other examples. Hypervisors may connect to one or more networks, such as network 154 of FIG. 1 to communicate with storage pool 156 and/or other computing system(s) or components.

In some examples, controller virtual machines, such as CVMs 124, 126, and 128 of FIG. 1 are used to manage storage and input/output ("I/O") activities according to particular embodiments. While examples are described herein using CVMs to manage storage I/O activities, in other examples, container managers and/or hypervisors may additionally or instead be used to perform described CVM functionality. The arrangement of virtualization software should be understood to be flexible. In some examples, CVMs act as the storage controller. Multiple such storage controllers may coordinate within a cluster to form a unified storage controller system. CVMs may run as virtual machines on the various host machines, and work together to form a distributed system that manages all the storage resources, including local storage, network-attached storage 110, and cloud storage 108. The CVMs may connect to network 154 directly, or via a hypervisor. Since the CVMs run independent of hypervisors 130, 132, 134, in examples where CVMs provide storage controller functionally, the system may be implemented within any virtual machine architecture, since the CVMs of particular embodiments can be used in conjunction with any hypervisor from any virtualization vendor. In other examples, the hypervisor may provide storage controller functionality and/or one or containers may be used to provide storage controller functionality (e.g., to manage I/O request to and from the storage pool 156).

A host machine may be designated as a leader node within a cluster of host machines. For example, host machine 104, as indicated by the asterisks, may be a leader node. A leader node may have a software component designated to perform operations of the leader. For example, CVM 126 on host machine 104 may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Virtual disks may be made available to one or more user processes. In the example of FIG. 1, each CVM 124, 126, and 128 may export one or more block devices or NFS server targets that appear as disks to user VMs 112, 114, 116, 118, 120, and 122. These disks are virtual, since they are implemented by the software running inside CVMs 124, 126, and 128. Thus, to user VMs, CVMs appear to be exporting a clustered storage appliance that contains some disks. User data (e.g., including the operating system in some examples) in the user VMs may reside on these virtual disks.

Performance advantages can be gained in some examples by allowing the virtualization system to access and utilize local storage 136, 138, and 140. This is because 110 performance may be much faster when performing access to local storage as compared to performing access to network-attached storage 110 across a network 154. This faster performance for locally attached storage can be increased even further by using certain types of optimized local storage devices, such as SSDs.

As a user process (e.g., a user VM) performs I/O operations (e.g., a read operation or a write operation), the I/O commands may be sent to the hypervisor that shares the same server as the user process, in examples utilizing hypervisors. For example, the hypervisor may present to the virtual machines an emulated storage controller, receive an I/O command and facilitate the performance of the I/O command (e.g., via interfacing with storage that is the object of the command, or passing the command to a service that will perform the 110 command). An emulated storage controller may facilitate I/O operations between a user VM and a vDisk. A vDisk may present to a user VM as one or more discrete storage drives, but each vDisk may correspond to any part of one or more drives within storage pool 156. Additionally or alternatively, CVMs 124, 126, 128 may present an emulated storage controller either to the hypervisor or to user VMs to facilitate I/O operations. CVMs 124, 126, and 128 may be connected to storage within storage pool 156. CVM 124 may have the ability to perform I/O operations using 136 within the same host machine 102, by connecting via network 154 to cloud storage 108 or network-attached storage 110, or by connecting via network 154 to 138 or 140 within another host machine 204 or 206 (e.g., via connecting to another CVM 126 or 128). In particular embodiments, any computing system may be used to implement a host machine.

Examples described herein include virtualized file servers. A virtualized file server may be implemented using a cluster of virtualized software instances (e.g., a cluster of file server virtual machines). A virtualized file server 160 is shown in FIG. 1 including a duster of file server virtual machines. The file server virtual machines may additionally or instead be implemented using containers. In some examples, the VFS 160 provides file services to user VMs 112, 114, 116, 118, 120, and 122. The file services may include storing and retrieving data persistently, reliably, and/or efficiently in some examples. The user virtual machines may execute user processes, such as office applications or the like, on host machines 102, 202, and 106. The stored data may be represented as a set of storage items, such as files organized in a hierarchical structure of folders (also known as directories), which can contain files and other folders, and shares, which can also contain files and folders.

In particular embodiments, the VFS 160 may include a set of File Server Virtual Machines (FSVMs) 162, 164, and 166 that execute on host machines 102, 202, and 106. The set of file server virtual machines (FSVMs) may operate together to form a cluster. The FSVMs may process storage item access operations requested by user VMs executing on the host machines 102, 202, and 106. The FSVMs 162, 164, and 166 may communicate with storage controllers provided by CVMs 124, 132, 128 and/or hvpervisors executing on the host machines 102, 202, 106 to store and retrieve files, folders, SMB shares, or other storage items. The FSVMs 162, 164, and 166 may store and retrieve block-level data on the host machines 102, 104, 106, e.g., on the local storage 136, 138, 140 of the host machines 102, 104, 106. The block-level data may include block-level representations of the storage items. The network protocol used for communication between user VMs, FSVMs, CVMs, and/or hypervisors via the network 154 may be Internet Small Computer Systems Interface (iSCSI), Server Message Block (SMB), Network File System (NFS), pNFS (Parallel NFS), or another appropriate protocol.

Generally, FSVMs may be utilized to receive and process requests in accordance with a file system protocol—e.g., NFS, SMB. In this manner, the cluster of FSVMs may provide a file system that may present files, folders, and/or a directory structure to users, where the files, folders, and/or directory structure may be distributed across a storage pool in one or more shares.

For the purposes of VFS 160, host machine 106 may be designated as a leader node within a cluster of host machines. In this case, FSVM 166 on host machine 106 may be designated to perform such operations. A leader may be responsible for monitoring or handling requests from FSVMs on other host machines throughout e virtualized environment. If FSVM 166 fails, a new leader may be designated for VFS 160.

In some examples, the user VMs may send data to the VFS 160 using write requests, and may receive data from it using read requests. The read and write requests, and their associated parameters, data, and results, may be sent between a user VM and one or more file server VMs (FSVMs) located on the same host machine as the user VM or on different host machines from the user VM. The read and write requests may be sent between host machines 102, 202, 106 via network 154, e.g., using a network communication protocol such as iSCSI, CIFS, SMB, TCP, IP, or the like. When a read or write request is sent between two VMs located on the same one of the host machines 102, 202, 106 (e.g., between the 112 and the FSVM 162 located on the host machine 102), the request may be sent using local communication within the host machine 102 instead of via the network 154. Such local communication may be faster than communication via the network 154 in some examples. The local communication may be performed by, e.g., writing to and reading from shared memory accessible by the user VM 112 and the FSVM 162, sending and receiving data via a local "loopback" network interface, local stream communication, or the like.

In some examples, the storage items stored by the VFS 160, such as files and folders, may be distributed amongst storage managed by multiple FSVMs 162, 164, 166. In some examples, when storage access requests are received from the user VMs, the VFS 160 identifies

162, 164, 166 at which requested storage items, e.g., folders, files, or portions thereof, are stored or managed, and directs the user VMs to the locations of the storage items. The FSVMs 162, 164, 166 may maintain a storage map, such as a sharding map, that maps names or identifiers of storage items to their corresponding locations. The storage map may be a distributed data structure of which copies are maintained at each FSVM 162, 164, 166 and accessed using distributed locks or other storage item access operations. In some examples, the storage map may be maintained by an FSVM at a leader node such as the FSVM 166, and the other FSVMs 162 and 164 may send requests to query and update the storage map to the leader FSVM 166. Other implementations of the storage map are possible using appropriate techniques to provide asynchronous data access to a shared resource by multiple readers and writers. The storage map may map names or identifiers of storage items in the form of text strings or numeric identifiers, such as folder names, files names, and/or identifiers of portions of folders or files (e.g., numeric start offset positions and counts in bytes or other units) to locations of the files, folders, or portions thereof. Locations may be represented as names of FSVMs, e.g., "FSVM-1", as network addresses of host machines on which FSVMs are located (e.g., "ip-addr1" or 128.1.1.10), or as other types of location identifiers.

When a user application, e.g., executing in a user VM 112 on host machine 102 initiates a storage access operation, such as reading or writing data, the user VM 112 may send the storage access operation in a request to one of the FSVMs 162, 164, 166 on one of the host machines 102, 202, 106. A FSVM 164 executing on a host machine 102 that receives a storage access request may use the storage map to determine whether the requested file or folder is located on and/or managed by the FSVM 164. If the requested file or folder is located on and/or managed by the FSVM 164, the FSVM 164 executes the requested storage access operation. Otherwise, the FSVM 164 responds to the request with an indication that the data is not on the FSVM 164, and may redirect the requesting user VM 112 to the FSVM on which the storage map indicates the file or folder is located. The client may cache the address of the FSVM on which the file or folder is located, so that it may send subsequent requests for the file or folder directly to that FSVM.

As an example and not by way of limitation, the location of a file or a folder may be pinned to a particular FSVM 162 by sending a file service operation that creates the file or folder to a CVM, container, and/or hypervisor associated with (e.g., located on the same host machine as) the FSVM 162—the CVM 124 in the example of FIG. 1. The CVM, container, and/or hypervisor may subsequently processes file service commands for that file for the FSVM 162 and send corresponding storage access operations to storage devices associated with the file. In some examples, the FSVM may perform these functions itself. The CVM 124 may associate local storage 136 with the file if there is sufficient free space on local storage 136. Alternatively, the CVM 124 may associate a storage device located on another host machine 104, e.g., in local storage 138, with the file under certain conditions, e.g., if there is insufficient free space on the local storage 136, or if storage access operations between the CVM 124 and the file are expected to be infrequent. Files and folders, or portions thereof, may also be stored on other storage devices, such as the network-attached storage (NAS) network-attached storage 110 or the cloud storage 108 of the storage pool 156.

In particular embodiments, a name service 168, such as that specified by the Domain Name System (DNS) Internet protocol, may communicate with the host machines 102, 104, 106 via the network 154 and may store a database of domain names (e.g., host names) to IP address mappings. The domain names may correspond to FSVMs, e.g., fsvm1.domain.com or ip-addr1.domain.com for an FSVM named FSVM-1. The name service 168 may be queried by the user VMs to determine the IP address of a particular host machine 102, 104, 106 given a name of the host machine, e.g., to determine the IP address of the host name ip-addr1 for the host machine 102. The name service 168 may be located on a separate server computer system or on one or more of the host machines 102, 104, 106. The names and IP addresses of the host machines of the VFS 160, e.g., the host machines 102, 104, 106, may be stored in the name service 168 so that the user VMs may determine the IP address of each of the host machines 102, 104, 106, or FSVMs 162, 164, 166. The name of each VFS instance, e.g., FS1, FS2, or the like, may be stored in the name service 168 in association with a set of one or more names that contains the name(s) of the host machines 102, 104, 106 or FSVMs 162, 164, 166 of the VFS instance VFS 160. The FSVMs 162, 164, 166 may be associated with the host names ip-addr1, ip-addr2, and ip-addr3, respectively. For example, the file server instance name FS1.domain.com may be associated with the host names ip-addr1, ip-addr2, and ip-addr3 in the name service 168, so that a query of the name service 168 for the server instance name "FS1" or "FS1.domain.com" returns the names ip-addr1, ip-addr2, and ip-addr3. As another example, the file server instance name FS1.domain.com may be associated with the host names fsvm-1, fsvm-2, and fsvm-3. Further, the name service 168 may return the names in a different order for each name lookup request, e.g., using round-robin ordering, so that the sequence of names (or addresses) returned by the name service for a file server instance name is a different permutation for each query until all the permutations have been returned in response to requests, at which point the permutation cycle starts again, e.g., with the first permutation. In this way, storage access requests from user VMs may be balanced across the host machines, since the user VMs submit requests to the name service 168 for the address of the VFS instance for storage items for which the user VMs do not have a record or cache entry, as described below.

In particular embodiments, each FSVM may have two IP addresses: an external IP address and an internal IP address. The external IP addresses may be used by SMB/CIFS clients, such as user VMs, to connect to the FSVMs. The external IP addresses may be stored in the name service 168. The IP addresses ip-addr1, ip-addr2, and ip-addr3 described above are examples of external IP addresses. The internal IP addresses may be used for iSCSI communication to CVMs, e.g., between the ESN/Ms 162, 164, 166 and the CVMs 124, 132, 128. Other internal communications may be sent via the internal IP addresses as well, e.g., file server configuration information may be sent from the CVMs to the FSVMs using the internal IP addresses, and the CVMs may get file server statistics from the FSVMs via internal communication.

Since the VFS 160 is provided by a distributed cluster of FSVMs 162, 164, 166, the user VMs that access particular requested storage items, such as files or folders, do not necessarily know the locations of the requested storage items when the request is received. A distributed file system protocol, e.g., MICROSOFT DFS or the like, may therefore be used, in which a user VM 112 may request the addresses of FSVMs 162, 164, 166 from a name service 168 (e.g., DNS). The name service 168 may send one or more network addresses of FSVMs 162, 164, 166 to the user VM 112. The addresses may be sent in an order that changes for each subsequent request in some examples. These network addresses are not necessarily the addresses of the FSVM 164 on which the storage item requested by the user VM 112 is located, since the name service 168 does not necessarily have information about the mapping between storage items and FSVMs 162, 164, 166. Next, the user VM 112 may send an access request to one of the network addresses provided by the name service, e.g., the address of FSVM 164. The FSVM 164 may receive the access request and determine whether the storage item identified by the request is located on the FSVM 164. If so, the FSVM 164 may process the request and send the results to the requesting user VM 112. However, if the identified storage item is located on a different FSVM 166, then the FSVM 164 may redirect the user VM 112 to the FSVM 166 on which the requested storage item is located by sending a "redirect" response referencing FSVM 166 to the user VM 112. The user VM 112 may then send the access request to FSVM 166, which may perform the requested operation for the identified storage item.

A particular VFS 160, including the items it stores, e.g., files and folders, may be referred to herein as a VFS "instance" and may have an associated name, e.g., FS1, as described above. Although a VFS instance may have multiple FSVMs distributed across different host machines, with different files being stored on FSVMs, the VFS instance may present a single name space to its clients such as the user VMs. The single name space may include, for example, a set of named "shares" and each share may have an associated folder hierarchy in which files are stored. Storage items such as files and folders may have associated names and metadata such as permissions, access control information, size quota limits, file types, files sizes, and so on. As another example, the name space may be a single folder hierarchy, e.g., a single root directory that contains files and other folders. User VMs may access the data stored on a distributed VFS instance via storage access operations, such as operations to list folders and files in a specified folder, create a new file or folder, open an existing file for reading or writing, and read data from or write data to a file, as well as storage item manipulation operations to rename, delete, copy, or get details, such as metadata, of files or folders. Note that folders may also be referred to herein as "directories."

In particular embodiments, storage items such as files and folders in a file server namespace may be accessed by clients, such as user VMs, by name, e.g., "\Folder-1\File-1" and "\Folder-2\File-2" for two different files named File-1 and File-2 in the folders Folder-1 and Folder-2, respectively (where Folder-1 and Folder-2 are sub-folders of the root folder). Names that identify files in the namespace using folder names and file names may be referred to as "path names." Client systems may access the storage items stored on the VFS instance by specifying the file names or path names, e.g., the path name "\Folder-1\File-1", in storage access operations. If the storage items are stored on a share (e.g., a shared drive), then the share name may be used to access the storage items, e.g., via the path name "\\Share-1\Folder-1\File-1" to access File-1 in folder Folder-1 on a share named Share-1.

In particular embodiments, although the VFS may store different folders, files, or portions thereof at different locations, e.g., on different FSVMs, the use of different FSVMs or other elements of storage pool 156 to store the folders and files may be hidden from the accessing clients. The share name is not necessarily a name of a location such as an FSVM or host machine. For example, the name Share-1 does not identify a particular FSVM on which storage items of the share are located. The share Share-1 may have portions of storage items stored on three host machines, but a user may simply access Share-1, e.g., by mapping Share-1 to a client computer, to gain access to the storage items on Share-1 as if they were located on the client computer. Names of storage items, such as file names and folder names, may similarly be location-independent. Thus, although storage items, such as files and their containing folders and shares, may be stored at different locations, such as different host machines, the files may be accessed in a location-transparent manner by clients (such as the user VMs). Thus, users at client systems need not specify or know the locations of each storage item being accessed. The VFS may automatically map the file names, folder names, or full path names to the locations at which the storage items are stored. As an example and not by way of limitation, a storage item's location may be specified by the name, address, or identity of the FSVM that provides access to the storage item on the host machine on which the storage item is located. A storage item such as a file may be divided into multiple parts that may be located on different ESN/Ms, in which case access requests for a particular portion of the file may be automatically mapped to the location of the portion of the file based on the portion of the file being accessed (e.g., the offset from the beginning of the file and the number of bytes being accessed).

In particular embodiments, VFS 160 determines the location, e.g., FSVM, at which to store a storage item when the storage item is created. For example, a FSVM 162 may attempt to create a file or folder using a CVM 124 on the same host machine 102 as the user VM 114 that requested creation of the file, so that the CVM 124 that controls access operations to the file folder is co-located with the user VM 114. While operations with a CVM are described herein, the operations could also or instead occur using a hypervisor and/or container in some examples. In this way, since the user VM 114 is known to be associated with the file or folder and is thus likely to access the file again, e.g., in the near future or on behalf of the same user, access operations may use local communication or short-distance communication to improve performance, e.g., by reducing access times or increasing access throughput. If there is a local CVM on the same host machine as the FSVM, the FSVM may identify it and use it by default. If there is no local CVM on the same host machine as the FSVM, a delay may be incurred for communication between the FSVM and a CVM on a different host machine. Further, the VFS 160 may also attempt to store the file on a storage device that is local to the CVM being used to create the file, such as local storage, so that storage access operations between the CVM and local storage may use local or short-distance communication.

In some examples, if a CVM is unable to store the storage item in local storage of a host machine on which an FSVM resides, e.g., because local storage does not have sufficient available free space, then the file may be stored in local storage of a different host machine. In this case, the stored file is not physically local to the host machine, but storage access operations for the file are performed by the locally-associated CVM and FSVM, and the CVM may communicate with local storage on the remote host machine using a network file sharing protocol, e.g., iSCSI, SAMBA, or the like.

In some examples, if a virtual machine, such as a user VM 112, CVM 124, or FSVM 162, moves from a host machine 102 to a destination host machine 104, e.g., because of resource availability changes, and data items such as files or folders associated with the VM are not locally accessible on the destination host machine 104, then data migration may be performed for the data items associated with the moved VM to migrate them to the new host machine 104, so that they are local to the moved VM on the new host machine 104. FSVMs may detect removal and addition of CVMs (as may occur, for example, when a CVM fails or is shut down) via the iSCSI protocol or other technique, such as heartbeat messages. As another example, a FSVM may determine that a particular file's location is to be changed, e.g., because a disk on which the file is stored is becoming full, because changing the file's location is likely to reduce network communication delays and therefore improve performance, or for other reasons. Upon determining that a file is to be moved, VFS 160 may change the location of the file by, for example, copying the file from its existing location(s), such as local storage 136 of a host machine 102, to its new location(s), such as local storage 138 of host machine 104 (and to or from other host machines, such as local storage 140 of host machine 106 if appropriate), and deleting the file from its existing location(s). Write operations on the file may be blocked or queued while the file is being copied, so that the copy is consistent. The VFS 160 may also redirect storage access requests for the file from an FSVM at the file's existing location to a FSVM at the file's new location.

In particular embodiments, VFS 160 includes at least three File Server Virtual Machines (FSVMs) 162, 164, 166 located on three respective host machines 102, 104, 106. To provide high-availability, in some examples, there may be a maximum of one FSVM for a particular VFS instance VFS 160 per host machine in a cluster. If two FSVMs are detected on a single host machine, then one of the FSVMs may be moved to another host machine automatically in some examples, or the user (e.g., system administrator) may be notified to move the FSVM to another host machine. The user may move a FSVM to another host machine using an administrative interface that provides commands for starting, stopping, and moving FSVMs between host machines.

In some examples, two FSVMs of different VFS instances may reside on the same host machine. If the host machine fails, the FSVMs on the host machine become unavailable, at least until the host machine recovers. Thus, if there is at most one FSVM for each VFS instance on each host machine, then at most one of the FSVMs may be lost per VFS per failed host machine. As an example, if more than one FSVM for a particular VFS instance were to reside on a host machine, and the VFS instance includes three host machines and three FSVMs, then loss of one host machine would result in loss of two-thirds of the FSVMs for the VFS instance, which may be more disruptive and more difficult to recover from than loss of one-third of the FSVMs for the VFS instance.

In some examples, users, such as system administrators or other users of the system and/or user VMs, may expand the cluster of FSVMs by adding additional FSVMs. Each FSVM may be associated with at least one network address, such as an IP (Internet Protocol) address of the host machine on which the FSVM—resides. There may be multiple clusters, and all FSVMs of a particular VFS instance are ordinarily in the same cluster. The VFS instance may be a member of a MICROSOFT ACTIVE DIRECTORY domain, which may provide authentication and other services such as name service.

In some examples, files hosted by a virtualized file server, such as the VFS 160, may be provided in shares e.g., SMB shares and/or NFS exports. SMB shares may be distributed shares (e.g., home shares) and/or standard shares (e.g., general shares). NFS exports may be distributed exports (e.g., sharded exports) and/or standard exports ((e.g., non-sharded exports). A standard share may in some examples be an SMB share and/or an NFS export hosted by a single FSVM (e.g., FSVM 162, FSVM 164, and/or FSVM 166 of FIG. 1). The standard share may be stored, e.g., in the storage pool in one or more volume groups and/or vDisks and may be hosted (e.g., accessed and/or managed) by the single FSVM. The standard share may correspond to a particular folder (e.g., \\enterprise\finance may be hosted on one FSVM, \\enterprise\hr on another FSVM). In some examples, distributed shares may be used which may distribute hosting of a top-level directory (e.g., a folder) across multiple FSVMs. So, for example, \\enterprise\users\ann and \\enterprise\users\bob may be hosted at a first FSVM, while \\enterprise\users\chris and \\enterprise\users\dan are hosted at a second FSVM. In this manner a top-level directory (e.g., \\enterprise\users) may be hosted across multiple FSVMs. This may also be referred to as a sharded or distributed share (e.g., a sharded SMB share). As discussed, a distributed file system protocol, e.g., MICROSOFT DFS or the like, may be used, in which a user VM may request the addresses of FSVMs 162, 164, 166 from a name service (e.g., DNS).

Accordingly, systems described herein may include one or more virtual file servers, where each virtual file server may include a cluster of file server VMs and/or containers operating together to provide a file system. Examples of systems described herein may include a file analytics system that may collect, monitor, store, analyze, and report on various analytics associates with the virtual file server(s). By providing a file analytics system, system administrators may advantageously find it easier to manage their files stored in a distributed file system, and may more easily gain, understand, protect and utilize insights about the stored data and/or the usage of the file system over time. Examples of file analytics systems are described using an analytics virtual machine (an analytics VM), however, it is to be understood that the analytics VM may be implemented in various examples using one or more virtual machines and/or one or more containers. The analytics VM may be hosted on one of the computing nodes of the virtualized file system, or may be hosted on a computing node external to the virtualized file system.

The analytics VM 170 may retrieve, organize, aggregate, and/or analyze information corresponding to a file system. The information may be stored in an analytics datastore. The analytics VM 170 may query or monitor the analytics datastore to provide information to an administrator in the form of display interfaces, reports, and alerts/notifications. As shown in FIG. 1, the analytics VM 170 may be hosted on the computing node 102. Without departing from the scope of the disclosure, the analytics VM 170 may be hosted on any computing node, including the computing nodes 104 or 106, or a node external to the virtualized file server. In some examples, the analytics VM 170 may be provided as a hosted analytics system on a computing system and/or platform in communication with the VFS 160. For example, the analytics VM 170 may be provided as a hosted analytics system in the cloud—e.g., provided on one or more cloud computing platforms.

In some examples, the analytics VM 170 may perform various functions that are split into different containerized components using a container architecture and container manager. For example, the analytics VM 170 may include three containers—(1) a message bus (e.g., Kafka server), (2) an analytics data engine (e.g., Elastic Search), and (3) an API server, which may host various processes. During operation, the analytics VM 170 may perform multiple functions related to information collection, including a metadata collection process to receive metadata associated with the file system, a configuration information collection process to receive configuration and user information from the VFS 160, and an event data collection process to receive event data from the VFS 160.

The metadata collection process may include gathering the overall size and structure of the VFS 160, as well as details for each data item (e.g., file, folder, directory, share, etc.) in the VFS 160, and/or other metadata associated with the VFS 160. In some examples, the metadata collection process may use a snapshot of the overall VFS 160 to receive the metadata from the VFS 160 which represents a point in time state of files on the VFS 160, such as a snapshot provided by a disaster recovery application of the VFS 160. For example, the analytics VM 170 may mount a snapshot of the VFS 160 to scan the file system to retrieve metadata from the VFS 160. In some examples, the analytics VM 170 may communicate directly with each of the FSVMs 162, 164, 166 of the VFS 160 during the metadata collection process to retrieve respective portions of the metadata. In some examples, during the metadata scan, the VFS 160 and/or the analytics VM 170 may add a checkpoint or marker (e.g., index) after every completed metadata transaction to indicate where it left off. The checkpoint may allow the analytics VM 170 to return to the checkpoint to resume the scan should the scan be interrupted for some reason. Without the checkpoint, the metadata scan may start anew, creating duplicate metadata records in the events log that need to be resolved.

To capture configuration information, the analytics VM 170 may use an application programming interface (API)

architecture to request the configuration information from the VFS 160. The API architecture may include representation state transfer (REST) API architecture. The configuration information may include user information, a number of shares, deleted shares, created shares, etc. In some examples, the analytics VM 170 may communicate directly with the leader FSVM of the FSVMs 162, 164, 166 of the VFS 160 to collect the configuration information. In some examples, the analytics VM 170 may communicate directly with another component (e.g., application, process, and/or service) of the VFS 160 or of the distributed computing system 100 (e.g., one or more storage controllers, virtualization managers, the CVMs 124, 132, 128, the hypervisors 130, 132, 134, etc.) to collect the configuration information. In some examples, the analytics VM 170 may communicate directly with another component (e.g., application, process, and/or service) of the VFS 160 or another component of the distributed computing system 100, or in communication with the distributed computing system 100 (e.g., computing node an administrative system, a storage controller, the CVMs 124, 132, 128, the hypervisors 130, 132, 134, etc.) to collect the configuration information.

To capture event data, the analytics VM 170 may interface with the VFS 160 using a messaging system (e.g., publisher/subscriber message system) to receive event data for storage in the analytics datastore. That is, the analytics VM 170 may subscribe to one or more message topics related to activity of the VFS 160. The VFS 160 may include an audit framework with a connector publisher that is configured to publish the event data for consumption by the analytics VM 170. The CVMs 124, 126, 128 (and/or hypervisors or other containers) may host a message service configured to route messages between publishers and subscribers/consumers over a message bus. The event data may include data related to various operations performed with the VFS 160, such as adding, deleting, moving, modifying, etc., a file, folder, directory, share, etc., within the VFS 160. The event information may indicate an event type (e.g., add, move, delete, modify, a user associated with the event, an event time, etc. In some examples, once an event is written to the analytics datastore, it is not able to be modified. In some examples, the analytics VM 170 may be configured to aggregate multiple events into a single event for storage in the analytics datastore 190. For example, if a known task (e.g., moving a file) results in generation of a predictable sequence of events, the analytics VM 170 may aggregate that sequence into a single event.

In some examples, the analytics VM 170 and/or the corresponding VFS 160 may include protections to prevent event data from being lost. In some examples, the VFS 160 may store event data until it is consumed by the analytics VM 170. For example, if the analytics VM 170 (e.g., or the message system) becomes unavailable, the VFS 160 may persistently store the event data until the analytics VM 170 (e.g., or the message system) becomes available.

To support the persistent storage, and well as provision of the event data to the analytics VM 170, the FSVMs 162, 164, 166 of the VFS 160 may each include the audit framework that includes a dedicated event log (e.g., tied to a FSVM-specific volume group) that is capable of being scaled to store all event data and/or metadata for a particular FSVM until successfully sent to the analytics VM 170. In some examples, the audit framework for each FSVM 162, 164, 166 may be hosted by another component (e.g., application, process, and/or service) of the VFS 160 or another component of the distributed computing system or in communication with the distributed computing system 100 (e.g., a computing node, an administrative system, a storage controller, the CVMs 124, 132, 128, the hypervisors 130, 132, 134, etc.)

The audit framework may include an audit queue, an event logger, an event log, and a service connector. The audit queue may be configured to receive event data and/or metadata from the VFS 160 via network file server or server message block server communications, and to provide the event data and/or metadata to the mediator. The event logger may be configured to store the received event data and/or metadata from the audit queue, as well as retrieve requested event data and/or metadata from the event log in response to a request from the service connector. The service connector may be configured to communicate with other services (e.g., such as a message topic broker of the analytics VM 170) to respond to requests for provision of event data and/or metadata, as well as receive acknowledgments when event data and/or metadata are successfully received by the analytics VM 170. The events in the event log may be uniquely identified by a monotonically increasing sequence number, will be persisted to an event log and will be read from it when requested by the service connector.

The event logger may coordinate all of the event data and/or metadata writes and reads to and from the event log, which may facilitate the use of the event log for multiple services. The event logger may keep the in-memory state of the write index in the event log, and may persist it periodically to a control record (e.g., a master block). When the audit framework is started or restarted, the master record may be read to set the write index.

Multiple services may be able to read from event log via their own service connectors (e.g., Kafka connectors). A service connector may have the responsibility of sending event data and metadata to the requesting service (e.g., such as the message topic broker of the analytics VM 170) reliably, keeping track of its state, and reacting to its failure and recovery. Each service connector may be tasked with persisting its respective read index, as well as being able to communicate the respective read index to the event logger when initiating an event read. The service connector may increment the in-memory read index only after receiving acknowledgement from its corresponding service and will periodically persist in-memory state. The persisted read index value may be read at start/restart and used to set the in-memory read index to a value from which to start reading from.

During service start/recovery, service connector may detect its presence and initiate an event read by communicating the read index to the event logger to read from the event log as part of the read call. The event logger may use the read index to find the next event to read and send to the requesting service (e.g., message topic broker of the analytics VM 170) via the service connector.

The analytics VM 170 and/or the VFS 160 may further include architecture to prevent and/or reduce the incidence of event data from being processed out of chronological order. For example, the service connector and/or the requesting service may keep track of message sequence number it has seen before failure, and may ignore any messages which have sequence number less than and equal to the sequence it has seen before failure. An exception may be raised by the message topic broker of the requesting service if the event log does not have the event for the sequence number expected by the service connector or if the message topic broker indicates that it has received a message with a sequence number that is not consecutive. In order to use the same event log for other services, a superset of all the proto fields will be taken to create a common format for event record. The service connector will be responsible for filtering the required fields to get the ones it needs.

As previously discussed, the audit framework and event log may be tied to a particular FSVM in its own volume group. Thus, if a FSVM is migrated to another computing node, the event log may move with the FSVM and be maintained in the separate volume group from event logs of other FSVMs.

In some examples, the VFS 160 may be configured with denylist policies to denylist or prevent certain types of events from being analyzed and/or sent to the analytics VM 170, such as specific event types, events corresponding to a particular user, events corresponding to a particular client IP address, events related to certain file types, or any combination thereof. The denylisted events may be provided from the VFS 160 to the analytics VM 170 in response to an API call from the analytics VM 170. In addition, the analytics VM 170 may include an interface that allows a user to request and/or update the denylist policy, and send the updated denylist policy to the VFS 160. In some examples, the analytics VM 170 may be configured to process multiple channels of event data in parallel, while maintaining integrity and sequencing of the event data such that older event data does not overwrite newer event data.

In some examples, the analytics VM 170 may perform the metadata collection process in parallel with receipt of event data via the messaging system. The analytics VM 170 may reconcile information captured via the metadata collection process with event data information to prevent older data from overwriting newer data. In cases of reconciliation of the file system state caused by triggering an on demand scan, the state of the files index may be updated by both the event flow process and the scan process. To avoid the race condition, and maintain data integrity, when a metadata record corresponding to a storage item is received, the events processor may determine if any records for the storage item exist, and if so, may decline to update those records. If no records exist, then the events processor may add a record for the storage item.

The analytics VM 170 may process the metadata, the event data, and the configuration information to populate the analytics datastore 190. The analytics datastore 190 may include an entry for each item in the VFS 160. In some examples, the event data and the metadata may include a unique user identifier that ties back to a user, but is not used outside of the event data generation. In some examples, the analytics VM 170 may retrieve a user ID-to-username relationship from an active directory of the VFS 160 by connecting to a lightweight directory access protocol (LDAP) (e.g., for SMB, perform LDAP search on configured active directory, or on NFS, perform PDAP search on configured active directory or execute an API call if RFC2307 is not configured). In addition, rather than requesting a username or other identifier associated with the unique user identifier for every event, the analytics VM 170 may maintain a username-to-unique user identifier conversion table (e.g., stored in cache) for at least some of the unique user identifiers, and the username-to-unique user identifier conversion table may be used to retrieve a username, which may reduce traffic and improve performance of the VFS 160. Any to provide user context for active directory enabled SMB shares may help an administrator understand which user performed which operation as well as ownership of the file.

The analytics VM 170 may generate reports, including standard or default reports and/or customizable reports. The reports may be related to aggregate and/or specific user activity; aggregate file system activity; specific file, directory, share, etc., activity; etc.; or any combination of thereof. If multiple report requests are submitted at a same time and/or during at least partially overlapping times, examples of the analytics VM may queue report requests and process the requests sequentially and/or partially sequentially. The status of report requests in the queue may be displayed (e.g., queued, processing, completed). In some examples, the analytics VM 170 may manage and facilitate administrator-set archival policies, such as time-based archival (e.g., archive data based on a last-accessed data being greater than a threshold), storage capacity-based archival (e.g., archiving certain data when available storage falls below a threshold), or any combination thereof.

In some examples, the analytics VM 170 may be configured to analyze the received event data to detect irregular, anomalous, and/or malicious activity within the file system. For example, the analytics VM 170 may detect malicious software activity (e.g., ransomware) or anomalous user activity (e.g., deleting a large amount of files, deleting a large share, etc.).

In some examples, in order to obtain metadata and/or events data regarding the file server, the analytics VM 170 may mount one or more shares managed by the VFS 160 and/or snapshots of shares managed by the VFS 160. Recall that in some examples shares may be sharded (e.g., distributed across multiple FSVMs). A distributed file protocol, e.g., DFS, may be used to obtain a collection of FSVM IDs (e.g., IP addresses) to be mounted to access the full share. However, in some examples, the analytics VM 170 may be implemented using a Linux client or other client that may not support DFS referrals or other distributed file protocol to obtain identification of which FSVMs host which files (e.g., which shares). Typically, files may be sharded across multiple FSVMs based on their top-level directory (e.g., an initial folder such as \\enterprise\hr in the file system may include files and/or lower level folders stored across multiple FSVMs).

Accordingly, if a share hosted by FSVM 166 is mounted, the analytics VM 170 may identify all folders (e.g., top-level directories), but not all data may be seen as some of the data may be hosted on other FSVMs. In some examples, the analytics VM 170 may identify top-level directories are on which FSVMs and traverse those directories. So, for example, the analytics VM 170 may identify that FSVM 166 and FSVM 164 may host a particular top-level directory, and in order to scan metadata for that top-level directory, both FSVMs may be accessed and scanned. In this manner, all data in the top-level directory (e.g., across a distributed SMB share) may be scanned by the analytics VM 170, even without use of a DFS Referral.

Figure 2A:
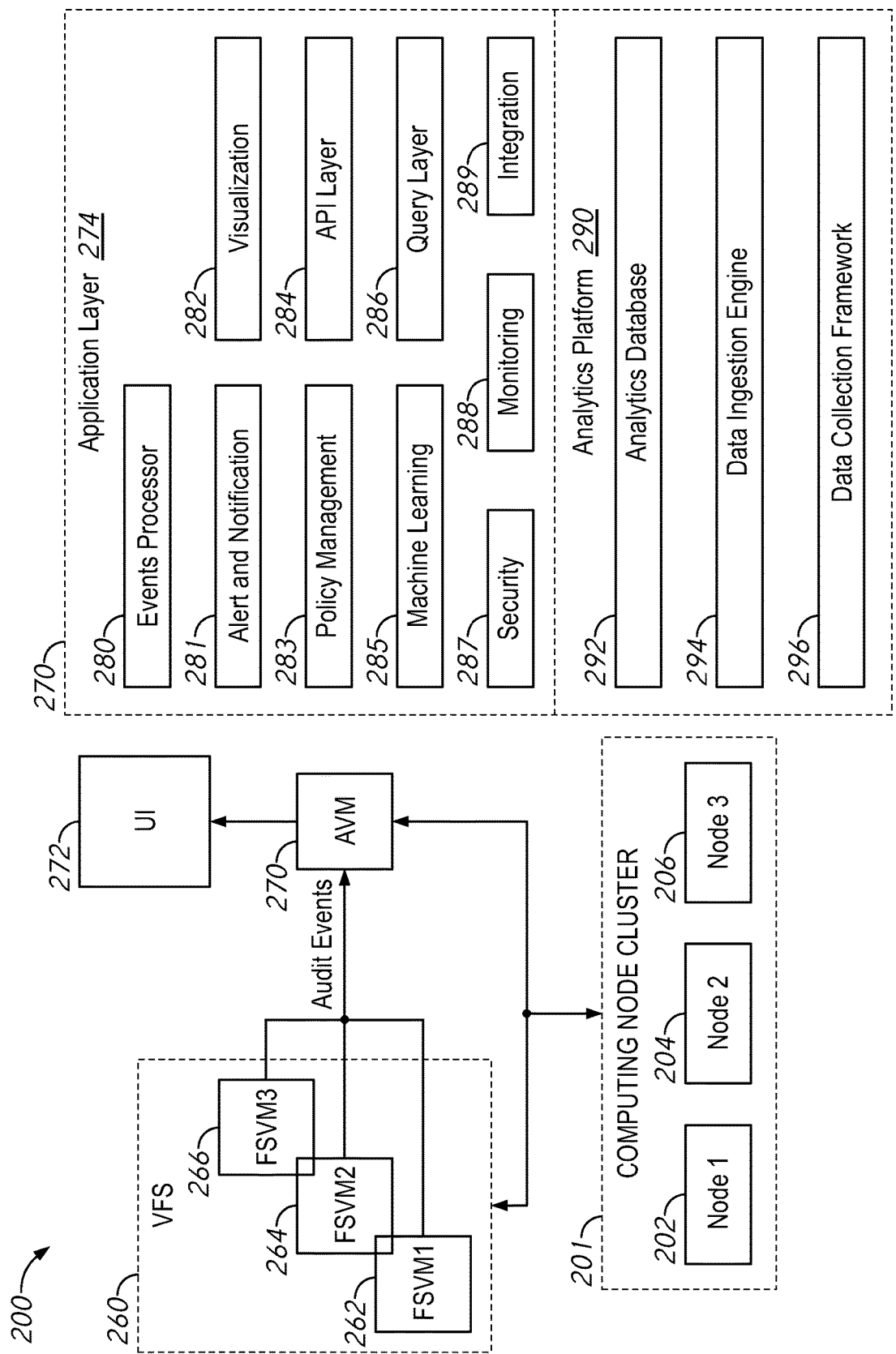
FIG. 2A is a schematic illustration of a clustered virtualization environment implementing a virtualized file server and a file analytics system according to particular embodiments.

FIG. 2A illustrates a clustered virtualization environment 200 implementing a virtualized file server (VFS) 260 and an analytics VM 270 according to particular embodiments according to particular embodiments. The analytics VM 270 may retrieve, organize, aggregate, and/or analyze information corresponding to the VFS 260 in an analytics datastore. The VFS 160 and/or the analytics VM 170 of FIG. 1 may be used to implement the VFS 260 and/or the analytics VM 270, respectively. The architecture of FIG. 2A can be implemented using a distributed platform that contains a cluster 201 of multiple host machines 202, 204, and 206 that manage a storage pool, which may include multiple tiers of storage. While the analytics VM 270 is shown as part of the clustered virtualization environment 200, in some examples the analytics VM 270 may be provided as a hosted cloud solution, e.g., provided by one or more cloud computing platforms and in communication with the clustered virtualization environment 200, e.g., with the VFS 260.

Each host machine 202, 204, 206 may run virtualization software which may create, manage, and destroy user VMs and/or containers, as well as managing the interactions between the underlying hardware and user VMs.

In particular embodiments, the VFS 260 provides file services to user VMs, such as storing and retrieving data persistently, reliably, and efficiently. The VFS 260 may include a set of FSVMs 262, 264, and 266 that execute on host machines 202, 204, and 206 and process storage item access operations requested by user VMs.

The analytics VM 270 may include an application layer 274 and an analytics platform 290. The application layer 274 may include components such an events processor 280, an alert and notification component 281, a visualization component 282, a policy management component 283, an API layer 284, a machine learning component 285, a query layer 286, a security layer 287, a monitoring layer 288, and an integration layer 289. Each layer may be implemented using software which may perform the described functions and may interact with other layers.

In some examples, the analytics platform 290, leveraging components of the application layer 274 may perform various functions that are split into different containerized components using a container architecture and container manager (e.g., an analytics datastore 292, a data ingestion engine 294, and a data collection framework 296). The integration layer 289 may integrate various components of the application layer 274 with components of the analytics platform 290.

During operation, the analytics VM 270 may perform multiple processes related to information collection, including a metadata collection process to receive metadata associated with the file system, a configuration information collection process to receive configuration and user information from the VFS 260, and an event data collection process to receive event data from the VFS 260. The data collection framework 296 may manage the metadata collection process and the configuration information collection process and the data ingestion engine 294 may manage capturing the event data.

The metadata collection process may include gathering the overall size and structure of the VFS 260, as well as details for each data item (e.g., file, folder, directory, share, etc.) in the VFS 260. In some examples, the metadata collection process may use a snapshot of the overall VFS 260 to receive the metadata, such as a snapshot provided by a disaster recovery application of the VFS 260. For example, the analytics VM 270 may mount a snapshot of the VFS 160 to scan the file system to retrieve metadata from the YES 260. In some examples, the analytics VM 270 via the data collection framework 296 may communicate directly with each of the FSVMs 262, 264, 266 of the VFS 260 during the metadata collection process to retrieve respective portions of the metadata. In some examples, during the metadata scan, the VFS 260 and/or the analytics VM 270 may add a checkpoint or marker after every completed metadata transaction to indicate where it left off. The checkpoint may allow the analytics VM 270 to return to the checkpoint to resume the scan should the scan be interrupted for some reason. Without the checkpoint, the metadata scan may start anew, creating duplicate metadata records in the events log that need to be resolved.

To capture configuration information, the analytics VM 270 via the data collection framework 296 and the API layer 284 may use an application programming interface (API) architecture to request the configuration information from the VFS 160. The API architecture may include representation state transfer (REST) API architecture. The configuration information may include user information, a number of shares, deleted shares, created shares, etc. In some examples, the analytics VM 170 may communicate directly with a leader FSVM of the FSVMs 262, 264, 266 of the VFS 260 to collect the configuration information. In some examples, the analytics VM 270 may communicate directly with another component (e.g., application, process, and/or service) of the VFS 260 or of the clustered virtualization environment 200 (e.g., virtualization managers, storage controllers, computing nodes, administrative systems, CVMs, hypervisors, etc.) to collect the configuration information. In some examples, the analytics VM 270 may communicate directly with another component (e.g., application, process, and/or service) of the VFS 260 or another component of the clustered virtualization environment or in communication with the clustered virtualization environment 200 (e.g., a computing node, an administrative system, virtualization manager, storage controller, CVMs, hypervisors, etc.) to collect the configuration information.

To capture event data (e.g., audit events), the analytics VM 270 via the data ingestion engine 294 may interface with the VFS 260 using a messaging system (e.g., publisher/subscriber message system) to receive event data via a message bus for storage in the analytics datastore 292. That is, the data ingestion engine 294 may subscribe to one or more message topics related to activity of the VFS 260, and the monitoring layer 288 may monitor the message bus for audit events published by the VFS 260. The VFS 260 may include a connector publisher that is configured to publish the event data for consumption by the data collection framework 296. The event data may include data related to various operations performed with the VFS 260, such as adding, deleting, moving, modifying, etc., a file, folder, directory, share, etc., within the VFS 260. The event information may indicate an event type (e.g., add, move, delete, modify, a user associated with the event, an event time, etc. The events processor 280 may process the received data to create a record to be placed in the analytics datastore 292. In some examples, once an event is written to the analytics datastore 292, it is not able to be modified.

In some examples, the data collection framework 296 may be configured to aggregate multiple events into a single event for storage in the analytics datastore 292. For example, if a known task (e.g., moving a file) results in generation of a predictable sequence of events, the data collection framework 296 may aggregate that sequence into a single event.

In some examples, the analytics VM 270 and/or the corresponding VFS 260 may include protections to prevent and/or reduce the incidence of event data from being lost. In some examples, the VFS 260 may store event data until it is consumed by the analytics VM 270. For example, if the analytics VM 270 (e.g., or the message system) becomes unavailable, the VFS 260 may store the event data until the analytics VM 270 (e.g., or the message system) becomes available.

To support the persistent storage, and well as provision of the event data to the analytics 270, the FSVMs 262, 264, 266 of the VFS 260 may each include an audit framework that includes a dedicated event log (e.g., tied to a FSVM-specific volume group) that is capable of being scaled to store all event data and/or metadata for a particular FSVM until successfully sent to the analytics VM 270. In some examples, the audit framework may be hosted by another (e.g., other than the FSVMs 262, 264, 266) component (e.g., application, process, and/or service) of the VFS 160 or another component of the distributed computing system or in communication with the distributed computing system 100 (e.g., administrative system, virtualization manager, storage controller(s), the CVMs 124, 132, 128, the hypervisors 130, 132, 134, etc.) without departing from the scope of the disclosure. The audit framework may include an audit queue, an event logger, an event log, and a service connector. The audit queue may be configured to receive event data and/or metadata from the VFS 260 via network file server or server message block server communications, and to provide the event data and/or metadata to the mediator. The event logger may be configured to store the received event data and/or metadata from the audit queue, as well as retrieve requested event data and/or metadata from the event log in response to a request from the service connector. The service connector may be configured to communicate with other services (e.g., such as a message topic broker of the analytics VM 270) to respond to requests for provision of event data and/or metadata, as well as receive acknowledgments when event data and/or metadata are successfully received by the analytics VM 270. The events in the event log may be uniquely identified by a monotonically increasing sequence number, will be persisted to an event log and will be read from it when requested by the service connector.

The event logger may coordinate all of the event data and/or metadata writes and reads to and from the event log, which may facilitate the use of the event log for multiple services. The event logger may keep the in-memory state of the write index in the event log, and may persist it periodically to a control record (e.g., a master block). When the audit framework is started or restarted, the master record may be read to set the write index.

Multiple services may be able to read from event log via their own service connectors (e.g., Kafka connectors). A service connector may have the responsibility of sending event data and metadata to the requesting service (e.g., such as the message topic broker of the analytics VM 270) reliably, keeping track of its state, and reacting to its failure and recovery. Each service connector may be tasked with persisting its respective read index, as well as being able to communicate the respective read index to the event logger when initiating an event read. The service connector may increment the in-memory read index only after receiving acknowledgement from its corresponding service and will periodically persist in-memory state. The persisted read index value may be read at start/restart and used to set the in-memory read index to a value from which to start reading from.

During service start recovery, service connector may detect its presence and initiate an event read by communicating the read index to the event logger to read from the event log as part of the read call. The event logger may use the read index to find the next event to read and send to the requesting service (e.g., message topic broker of the analytics VM 270) via the service connector.

The analytics VM 270 and/or the VFS 260 may further include architecture to prevent event data from being processed out of chronological order. For example, the service connector and/or the requesting service may keep track of message sequence number it has seen before failure, and may ignore any messages which have sequence number less than and equal to the sequence it has seen before failure. An exception may be raised by the message topic broker of the requesting service if the event log does not have the event for the sequence number expected by the service connector or if the message topic broker indicates that it has received a message with a sequence number that is not consecutive. In order to use the same event log for other services, a superset of all the proto fields will be taken to create a common format for event record. The service connector will be responsible for filtering the required fields to get the ones it needs.

As previously discussed, the audit framework and event log may be tied to a particular FSVM in its own volume group. Thus, if a FSVM is migrated to another computing node, the event log may move with the FSVM and be maintained in the separate volume group from event logs of other FSVMs.

In some examples, the data collection framework 296 via the events processor 280 may be configured to process multiple channels of event data in parallel, while maintaining integrity of the event data such that older event data does not overwrite newer event data.

In some examples, the data ingestion engine 294 and the data collection framework 296 may perform the metadata collection process in parallel with receipt of event data via the messaging system. The events processor 280 may reconcile information captured via the metadata collection process with event data information to prevent older data from overwriting newer data.

The events processor 280 may process the metadata, the event data, and the configuration information to populate the analytics datastore 292. The analytics datastore 292 may include an entry or record for each item in the NTS 260, as well as a record for each audit event. In some examples, the event data may include a unique user identifier that ties back to a user, but is not used outside of the event data generation. In sonic examples, the analytics VM 270 ma retrieve a user ID-to-username relationship from an active directory by connecting to a lightweight directory access protocol (MAP). In addition, than requesting a username or other identifier associated with the unique user identifier for every event, the events processor 280 may maintain a username-to-unique user identifier conversion table (e.g., stored in cache) for at least some of the unique user identifiers, and the username-to-unique user identifier conversion table may be used to retrieve a username, which may reduce traffic and improve performance of the VFS 260.

In this manner, the analytics datastore 292 may provide up-to-date information about the virtualized file server. The information may be current because it may reflect events, as they occur and are reported from the virtualized file server through the events pipeline. In this manner, file analytics systems described herein may provide real-time reporting e.g., reports and/or view of the data of the file server which include changes which may have occurred within the last 1 second, 1 minute, 1 hour, and/or other time periods. It may not be necessary, for example, to conduct a full metadata scrape and/or process a bulk amount of data changes before accurate analytics may be reported. Instead, file analytics systems described herein may continuously update their data store based on events as reported by the virtualized file system.

The events processor 280, the visualization component 282, and the query layer 286 may generate reports for presentation via the user interfaces 272, including standard or default reports and/or customizable reports. The reports may be related to aggregate and/or specific user activity; aggregate file system activity; specific file, directory, share, etc., activity; etc.; or any combination of thereof.

In some examples, the user interface 272 may be implemented using one or more web applications. The user interface 272 may communicate with the AVM 270, e.g., with a gateway instance provided by the AVM 270. For example, the API layer 284 (e.g., API server present in a container running on AVM 270) may provide a gateway which may communicate with the user interface 272. The API layer may fetch information, e.g., from the analytics database 292, responsive to requests received from the user interface 272, and may return responsive data to the user interface 272. For example, the user interface 272 may be implemented using a web application which may include a variety of widgets e.g., user interface elements. For example, a text box may allow a requester to search for files by name, search for users by name, and/or conduct other searches.

In some examples, monitoring of analytics components is provided, e.g., using monitoring 288 of FIG. 2A. Note that many containers may be provided in the analytics VM 270. Multiple services may be running in the containers. The monitoring service 288 may monitor the status and/or health of services running in the analytics VM 270. The monitoring service 288 may monitor containers and identify whether service is running or not. Beyond the status of the service and the containers, examples of monitoring service 288 may monitor details of the health of the various services running in the containers (e.g., whether the data ingestion engine 294, the analytics database 292, the events pipeline shown in FIG. 3A, or other services provided by the AVM 270 are operating properly, including but not limited to one or more Kafka services and/or elasticsearch databases described herein). Typically, a specific ping call may need to be made to the service to determine if the service is running properly.

However, the monitoring service 288 may be plugged into each of multiple file analytics components (e.g., data ingestion engine 294, the analytics database 292, the data collection framework 296) and additionally monitor the performance of each component separately. For example, the monitoring service 288 may utilize APIs available on multiple components to obtain monitoring and/or health information (e.g., an API for a Kafka server and/or an elasticsearch or other database engine). The monitoring service 288 may provide an output (e.g., a JSON file in some examples) that reports the health of the whole system (e.g., health of containers, whether services are running, and additionally whether the services are operating as intended). Normally would need a ping call to the service to determine if the service was working properly, however the monitoring service 288 is able to monitor the containers, the fact that the services are operating, and also the internal health of the services.

Accordingly, the monitoring service 288 may monitor the entire stack from the infra layer to the application layer—e.g., all components as shown as included in the analytics VM 270. The monitoring service 288 may communicate with one or more other monitoring services (e.g., services used to monitor the VFS 260). In this manner, a single view may be obtained of the health of the VFS 260 and the analytics system.

In some examples, the monitoring service 288 accordingly may provide the storage utilization and/or memory and/or processing utilization (e.g., CPU utilization) for the analytics VM 270, including multiple (e.g., all) of its components. This utilization information may be provided to a monitoring service also monitoring the VFS 260 for utilization metrics such that platform resources may be allocated appropriately as between the analytics VM 270 and other components of the VFS 260.

In order to facilitate monitoring without unduly disrupting service operation, services running on the analytics system (e.g., analytics VM 270) may have an embedded remote procedure call (RPC) service. The embedded RPC service may, for example, provide a separate thread for the service that is monitoring the health of the main process thread. In some examples, the separate monitoring thread may collect particular health information—e.g., number of connections, number of requests being services, CPU utilization, and memory utilization. The monitoring service 288 may call the embedded RPC service in the processes to obtain monitoring information in some examples. This may minimize and/or reduce disruption to the operation of the services. Accordingly, the monitoring service 288 may make API calls to some services to obtain monitoring information, and may make calls to embedded RPC services for other components.

Examples of monitoring and/or health information which may be collected by the monitoring service 288 include, but are not limited to, a number of documents, number of events, and/or number of users in a file system (e.g., in VFS 260). The overall health of the file analytics system. In some examples health and monitoring information may be reported and/or displayed e.g., using UI 272 of FIG. 2A, A positive indicator (e.g., green light or text) may be displayed when all the monitored services and containers are running. A medium indicator (e.g., yellow light or text) may be displayed when at least one service is down and/or a resource is beyond a threshold. A negative indicator (e.g., red light or text) may be displayed when at least one monitored container is down and/or more than one service is down. Monitoring indicators may be displayed for monitored containers—e.g., a database container (e.g., elasticsearch), a data ingestion container (e.g., Kafka container), and/or an API container (e.g., gateway container and/or data analytics framework). In some examples, resource utilization may be monitored by monitoring service 288 including host CPU and memory utilization of one or more of the computing nodes in VFS 260 for example. Memory utilization of one or more data ingestion processes (e.g., Kafka servers) may be monitored. Processor, memory, and/or buffer cache utilization of a database container (e.g., elasticsearch) may be monitored.

Some monitored parameters may be based on a latest run on the monitoring service 288 (e.g., latest API and/or RPC call). Those may include number of documents, number of events, number of users, overall health of file analytics, health for individual containers, and/or service health. Other monitored parameters may be based on data accumulated from multiple runs (e.g., host CPU and memory utilization, disk usage, volume group usage, database CPU, memory and buffer cache utilization, data ingestion engine memory utilization). In some examples, the monitoring service 288 may query containers and/or services periodically, e.g., every 10 seconds in some examples. Monitoring data may be stored in one or more databases, such as in analytics database 292 of FIG. 2A and/or analytics datastore 320 of FIG. 3A.

The monitoring service 288 may include multiple monitors (e.g., monitoring processes) in some examples. For example, a host resource monitor, a container resource monitor, and a container and/or service status monitor may be included in monitoring service 288 in some examples. The host resource monitor may be used to obtain current resource utilization (e.g., CPU, memory, disk, volume group) of a host file system e.g., VFS 260, which may include the analytics VM 270 itself in some examples. The container resource monitor may obtain current resource utilization (e.g., CPU, memory, and/or buffer cache utilization) of containers, such as a data ingestion engine container (e.g., data ingestion engine 294, which may be or include a Kafka server), and/or a database container (e.g., elasticsearch container), such as analytics database 292. The container and/or service status monitor may obtain the current status of the monitored containers (e.g., running and/or not running) and the status of services running inside the containers. In some examples, the consolidated health data obtained by the monitoring service 288 may be stored in a single document format (e.g., elasticsearch document, JSON).

In some examples, the monitoring service 288 may generate an alert when a comparison of resource usage for a component with a threshold is unfavorable (e.g., when disk usage is over 75 percent, when CPU usage is over 90 percent, when available memory is under 10 percent, although other threshold values may also be used). In some examples, however, resource usage may compare unfavorably with a threshold for a period of time, and it may not be desirable to raise an alert.

Accordingly, in some examples an alert may not be provided by the monitoring service until after an elapsed period of time (e.g., 15 minutes), and a re-check of the resource usage which still results in an unfavorable comparison to threshold. In some examples, the monitoring service may maintain a log (e.g., a dictionary) of the resource name and resource usage value for the past several runs of the monitoring service (e.g., five runs). Only when the values for all several runs (e.g., all five runs) or some percentage of the runs compare unfavorably with a threshold will an alert be raised. The log (e.g., dictionary) may be stored, for example, in the datastore 320 of FIG. 3A.

Figure 2B:
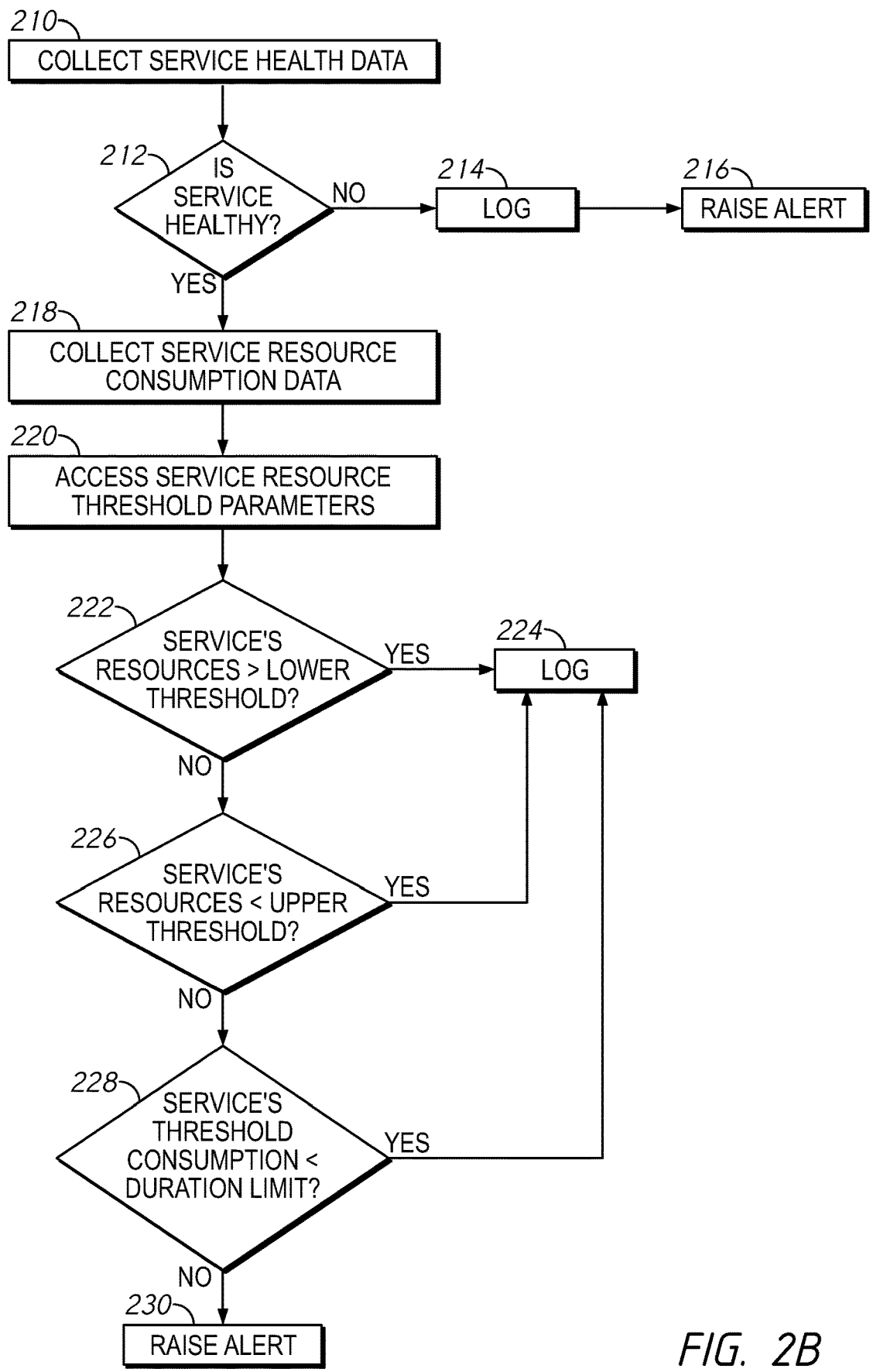
FIG. 2B is an example procedure which may be implemented by a monitoring process to raise alerts in accordance with examples described herein.

FIG. 2B is an example procedure which may be implemented by monitoring process 288 to raise alerts. The monitoring process 288 may collect health data on or more containers and/or services in block 210. The health data may indicate whether or not the service is not healthy (e.g., running or operational). The monitoring process 288 may analyze the health data in block 212 to ascertain whether the service is healthy. If the service is not healthy (e.g., the health data indicates the service is not running or operational), the lack of health may be logged by the analytics VM (e.g., the monitoring process 288) in block 214, and an alert raised in block 216 (e.g., the analytics VM, such as using monitoring process 288, may display an alert, or may email, text, or otherwise report an alert).

If the service is healthy, the monitoring process 288 may collect resource consumption data for the service (e.g., CPU usage, memory usage, disk usage, volume group usage, etc.) in block 218. Resource threshold parameters may also be accessed in block 220 (e.g., the monitoring process may access threshold parameters from a configuration and/or profile file accessible to the monitoring service). The resource threshold parameters may include, for example, a lower threshold, an upper threshold, and/or a duration limit. If the service's resource usage is greater than the lower threshold. (e.g., checked by the monitoring process in block 222), the status may be logged in block 224. If the service's resource usage are less than the upper threshold (e.g., checked by the monitoring process in block 226, the status may be logged in block 224. While the checks against the lower threshold and upper threshold are shown as consecutive blocks 222 and 226 in FIG. 2B, it is to be understood that the checks could happen in either order. In some examples, the block 222 and block 226 may happen wholly and/or partially simultaneously. If the service's resources are less than the lower threshold and/or greater than the upper threshold, however, the monitoring service may evaluate, e.g., in block 228, whether the consumption has been over a threshold for less than the duration limit. If the consumption has been unfavorable relative to a threshold for less than a duration limit, the situation may be logged in block 224. However, if the consumption has been unfavorable relative to a threshold for more than a duration limit, an alert may be raised (e.g., an alert may be displayed, emailed, texted, or otherwise reported) in block 230.

Figure 3A:
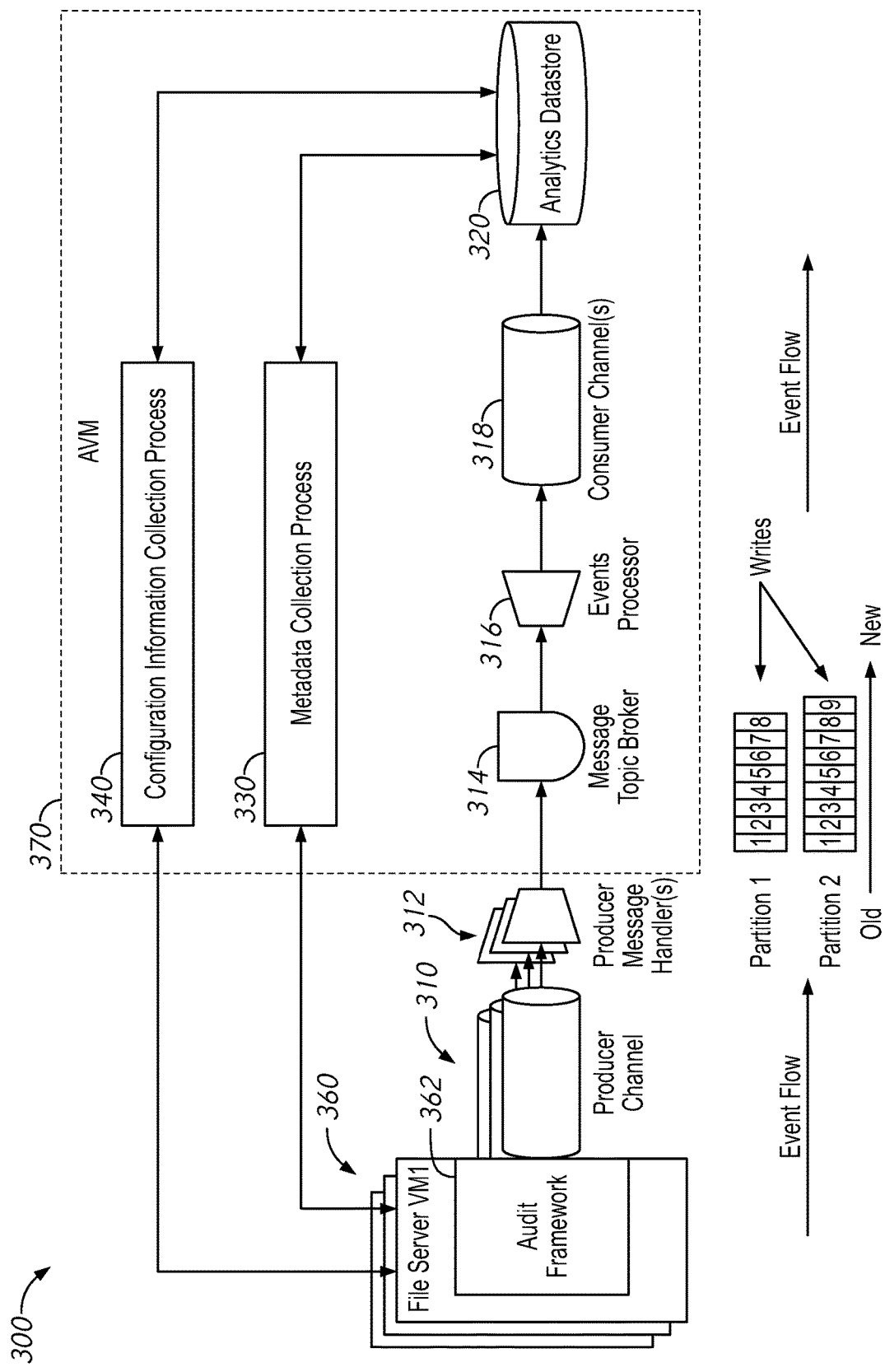
FIG. 3A is a schematic illustration of a system including a flow diagram for ingestion of information from a virtualized file server (VFS) by an analytics virtual machine according to particular embodiments.

FIG. 3A illustrates a flow diagram 300 associated with ingestion of information from a virtualized file server (VFS) file system 360 by a analytics VM 370 according to particular embodiments. The analytics VM 370 may to retrieve, organize, aggregate, and/or analyze information corresponding to the VFS file system 360 in an analytics datastore 320. The VFS 160 and/or the analytics VM 170 of FIG. 1 and/or the VFS 260 and/or the analytics VM 270 of FIG. 2 may implement the VFS file system 360 and/or the analytics VM 370, respectively. The architecture of FIG. 3A can be implemented using a distributed platform that contains a cluster of multiple host machines that manage a storage pool, which may include multiple tiers of storage. In some examples, the analytics VM 370 may be hosted by one or more of the cluster of multiple host machines. In some examples, the analytics VM 370 may be provided by a computing system in communication with the cluster of multiple host machines. In some examples, the analytics VM 370 may be provided as a hosted cloud solution, e.g., provided on a cloud computing platform and configured for communication with a the VFS 360.

As shown in the flow diagram 300, the FSVM1-N of the VFS 360 may each include an audit framework 362 to provide a pipeline for audit events that flow from each of the FSVM1-N through the message system (e.g., a respective producer channel(s) 310, a respective producer message handler(s) 312, and a message broker 314) to an events processor 316 (e.g., a consumer message handler) and a consumer channel 318 of the analytics VM 370.

The audit framework 362 of each of the FSVM1-N may be configured to support the persistent storage of audit events within the VFS 360, and well as provision of the event data to the analytics VM 370. The audit framework 362 may each include a dedicated event log (e.g., tied to a FSVM-specific volume group) that is capable of being scaled to store all event data and/or metadata for a particular FSVM until successfully sent to the analytics VM 370. In some examples, while the audit framework 362 is depicted as being part of the FSVM1, the audit framework 762 may be hosted by another component (e.g., application, process, and/or service) of the VFS 360 or another component of the distributed computing system or in communication with the distributed computing system 300 (e.g., computing node, administrative system, virtualization manager, storage controllers, CVMs, hypervisors, managers, etc.). The audit framework may include an audit queue, an event logger, an event log, and a service connector. The audit queue may be configured to receive event data and/or metadata from the VFS 360 via network file server or server message block server communications, and to provide the event data and/or metadata to the mediator. The event logger may be configured to store the received event data and/or metadata from the audit queue, as well as retrieve requested event data and/or metadata from the event log in response to a request from the service connector. The service connector may be configured to communicate with other services (e.g., such as a message topic broker 314) to respond to requests for provision of event data and/or metadata, as well as receive acknowledgments when event data and/or metadata are successfully received by the analytics VM 370. The events in the event log may be uniquely identified by a monotonically increasing sequence number, will be persisted to an event log and will be read from it when requested by the service connector.

The event logger may coordinate all of the event data and/or metadata writes and reads to and from the event log, which may facilitate the use of the event log for multiple services. The event logger may keep the in-memory state of the write index in the event log, and may persist it periodically to a control record (e.g., a master block). When the audit framework is started or restarted, the master record may be read to set the write index.

Multiple services may be able to read from event log via their own service connectors (e.g., Kafka connectors). A service connector may have the responsibility of sending event data and metadata to the requesting service (e.g., such as the message topic broker 314) reliably, keeping track of its state, and reacting to its failure and recovery. Each service connector may be tasked with persisting its respective read index, as well as being able to communicate the respective read index to the event logger when initiating an event read. The service connector may increment the in-memory read index only after receiving acknowledgement from its corresponding service and will periodically persist in-memory state. The persisted read index value may be read at start/restart and used to set the in-memory read index to a value from which to start reading from.

During service start/recovery, service connector may detect its presence and initiate an event read by communicating the read index to the event logger to read from the event log as part of the read call. The event logger may use the read index to find the next event to read and send to the requesting service (e.g., message topic broker 314) via the service connector.

As previously discussed, the audit framework 362 and event log may be tied to a particular FSVM in its own volume group. Thus, if a FSVM is migrated to another computing node, the event log may move with the FSVM and be maintained in the separate volume group from event logs of other FSVMs.

The message broker 314 may, for example, be implemented using a broker which may be hosted on a software bus, e.g., a Kafka server. The message broker may store and/or process messages according to topics. Each topic may be associated with a number of partitions, with a higher number of partitions corresponding to a faster possible rate of data processing. In some examples, a topic may be associated with each file server FSVM1-N of an associated file server 260. In some examples, a topic may be associated with individual or groups of FSVMs. The topic may be used by the FSVM1-N as a destination to which to send events. In some examples, a topic may indicate a priority level. Examples of topics include high, medium, low, and bursty/high. For example, a high topic may have a larger number of partitions of the message broker dedicated to the high topic than are dedicated to a medium or low topic. In some examples, a bursty topic may be used to accommodate a spike in user activity at the file server—event data during this spike may be put in a bursty topic with a large number of associated partitions. The Kafka server may be implemented in a docker container with any number of partitions. The Kafka server may be included in analytics VMs described herein. Consumers (e.g., one or more nodes of an analytics datastore) may consume messages from the message broker by topic in some examples.

To provide audit event data, the audit framework 362 of each FSVM1-N of the file system 360 may publish audit events (e.g., event data) to a respective producer channel 310, which are received and managed by a respective producer message handler 312. The respective producer message handlers 312 may forward the audit events to the message broker 314. The message broker 314 may route the audit events to consumers, including the events processor 316 of the analytics VM 370, which are routed to and stored at the analytics datastore 320 via a consumer channel 318.

The analytics VM 370 and/or the VFS 360 may further include architecture to prevent event data from being processed out of chronological order. For example, the service connector of the audit framework 362 and/or the message topic broker 314 may keep track of message sequence number it has seen before failure, and may ignore any messages which have sequence number less than and equal to the sequence it has seen before failure. An exception may be raised by the message topic broker 314 if the event log does not have the event for the sequence number expected by the service connector or if the message topic broker 314 indicates that it has received a message with a sequence number that is not consecutive. In order to use the same event log for other services, a superset of all the proto fields will be taken to create a common format for event record. The service connector will be responsible for filtering the required fields to get the ones it needs.

In some examples, the events processor 316 may analyze the event received and make a determination whether metadata should be collected associated with that event. If metadata may have changed as a result of the event, the analytics VM 370 may utilize the metadata collection process 330 to retrieve new and/or updated metadata associated with the event. Examples of events that may have an associated metadata for retrieval include file create, file write, directory create, rename, security, and set attribute. Metadata which may be collected associated with the events may include file size, file owner, time statistics (e.g., creation time, last modification time, last access time), and/or access control list (ACL). If no metadata may be collected associated with the event, in some examples, the events processor 316 may provide the event for storage in analytics datastore 320. If metadata is collected associated with the event, the events processor 316 may in some examples provide both the event and the associated metadata to the analytics datastore 320.

The analytics datastore 320 may be implemented using an analytics engine store, such as an elasticsearch database. The database may in some examples be a distributed database. The distributed database may be hosted on a cluster of computing nodes in some examples. In some examples, the analytics datastore 320 may be segregated by age and may be searched in accordance with data age. For example, once an event or metadata data crosses an age threshold, it may be moved to an archive storage area. Data in the archive storage area may be accessed and included in search and other reporting only when specifically requested in some examples. In some examples, when archived event and/or metadata crosses a certain age threshold, it may be deleted.

In an example of a data archive configuration, a first category of data may be a 'hot' category and may be associated with that category if it is less than a first threshold of age (e.g., within 1 month). A second category of data may be 'warm' data which may be between a range of age (e.g., between 1-6 months old). A third category of data may be 'cold' data which may be between a range of age (e.g., between 6-12 months old). A fourth category of data may be 'frozen' data which may be archived and may be over a threshold old (e.g., older than 12 months). Archived data may be generally stored in any archive repository, including, but not limited to, any NAS (e.g., NFS/SMB), Amazon Web Services S3, Hadoop distributed file system, Azure, etc. A fifth category of data may be deleted, such as when it has been archived for over a threshold time (e.g., archived for more than 12 months), Archives may be deleted in some examples using snapshot and restore APIs. In some examples, certain categories of data may be included in searches and queries performed by the analytics VM by default, and some only with user request. For example, the hot and warm categories may be included in searches and/or reporting by default, while the cold, frozen, and/or archived categories may be included only by user request.

In some examples, event data may be collected as syslog events. The events may be provided to the analytics datastore 320 (e.g., by events processor 316) using filebeat and an ingest pipeline.

In some examples, the events processor 316 may be implemented, at least in part, using a Kafka connector. In some examples, the analytics datastore 320 may be implemented using an elasticsearch cluster. The events processor 316 may perform a variety of functions on event data received from the broker. In some examples where the message broker may be implemented with a Kafka server, a Kafka connector may be used to pull events from the Kafka server and ingest them into the analytics datastore (e.g. elasticsearch cluster). For example, the events (e.g., a Kafka message indicative of an event) may be provided in a protocol buffer standard, which may be used to generate a protocol buffer event object provided by the broker (e.g., Kafka server). The events processor 316 may de-serialize received objects (e.g., data, protocol buffer event objects). The events processor 316 may map message fields of the data to those of the analytics datastore 320 (e.g., to elasticsearch fields). The events processor 316 may parse and extract information from the event data. The events processor 316 may ingest the data into indices of the analytics datastore 320 (e.g., to elasticsearch indices). In some examples, data may be indexed into a particular folder based on an event type. Event types may include folder or directory or other classification of portion of the file server pertaining to the event. The events processor 316 may perform data exception handling.

In some examples, the analytics datastore 320 may be scaled in accordance with an amount of data being processed by message brokers (e.g., Kafka servers). Multiple consumers (e.g., analytics datastore nodes, such as elasticsearch nodes) may process data from particular topics. Generally, the multiple consumers processing data from topics may form a group designated by a unique name in the datastore (e.g., cluster). Messages published to the message broker may be distributed across database instances (e.g., analytics datastore nodes) in the group, but each message may be handled by a single consumer in the group in some examples.

In some examples, the analytics VM may monitor throughput of one or more message topics. Based on the read throughput for the topic, the analytics VM may cause horizontal scaling of the analytics data store. For example, when read throughput falls below a particular level, the analytics VM may spin up another node of the analytics datastore. The new node may be subscribed to the topic having the below-threshold read throughput. When read throughput falls above a particular level for a particular topic, in some examples, the analytics VM may spin down (e.g., remove) a node of the analytics data store subscribed to that topic.

In this manner, when a new instance of the analytics datastore joins a group subscribed to a topic, a rebalancing may occur in the message broker (e.g. Kafka server). The message broker may reassign partitions (e.g., topics) to consumers based on metadata regarding the analytics datastore. Advantageously, the use of multi-node analytics datastores may add fault tolerance. For example, if a node of the analytics datastore goes down, the message broker may engage in rebalancing to distribute assignments among remaining analytics datastore instances.

The messaging system, including the producer message handler 312, the message topic broker 314, and the events processor 316 may process multiple audit event threads in parallel, which may aid in keeping the integrity of those audit events (e.g., keeping the events in order) such that a new event may not be overwritten by an older event in the analytics datastore 320, even if the older event is received out of order.

In addition, the analytics VM 370 may retrieve metadata and configuration information from the file system 360 via a metadata collection process 330 and a configuration information collection process 340, respectively. In some examples, the configuration information collection process 340 includes an API architecture. In some examples, the event data and the metadata may include a unique user identifier that ties back to a user, but is not used outside of the event data generation. In some examples, a portion of the configuration information collection process 340 may include the retrieval of a user ID-to-username relationship from an active directory by connecting to a lightweight directory access protocol (LDAP). In addition, rather than requesting a username or other identifier associated with the unique user identifier for every event, the analytics VM 170 may maintain a username-to-unique user identifier conversion table (e.g., stored in cache) for at least some of the unique user identifiers, and the username-to-unique user identifier conversion table may be used to retrieve a username, which may reduce traffic and improve performance of the VFS 160. Any to provide user context for active directory enabled SMB shares may help an administrator understand which user performed which operation as well as ownership of the file. In some examples, the configuration information collection process 340 may include a synchronization operation to retrieve share status from the VFS 360. Thus, if a share is deleted, that information may be updated in the analytics datastore 320.

In some examples, the metadata collection process 330 may utilize SMB and/or NFS commands to obtain metadata information. Metadata which may be collected may include, but is not limited to, file owner, group owner, ACLs, total space on share, free space on share, list of available shares, create time, last access time, last change time, file size, list of files and directory at root of share.

In some examples, the metadata collection process 330 may initially gather metadata for a set of (e.g., all) files hosted by an associated file server. In some examples, the metadata collection process 330 may use a snapshot of the overall VFS 360 to receive the metadata, such as a snapshot provided by a disaster recovery application of the VFS 360. For example, the analytics VM 370 may mount a snapshot of the VFS 360 to scan the file system to retrieve metadata from the VFS 360. In some examples, during the metadata scan, the VFS 360 and/or the analytics VM 370 may add a checkpoint or marker after every completed metadata transaction to indicate where it left off. The checkpoint may allow the analytics VM 370 to return to the checkpoint to resume the scan should the scan be interrupted for some reason. Without the checkpoint, the metadata scan may start anew, creating duplicate metadata records in the events log that need to be resolved.

After an initial metadata collection, in some examples, the metadata collection process 330 may gather metadata for only selected files associated with an audit event received. In some examples, the metadata collection process 330 may utilize active directory (AD) credentials to interact with the associated file server and obtain metadata. The credentials may be provided to the analytics VM 370 in some examples by an administrator.

In some examples, analytics VM 370 may receive a notification when a file server 360 (e.g., one or more of FSVM1-N) subscribe to analytics services. Responsive to the notification, the analytics VM 370 may initiate the metadata collection process 330 to gather initial metadata. The notification may be implemented using, for example, an API call. In some examples, the API call may write an identification of the file server 360 subscribing to the analytics services and the analytics VM 370 may monitor the file for changes to receive notification of a new file server and/or file server VM subscribing to analytics. In some examples, a thread or process may periodically scan the analytics datastore 320 including a store of the file server name(s), If a new file server name is found, the analytics VM 370 may initiate the metadata collection process 330 to gather initial metadata.

To gather initial metadata, the analytics VM 370 may utilize obtain an identification of shares present on the file server 360, and store the identification of the shares in the analytics datastore. For each share, the analytics VM 370 may obtain an identification of all files and directories present on the share. For each file and directory, the analytics VM 370 may gather metadata for the file and/or directory and store the metadata in the analytics datastore 320. In some examples, the analytics VM 370 may track the progress of the initial metadata collection. A scan status may be stored in the analytics datastore and associated with each share. When the initial metadata collection begins, a scan status may be set to an initial value (e.g., "started" or "running") in the analytics datastore 320. When the collected metadata is stored in the analytics datastore 320, the scan status may be set to a completed value (e.g., "complete"). If a failure occurs during the metadata collection process 330, the scan status may be set to a failure value (e.g., "failed).

In some examples, the analytics VM 370 may access the scan status—periodically in some examples (e.g., every hour) If a failed scan status is encountered, the analytics VM 370 in some examples may restart a metadata collections process for that share.

In some examples, when a new share is added to the virtualized file server 360, the analytics VM 370 may not perform an initial metadata gathering process responsive to addition of the new share Instead, the existence of the new share and events relating to the new share may be captured using the events pipeline, and metadata associated with the events may be obtained. Similarly, new files may be tracked based on events coming through the events pipeline and need not initiate a full metadata collections process just based on the addition of a new file or folder.

In some examples, communications for the metadata collection process 330 and/or the configuration information collection process 340 may flow through the audit framework 360 using the message topic broker 314 without departing from the scope of the disclosure. In some examples, the metadata collection process 330 and/or the configuration information collection process 340 may include use of API calls for communication with the VFS 360.

Metadata and/or events data stored in the analytics data store may be indexed. For example, an index may include events data collected over a particular period of time (e.g., last day, last month, last 2 months, last 3 months). In this manner, queries executed by an AVM (e.g., by query layer 286 of FIG. 2A) may query a particular index or indices, avoiding a need to query the entire data store. Metadata and/or events data may accordingly be stored in the analytics data store by storing the data together with an index indicator.

In some examples, certain indices may be maintained to assist with intended reporting of analytics from the AVM. For example, one index may be for anomalies, and may store anomalies detected from audit trails (e.g., from event data). The anomaly index may be queried (e.g., by the AVM) to present information about the occurrence of anomalies. Information stored in the anomaly index may include an array of anomalies for each user, an array of anomalies for each file and/or folder, an ID of the anomaly, a user ID of a user causing an anomaly, operation name(s) included in the anomaly, and a count of operations occurring in the anomaly.

One index may be for capacity and may store capacity metrics for a file server. The AVM may periodically calculate statistics regarding the number of files, counts per file type, capacity change per type, etc. and store the information in this index. Examples of capacity data may include capacity by file type or category, removed capacity by file type or category, added capacity by file type or category, total capacity added, number of files added, capacity removed, capacity change, number of modified files, capacity change by file type or category, number of deleted files, net capacity change. Other metrics may also be used.

Indices may be provided for audit logs (e.g., event data). The event data may be indexed per-time period (e.g., per month). Information that may be stored in the audit log index may include a name of a file or folder for which the event occurred, name or ID of a user generating the event, operation performed by the user, status of the event, old name of the file or folder (e.g., for rename events), object ID for the event, path of the file or folder affected by the event, IP of the machine from which the event was triggered, old parent ID of the file or folder (e.g., for move events), time stamp of the event. Other data may also be stored.

An index may be provided for users, and may store unique IDs of users for the file server. Other information stored in a user index may include user email, last event timestamp for a last action taken by the user, user name, object ID of a file and/or folder on which the user last performed an event, IP address of machine from which the user last operated, last operation performed by the user. Other user information may also be stored in other examples.

An index may be provided for files, and may store unique IDS of files in the file server. Examples of data that may be stored in a file index include last access timestamp, name of file creator, size of file, indicator if file is active, timestamp of last event performed on the file, ID (e.g., UUID) of the file server share to which the file and/or folder belongs, user ID of user performing the last event on the file, ID of the parent file and/or folder (e.g., hierarchical parent in a directory structure), ID of a user performing a last event on the file, time of file creation, file type, filename. The various indices may be queried to provide information as needed for various queries.

A set of categories may be defined and utilized for reporting and/or displaying data. Each category may be associated with multiple file type extensions. For example, an image category may include .jpg, .gif. A Microsoft Office category may include .doc, .xls. A video category may include.mpg, .mov, .mp4, etc. Other categories include, for example, Adobe (e.g., .pdf), log, archive, installers, etc. Associations between category names and file extensions may be stored in memory accessible to the AVM. The associations may be configurable, e.g., an admin or other user may revise and/or update the associations between file types and categories, e.g., using user interface 272.

Accordingly, examples of files analytics systems described herein may collect event data relating to operation of a file system. In some examples, a particular sequence of events may have a particular meaning as understood by a user and/or an administrator. It may be desirable to be able to query and represent the intended event instead of and/or in addition to the actual sequence of events. For example, in some applications (e.g., MICROSOFT WORD), multiple actions on a file system may be taken in order to achieve an intended action (e.g., editing a file). In some examples, applications may use temporary files as part of the processing of editing a given file. The temporary files may be used to store changes to the file. The temporary files may then be retained as the original file (with the original file being deleted), and/or the temporary files may be deleted and content in the file moved to the original file. In some examples, file analytics systems may advantageously respond to queries and/or provide reports (e.g., metrics) which reflect the user intended action, and may exclude or revise event data relating to particulars of an application used to perform the action.

Figure 3B:
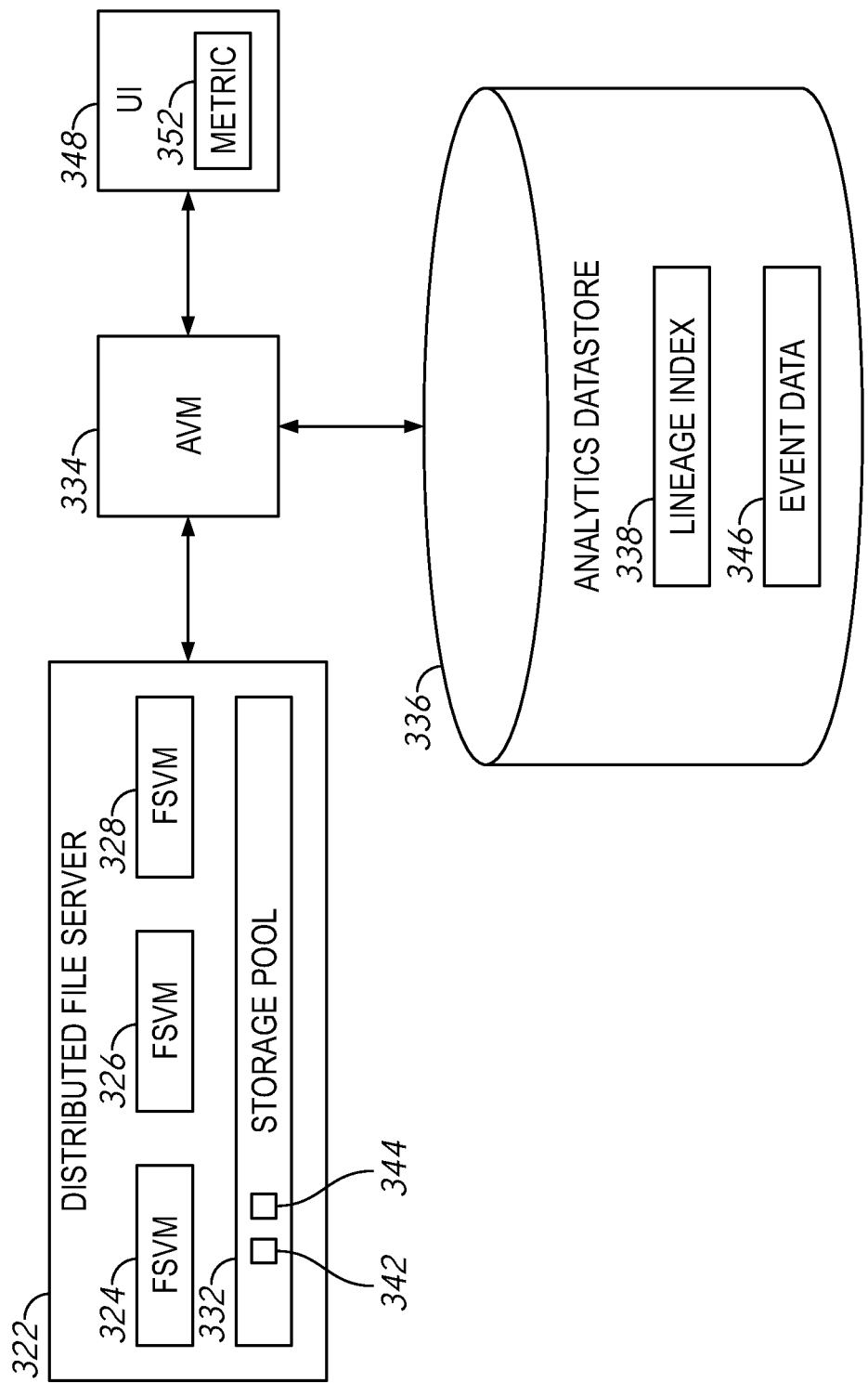
FIG. 3B is a schematic illustration of an example file analytics system which may provide metrics adjusted for application operation e.g., temporary file handling).

FIG. 3B is a schematic illustration of an example file analytics system which may provide metrics adjusted for application operation (e.g., temporary file handling), FIG. 3B includes distributed file server 322, which includes FSVM 324, FSVM 326, FSVM 328, and storage pool 332. The storage pool 332 is shown to include file 342 and temp file 344. The AVM 334 may be in communication with the distributed file server 322. The UI 348 is coupled to AVM 334. The UI 348 may be used to display and/or provide metric 352. The AVM 334 is coupled to analytics datastore 336, which includes lineage index 338 and event data 346.

Systems described herein may include distributed file servers (e.g., virtualized file servers) The distributed file server 322 may be implemented and/or be implemented by, for example, all or portions of the system 100 of FIG. 1 (e.g., the virtualized file server 160). The distributed file server 322 may be implemented and/or be implemented by, for example, the NTS 260 of FIG. 2A. The distributed file server 322 is shown as including three file server virtual machines FSVM 324, FSVM 326, FSVM 328—although any number may be present. The FSVM 324, FSVM 326, FSVM 328 may be implemented by and/or used to implement FSVM 162, FSVM 164, and FSVM 166 of FIG. 1. In some examples the FSVM 324, FSVM 326, FSVM 328 may be implemented by and/or used to implement FSVM1 262, FSVM2 264, and FSVM3 266 of FIG. 2A. In some examples, the FSVM 324, FSVM 326, and/or FSVM 328 may be implemented by and/or used to implement one or more of the FSVMs shown in FIG. 3A. The storage pool 332 may be implemented by and/or used to implement all or portions of the storage pool 156 of FIG. 1 and/or computing node cluster 201 of FIG. 2A.

Systems described herein may include one or more analytics VM, such as AVM 334 of FIG. 3B. The AVM 334 may be implemented by and/or used to implement the analytics VM 170 of FIG. 1, the AVM 270 of FIG. 2A, and/or the AVM 370 of FIG. 3A in some examples. The AVM 334 may generally receive event data from the distributed file server 322. For example, the AVM 334 may receive event data as shown and/or described with reference to the events pipeline of FIG. 3A.

Analytics VMs may accordingly store event data, such as event data 346 of FIG. 3B. The event data may be stored in analytics datastore 336. The analytics datastore 336 may be implemented using and/or may be implemented by analytics datastore 190 of FIG. 1, analytics database 292 of FIG. 2A, and/or analytics datastore 320 of FIG. 3A.

Analytics VMs may receive one or more queries and/or provide one or more reports on the operation or state or other information about an associated virtualized file server. For example, the AVM 334 may be coupled to user interface, UI 348. The UI 348 may be implemented by and/or used to implement the UI 272 of FIG. 2A. The UI 348 may provide (e.g., display) one or more metrics, such as metric 352 in the example of FIG. 3B.

In some examples, the AVM 334 may provide one or more metrics (e.g., metric 352) which are adjusted based on the operation of an application used to implement a particular requested action. The metrics (e.g., metric 352) may be based on event data collected by the AVM 334, such as event data 346. In some examples, metric 352 may include a count of a number of files. The AVM 334 may provide metric 352 a count of files in the distributed file server 322 which may be adjusted to remove temporary files and/or other files ancillary to user operation of the file server. In some examples, metric 352 may include a count or report of operations on the distributed file server 322, such as a count or report of operation taken by all or particular user(s) of the distributed file server 322. The metric 352 may be based on event data 346. However, the count or report of operations taken by all or particular user(s) may be adjusted to exclude operations associated with operation of an application utilized by user to take a particular action.

In some examples, in order to provide metrics that are adjusted, the AVM 334 may provide and utilize a lineage index, such as lineage index 338. The lineage index 338 may store an association between files associated with a particular user action. The AVM 334 may access the lineage index 338 to identify a group of events in the event data 346 which correspond with associated files. The AVM 334 may filter that group of events to remove particular events (e.g., in accordance with a set of rules based on operation of an application) which are ancillary to an intended operation.

For example, consider that users (e.g., individuals, entities and/or other processes) may conduct operations on the distributed file server 322. Users may interact with files on the distributed file server 322 using one or more user VMs and/or other connection to distributed file server 322. Users may interact with files on the distributed file server 322 using one or more applications. Examples of applications used to interact with a file server include office applications—e.g., word processors, spreadsheets, document sharing applications, web browsers, data analysis or simulation applications, etc. Each application may have a set of actions that may be taken responsive to a user request (e.g., a request to write to a file). Other sets of actions may be taken responsive to other types of user requests. Applications used by users may be hosted, for example, on one or more of the computing nodes used to host the distributed file server 322. For example, the computing node(s) may host an operating system which may be used to provide the application.

Take an example of MICROSOFT WORD as an application. When a user requests to edit a MICROSOFT WORD file, MICROSOFT WORD executes a particular set of actions. A new file will be created by MICROSOFT WORD (e.g., having a same name and with a temporary extension). So, for example, consider an example file 'abc.doc' stored in the distributed file server 322. A user may request to edit file 342. Responsive to a user editing file 342, MICROSOFT WORD may create a new file (e.g., temp file 344) with a temporary extension (e.g., 'abc.tmp' and/or 'x.tmp'). Write operations may occur through MICROSOFT WORD with respect to the temporary file. When the editing is complete (e.g., when a user saves the file and/or closes the application), MICROSOFT WORD may delete the original 'abc.doc' (e.g., file 342) and rename 'x.tmp' (e.g., temp file 344) to 'abc.doc'. For example, the temporary file may be retained with the name of the original file (e.g., 'abc.doc') and the original 'abc.doc' file may be deleted.

In such an example of MICROSOFT WORD operation, the event data 346 received by the AVM 334 may include the creation of a new file ('abc.tmp'), writes to the temporary file 'abc.tmp', the deletion of the temporary file (the original 'abc.doc'), and the creation of a new file (the new 'abc.doc'). Such a recording of events may compromise the use of the analytics available through the analytics system because future events may not be recognized as occurring to the same file as the original 'abc.doc'—the files analytics system may consider there to be two separate files and may not be able to represent a continuous flow of events associated with a single 'abc.doc' file, which was the intended operation of the user. Moreover, all of those operations may be associated with the user (including any permission changes or other actions taken by the application), instead of simply the request to write to or change a file.

An example sequence of events for a single write cycle by MICROSOFT WORD may be as follows:

| Event # | Event Type | File Inode | File Name | New File Name |
|---|---|---|---|---|
| 1 | Create | 100 | abc.docx | — |
| 2 | Rename | 100 | abc.docx | x.tmp |
| 3 | Create | 200 | y.tmp | — |
| 4 | Write | 200 | y.tmp | — |
| 5 | Delete | 100 | x.tmp | — |
| 6 | Rename | 200 | y.tmp | abc.docx |

The events are shown consecutively numbered in the above table for ease of discussion. The event type is shown. The file ID (e.g., file iNode) is shown, together with the file name. The file ID (e.g., file iNode) may be a unique ID for the file in the file system. For example, the File Inode 100 may correspond with file 342 and the file inode 200 may correspond with temp file 344 in FIG. 3B.

As shown in the above sequence of events, the original file abc.docx starts as a file with inode 100 but ends up as a file with inode 200 after the write is done. This way the Mode may keep changing on each write. If any analytics is fetched by AVM 334 for the file then the analytics system may need to consider all the Modes for the file in order to get the full & correct audit trail for the file. A reliable mechanism to link all these inodes to the same lineage may be needed to obtain accurate analytics. While a specific example of ancillary operations in MICROSOFT WORD has been provided, it is to be understood that other applications similarly have other sequences of ancillary operations for handling temporary files or other actions (e.g., vi editor).

Referring to FIG. 3B, a lineage index 338 may be maintained in the analytics datastore 336. The lineage index may follow a parent-child schema (e.g., the index may include a series of records which relate a parent file to one or more temporary files). Each record (e.g., document) in the index may represent a lineage root or a child associated with a lineage root. In this manner, the lineage may not be a multi-level hierarchy in some examples. Rather, a single record may exist for a parent-child (e.g., file-temp file) association. Each document in the index may include an object (e.g., unique file ID, such as iNode number), type of document (e.g., parent or child), and lineage root ID (e.g., unique file ID, such as iNode number, for the parent in the case of a child record, or child in the case of a parent record).

In some examples, an events processor of the AVM 334 (e.g., the events processor 316 of FIG. 3A) may populate the lineage index 338. For example, the events processor may execute a lineage management process which may identify particular file events (e.g., temp file events) and establish a lineage between files. For example, the lineage management process may search incoming events and/or events stored in the analytics datastore 336 for files meeting lineage management criteria. Lineage management criteria may refer to the presence of a sequence of events indicative that a file was renamed, moved, and/or altered to a temporary file. For example, the lineage management process may search event data for rename events where a particular file extension indicative of a temporary file (e.g., .tmp) was renamed to another file extension (e.g., .doc). Generally, the lineage management process may identify a known and/or configurable event and/or set of events indicative of a lineage relationship (e.g., relationship where one file is intended to be treated the same as another file for events purposes). For example, the temporary files may be identified by extension (e.g., 'tmp' in the table above) and renames of files having temporary extensions may be used as a lineage management criteria. So, for example, the lineage management process may identify that file inode 200 may be a candidate for lineage management because of event 6 in the table above where the .tmp file is renamed to .docx. Other criteria may also be used. The lineage management process may identify a corresponding event to establish a lineage. For example, the lineage management process, having identified the file inode 200 as a candidate based on the rename of the .tmp file to .docx in event 6, may identify a corresponding event as event 2 where the file ID (e.g., inode 100) was renamed from abc.docx to a temporary file x.tmp. While x.tmp here is used as an example, generally the temp file may be named with ~followed by the original filename.tmp, so it may be ~abc.tmp in some examples. In this manner, the lineage management process may identify the mode 100 as associated with the inode 200.

The lineage management process may further search incoming events and/or events stored in the analytics datastore 336 which may have been performed on the related lineage file. The lineage management process may verify whether the unique file ID (e.g., inode) on which the event occurred is already part of a lineage or is a lineage root itself, such as by searching the existing lineage index. The lineage management process may then establish the lineage accordingly as a root and/or child.

In some examples, the AVM 334 (e.g., an events processor of the AVM) may ensure that file and event records associated with a particular lineage are updated to reflect that lineage. For example, each record in the lineage index may include an object ID and an object lineage root reference, which object lineage root reference indicates the lineage for a file. For example, the events processor 316 may identify each file ID that is involved in a potential temp file event and mark the file for further processing (e.g., both file IDs 100 and 200 may be identified in the example of the above table due to their rename events). The events processor 316 may execute a separate process that identifies lineage for the marked files (e.g., by examining the sequence of events in the above table and/or a lineage index). The corresponding event records for the marked files may be updated to include the object lineage root reference.

While examples have been described where the AVM 334 (e.g., using an events processor) determines lineage of various files in temp-related events, in some examples, lineage may be determined by the file server (e.g., distributed file server 322 of FIG. 3B and/or file server 260 of FIG. 2A). For example, an API gateway on one or more of the FSVMs of the file server 260 may include one or more software processes to calculate the lineage (e.g., association between one or more files), and provide the lineage together with the events data to allow the AVM 334 (e.g., using an events processor) to store the lineage data in the datastore.

In this manner, the lineage of related files may be maintained in a lineage index and/or object lineage root reference in the analytics datastore 336. This lineage index and/or object lineage root reference may be utilized when responding to queries (e.g., queries of or by an API layer of the AVM 334, such as API layer 284 of FIG. 2A) to allow for the intended behavior to be represented.

An example query issued by the AVM 334 (e.g., using an API layer such as API layer 284 of FIG. 2A) to the analytics datastore 336 may be to provide an audit trail for a given file (e.g., all events associated with a particular file ID). The audit trail may be an example of a metric described herein. In examples described herein, the AVM 334 may access the lineage index 338 of the analytics datastore 336 to locate all related lineage IDs for the file ID. The audit index (e.g., event data 346) of the analytics datastore 336 may accordingly be searched for all events belonging to the file ID and any related lineage IDs. Accordingly, a complete set of events may be obtained (e.g., identified).

In some examples, the AVM 334 (e.g., using an API layer) may filter the complete set of events to remove events associated with the operation of the application (e.g., the temporary file process or otherwise ancillary to the intended file manipulation). A set of rules regarding what events to filter, exclude, and/or remove may be stored in a memory or other storage accessible to AVM 334. The set of rules may include rules particular to certain applications and/or certain user actions. For example, in the case of MICROSOFT WORD or other applications having similar temporary file operation responsive to user writes, create events may be discarded for all file IDs except the lineage root ID. Additionally or instead, delete events may be discarded for all file IDs except the most recent (e.g., the current file ID of the related file IDs). Additionally or instead, rename events to and/or from temporary file extensions may be discarded for all file IDs. The resulting set of events may be used to report (e.g., display or communicate) the events associated with the requested file ID. For example, referring to the table above, if a query were received for the inode 200, the AVM 334 may access the lineage index 338 and determine that the inode 100 was a related file ID. All 6 events in the above table may accordingly be retrieved from the analytics datastore 336. The create event #3 may be discarded (e.g., excluded), and only the create event #1 (of the lineage root inode 100) may be retained. The delete event #5 may be discarded (e.g., excluded) as it is not a delete event relating to the current inode ID 200. The rename events #2 and #6 may be discarded (e.g., excluded) as they related to a rename to and/or from a .tmp extension. In this manner, the list of reported events responsive to the query would be Event #1 (Create), Event #4 (Write). This corresponds to the intended operation of a MICROSOFT WORD user creating the sequence of events—the document was created and written to. In this manner, the audit trail metric may be adjusted based on application operation. Similarly, a count of operations performed by a user may include only the create and write actions, with the other actions in the table discarded (e.g., excluded).

In some examples, the AVM 334 may provide a query to provide an aggregate data metric for a particular entity record. For example, access patterns for a particular file may be requested. The AVM 334 (e.g., using an API layer) may have the file of the requested file, and may search the lineage index 338 for the file ID to obtain all related lineage IDs. The audit index (e.g., event data 346) may be searched by the AVM 334 to aggregate event data for the object ID and all lineage IDs. As described above with respect to the discarded events, events relating to the temporary file manipulation may be discarded (e.g., excluded). In this manner, the metric 352 may include access patterns for a particular file adjusted by application operation.

In some examples, the AVM 334 may provide a query for a metric involving aggregate data for a list of entity records e.g., to provide top 5 accessed files. The AVM 334 (e.g., using an API layer) may search the event data 346 for an aggregated count of events per file ID. Rather than only retrieving the requested number of top results, a larger number of results may be retrieved (e.g., 10,000). The results may be compared against the lineage index 338 and results for file IDs related in the lineage index may be combined by the AVM 334. For example, the events list may be filtered as described above and the revised events list may be used to generate an aggregated count of events per file ID. The top accessed files may be identified from the revised list. In this manner, the metric 352 may include aggregated data for a set of entity records adjusted in accordance with operation of an application.

Accordingly, examples described herein may provide a lineage for a given file which relates the file to other files which previously existed but were renamed to, moved to, and/or replaced the given file. This may allow for more complete analytics reporting with respect to the file. Metrics may be adjusted in accordance with operation of an application used to manipulate the file. In this manner, events data may be stored and/or modified in a manner that reflects user intention. While examples have been described with respect to MICROSOFT WORD, in other examples, event sequences occurring with other applications may be analogously modified (e.g., other MICROSOFT OFFICE applications, vi editor, etc.). For example, any application that utilizes an event pattern for temporary files may be tracked using lineage techniques described herein. While certain metrics have been described—number of files, number of operations for a user, top accessed files, audit history for a file, etc.—other metrics may additionally or instead be adjusted based on application operation in other examples.

Figure 4:
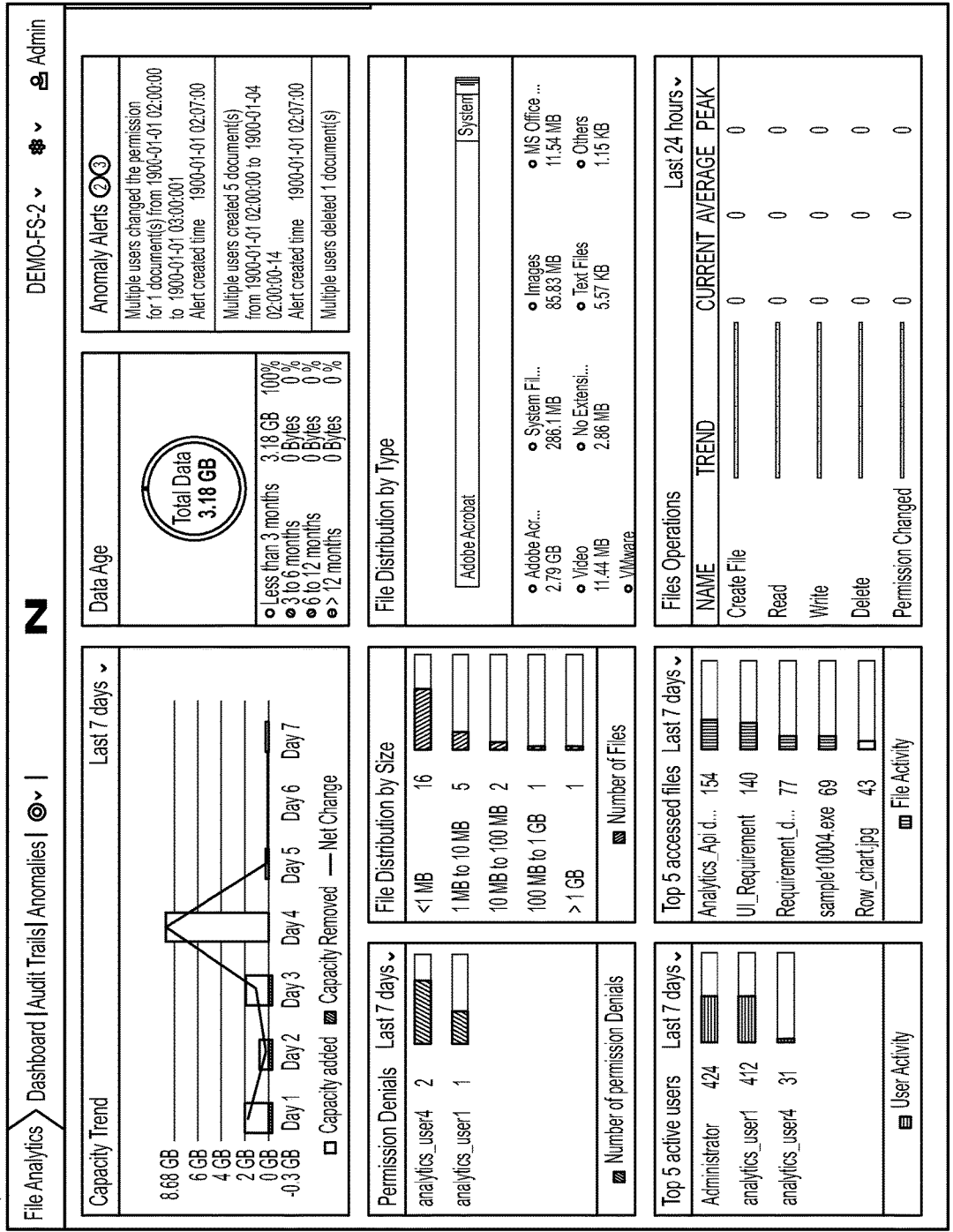
FIG. 4 and FIG. 5 depict exemplary user interfaces showing various analytic data based on file server events, according to particular embodiments.
Figure 5:
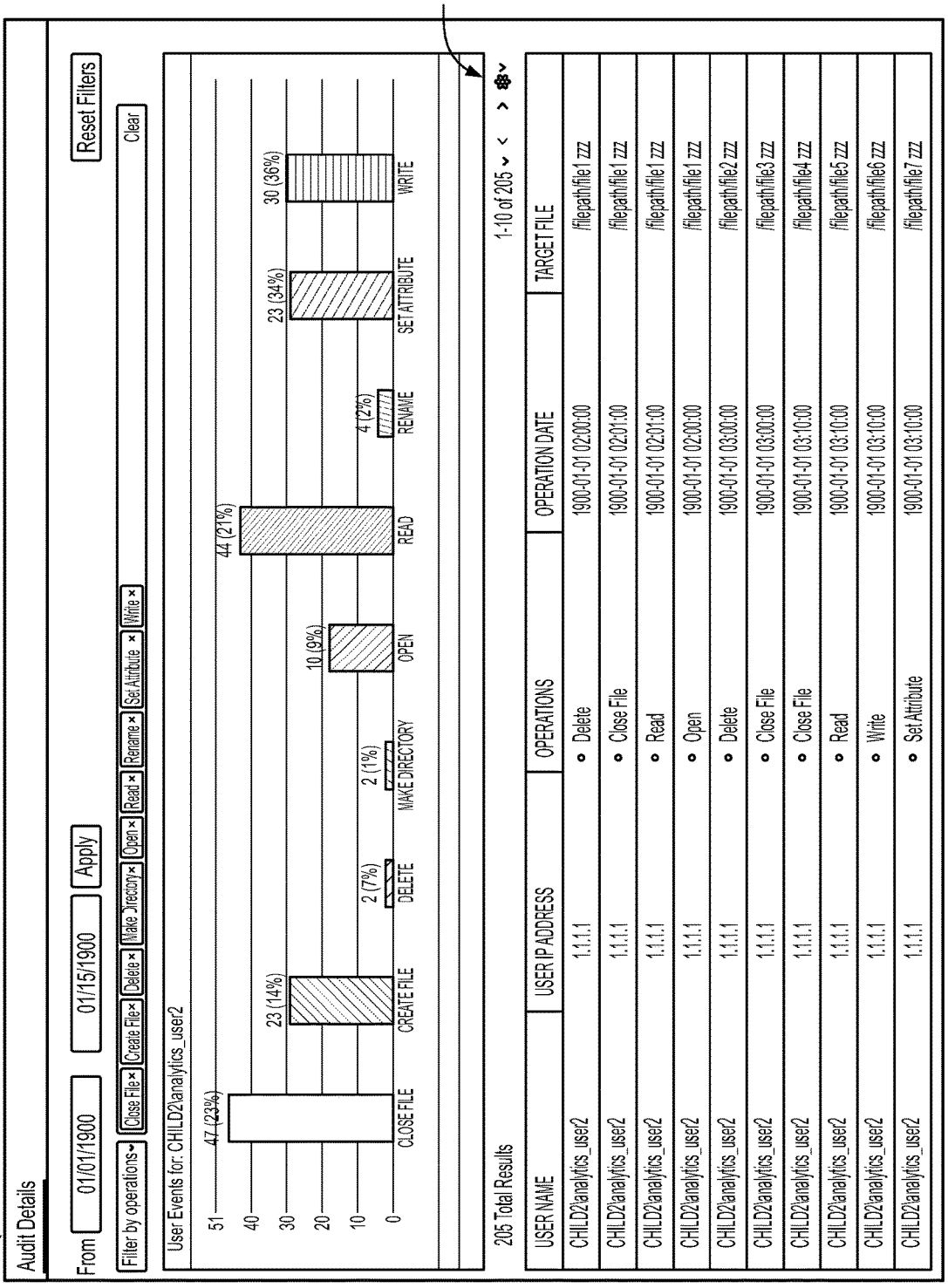

FIG. 4 and FIG. 5 depict exemplary user interfaces 400 and 500/501, respectively, reporting various analytic data based on file server events, according to particular embodiments. The user interfaces 400, and 500/501 may be used, for example, to implement user interface 272 of FIG. 2A and/or UI 348 of FIG. 3B in some examples. As shown in FIG. 4, a top-left portion of the user interface 400 shows changes in capacity of a file server, a top-middle portion depicts age distribution of files managed by the file server, a top-right portion depicts a recent list of anomaly alerts. A middle-left portion of the user interface 400 depicts permissions denials, a center portion of the user interface 400 depicts file size distribution of files managed by the file server, and the middle-right portion of the user interface 400 depicts file-type distribution of files managed by the file server. A lower-left portion of the user interface 400 depicts a list of most active users of the file server, a lower-middle portion of the user interface 400 depicts a list of most accessed files managed by the file server, and the lower-right portion of the user interface 400 depicts trends in types of access operations performed by the file server.

In some examples, a top number of accessed files may be displayed (e.g., in the middle bottom of FIG. 4) together with their details—e.g., filename, file path, owner, and number of events performed on the file over a particular duration (e.g., last 7 days in the example of FIG. 4). A top 5 list is shown in FIG. 4, although other numbers of top files may be used in other examples, such as top 10 or another number. Clicking the file may further display a list of events associated with the file (e.g., an audit history). A top users widget (e.g., bottom left of FIG. 4) may display a top number of active users together with information about the users, such as username, last accessed tile, number of activities performed by the user in a particular duration, etc. Clicking on a username in the widget may display a list of events (e.g., an audit history) associated with the user.

In some examples a file-type distribution widget may be included in a user interface (e.g., in a middle-right portion of the user interface 400 of FIG. 4). The file-type distribution may depict a number of file types (e.g., file extensions and/or categories) for a particular file server (e.g., file server 260 of FIG. 2A and/or distributed file server 322 of FIG. 3B), and a quantity of files in each type. In the example of FIG. 4, a segmented bar is shown, with segments each corresponding to a category (e.g., a group of one or more file extensions) and a length of the segment corresponding to a number of flies of that type. The data may be displayed in other ways, for example a bar graph may depict file extensions along an x axis and count for a type of file and/or category on the y-axis.

In some examples, a file-size distribution widget may be included in a user interface (e.g., in a center portion of the user interface 400). The file-size distribution widget may display file distribution by size for a particular file server (e.g., file server 260 of FIG. 2A and/or distributed file server 322 of FIG. 3B). The example of FIG. 4 illustrates a number of files fitting into each of several file size ranges. Other representations may be used in other examples. For example, a bar graph may be used having size (or size ranges) on an x-axis and a count of tiles on the y-axis.

A data age widget may be included in some examples e.g., in a middle upper portion of FIG. 4). The data age widget may illustrate a relative age of files. In some example, the relative age may be based on a last access of the file. For example, the age of a file may refer to how much time has elapsed since the file was last accessed. In the example of FIG. 4, a total size of data is depicted in each of four age ranges (e.g., less than 3 months, 3-6 months, 6-12 months, >12 months). Other depictions may be used in other examples. A bar graph may show age of files on an x-axis and cumulative size of files of that age on the y-axis.

A files operations widget may be included in some examples (e.g., in a lower right portion of FIG. 4). A quantity of each of several event types (e.g., create file, read, write, delete, permission change) that have occurred in a file server over a queried time may be displayed.

A capacity trend widget may be included in some examples (e.g., in an upper left portion of FIG. 4). The capacity trend widget shows the pattern of capacity fluctuation for the file system. It shows the capacity e.g., storage added, removed and the net change for a particular duration which may be selected from the widget dropdown in some examples. The capacity calculation may be performed in some examples by an AVM. For example, the capacity trend may be regularly (e.g., hourly, every 15 minutes, every 30 minutes, or some other interval) calculated by the AVM using collected metadata and event data. For example, the AVM may query a file index of the data store to obtain added, deleted, and modified county and/or quantities for each file in a file server. A total change may be calculated based on a total change from the current query plus any previous calculated change amount. Net change may be calculated as files and/or quantity added minus files and/or quantity deleted. Generated statistics may be captured and indexed into a capacity index. A query may be made to the capacity index to provide the output shown in the widget.

An anomaly alert widget may be included in some examples (e.g., in an upper right portion of FIG. 4). The anomaly alert widget may show a list of latest anomalies in the file system. An anomaly may refer to, for example, a user performing a number and/or sequence of events that is recognized as anomalous (e.g., changing over a threshold number of file permissions, creating over a threshold number of files, etc.). Anomaly rues may, in some examples, be defined by one or more users of the analytics system described herein and stored in a location accessible to the AVM. The anomaly alert widget may display the anomalous action(s), together with an identification of a responsible user, and a number of files involved.

A permission denial widget may be included in some examples (e.g., in a mid-left portion of FIG. 4). The permission denial widget may display a number of users who performed a permission denied operation within a specified time period.

The metrics shown in FIG. 4 and FIG. 5 may be reported by AVM 334 of FIG. 3B in some examples adjusted in accordance with rules to filter out ancillary events taken by applications used by users.

As shown in FIG. 5, the user interface 500 depicts a distribution of types of events (e.g., close file, create file, delete, make directory, open, read, rename, set attribute, write) performed by a particular user on the file server based on a query over a specified date range. In some examples, the event audit history and/or distribution may be shown per file, per file type, and/or per file server. The user interface 501 depicts a list of the events generated by the query over the specified date range. The user interfaces 400 and 500/501 depicted in FIG. 4 and FIG. 5, respectively, are exemplary. It is appreciated that the user interfaces 400 and 500/501 may be modified to arrange the information differently. It is also appreciated that the user interfaces 400 and 500/501 may be modified to include additional data, to exclude some of the depicted data, or any combination thereof File analytics systems described herein may include other features. In some examples, referring to the example of FIG. 2A, the events processor 280, the query layer 286, and the policy management component 283 may manage and facilitate administrator-set archival policies, such as time-based archival (e.g., archive data based on a last-accessed data being greater than a threshold), storage capacity-based archival (e.g., archiving certain data when available storage falls below a threshold), file-type (e.g., file extension) archival, other metadata property-based archival, or any combination thereof.

In some examples, data tiering policies may be determined, changed, and/or updated based on metadata and/or events data collected by file analytics systems. For example, the VFS 160 of FIG. 1 may implement data tiering. Data tiering generally refers to the process of assigning different categories of data to various levels or types of storage media, typically with the goal of reducing the total storage cost. Tiers may be determined by performance and/or cost of the media, and data may be ranked by how often it is accessed. Tiered storage policies typically may place the most frequently accessed data on the highest performing storage. Rarely accessed data may be stored on low-performance, cheaper storage. Storage tiers are often aligned with a stage in the data lifecycle. The main benefits of tiering data may be around how data is managed through its lifecycle. This is in line with best practice data management policies and can also contribute towards data center and storage management; often the success of tiering will be measured by cost impact.

Virtualized file servers, such as VFS 160 of FIG. 1 may implement storage tiering. For example, data may be stored in particular media in the storage pool 156 based on a tiering policy. For example, less frequently accessed data may be stored on a lower performing media. The file server VMs and/or controller VMs and/or hypervisors shown in FIG. 1 may be used to implement a tiering policy and determine on which media to store various data. For example, a tiering engine may be implemented one or more of the nodes of the VFS 160 and may direct the storage and/or relocation of files to a preferred tier of storage.

File analytics systems may provide information to the file server based on captured metadata and/or events data regarding the stored files. The information provided by analytics based on metadata and events may be used by the VFS 160 to implement, create, modify, and/or update tiering policies.

Individual files are may be tiered as objects in a tiered storage (e.g., implemented as part of and/or as an extension of storage pool 156 of FIG. 1). When a file is moved to the tiered storage, for example at the direction or request of a tiering engine implemented in VFS 160, the data may be truncated from the primary storage in order to save space. The truncated file remains on the primary storage containing the metadata, e.g., ACLS, extended attributes, alternative data stream, and tiering information, e.g., pointers (such as URLs) to access the objects in the tiered storage containing the file data. When the truncated file on the primary storage is accessed by a client (e.g., by a user VM), the data is available from the tiered storage.

In sonic examples, the decision to tier and/or how and/or when to tier may be made at least in part by a policy engine implemented by the analytics VM 170 of FIG. 1. For example, policy management 283 of FIG. 2 may be used to implement the policy engine. The policy engine may determine when to tier based on the tiering policies, file access patterns and/or attributes (e.g., metadata and/or event data obtained by the analytics VM 170 and stored in datastore). The policy engine may keep track of the results of the tiering and untiering executions. For example, when the data is tiered or recalled by a tiering engine of the virtual file server, an event may be generated (e.g., Op code=kTier or kRecall). The tiering event may be sent through the data pipeline (e.g., by producer message handler(s) 312 of FIG. 3A to events processor 316 of FIG. 3A). In this manner, the file analytics system may store indications in the analytics datastore 320 that certain data has been tiered, and on which tier the data (e.g., files reside). Reports and other displays may then be accurate as to the tiering status of files in the virtualized file server.

User interfaces (e.g., UI 272 of FIG. 2A) may provide an interface for a user to view, set, and/or modify the tiering profile. The user interface may be used to obtain information about tiering targets and credentials to be used by the virtualized file server (e.g., VFS 160) to connect and upload files to the tiers. The captured profile details may be communicated to the virtualized file server (e.g., to the tiering engine) via remote command. The user may also set the tiering policy and/or desired free capacity via the UI and this may be stored on an analytics datastore (e.g., database 292 if FIG. 2A). Tiering criteria may be defined, for example exclusion criteria may be defined (e.g., for file size, particular shares, and/or file types, such as categories or extensions) to specify certain items that may not be subject to the tiering, policy. Another tiering criteria may be file size and priority for tiering. Another tiering criteria may be tier threshold age. Another tiering criteria may be file type (e.g., category and/or extension) and priority. The policy engine (e.g., policy management 283 of FIG. 2A) may be implemented using crop job that may run periodically and may be based on tiering policy and desired capacity may wholly and/or partially determine the candidate files for moving to a particular tier. The list of files which meet the criteria for a particular tier may be communicated to the tiering engine of the VFS via a remote command.

The tiering engine of the VFS (which may be hosted, e.g., on node 102, node 104, and/or node 106 of FIG. 1) may tier the files to the specified tiering targets responsive to instructions from the analytics policy engine. For example, the policy engine of the analytics system may evaluate a capacity of the VFS. If a capacity threshold is exceeded, the analytics system may itself and/or communicate with the VFS (e.g., with the tiering engine) to identify files in accordance with the tiering policy for tiering. The files may be grouped for tiering by ID in each share and a task entry may be made for each group. The tasks may be executed by the tiering engine of the VFS, which may in some examples generate the tasks, and in some examples may receive the tasks from the analytics system (e.g., the policy engine). Once the files have been tiered the tiering engine may send audit events for each of the tiered files to the analytics VM 170. The audit events may contain the object identifier (e.g., file ID) and the tier target (e.g., tier to which the file ID is tiered). The tier audit event may be stored in the datastore (e.g., database 292 of FIG. 2A) and the state of the file ID may be updated to "Tiered" when tiered. In case of tiering failure the audit event may contain a reason and file table entry for that file will be updated with it.

The user may (e.g., through UI 272) set an automatic recall policy while setting up the tiering policy. The recall policy may, for example, be based on how many accesses (e.g., reads and/or writes) within a period may trigger a recall. Other users (e.g., admins) may also initiate the recall of specific tiered files, according to the users' requests. In case of manual recall, a user may provide a file, directory and/or a share for recall. The request may be saved in an analytics datastore (e.g., analytics database 292 of FIG. 2A) and accessed by a backend recall process.

In some examples, the tiering engine of the VFS may collect file server statistics used to make a tiering decision (e.g., network bandwidth, pending tiering requests). The analytics VM 170 may access the file server statistics collected by the tiering engine, e.g., through one or more API calls and/or audit events. The file server statistics may be used by the analytics VM (e.g., the policy engine) to control the number of tiering requests provided to the VFS.

Based on the collected information and current state of the objects, the analytics system (e.g., analytics VM 170, such as through the policy engine) may calculate the projected storage savings using a particular tiering selection on a time scale. This information may aid users to configure snapshot and tiering policies for most effective utilization of the VFS, balancing between performance and cost in some examples.

Accordingly, tiering engines in a VFS may utilize file analytics determined based on collected metadata and/or events data from the VMS to make decisions on which files to tier and subsequently truncate from the primary storage. File analytics systems (e.g. AVMs) may additionally or instead decide to untier files based on user defined recall policy (e.g., based on access pattern as determined using collected event data and metadata) and/or based on manual trigger. The policy engine of the analytics VM may generally include a collection of services which may work together to provide this functionality. The policy engine may execute the tiering policy in the background, and call VFS APIs to tier and recall files. The policy engine may keep track of tiered files, and/or the files in the process of being tiered or recalled.

In some examples, the events processor 280, the security layer 287, and the alert and notification component 281 may be configured to analyze the received event data to detect security issues; and/or irregular, anomalous, and/or malicious activity within the file system. For example, the events processor 280 and the alert and notification component 281 may detect malicious software activity (e.g., ransomware) or anomalous user activity (e.g., deleting a large amount of files, deleting a large share, etc.), and the security layer 287 may be configured to provide an alert or notification (e.g., email, text, notification via the user interfaces 272, etc.) of the malicious software activity and/or anomalous user activity.

In some examples, the alert and notification component 281 may include an anomaly detection service that runs in the back ground. The anomaly detection service may scan configuration details and file system usage data retrieved from the analytics datastore (e.g., via communication with elasticsearch) to detect anomalies. In an example, the anomaly detection service may provide detected anomalies per configuration. In some examples, the anomaly detection service may find anomalies based on configured threshold values and the file system usage information. If there are any anomalies, the alert and notification component 281 may send a notification (e.g., text, email, UI alert, etc.) to users, as well as may also store the detected anomalies in the analytics datastore. In some examples, the anomaly detection service may run continuously. In other examples, the anomaly detection service may run periodically and/or according to a schedule. Examples of anomalies may include file access anomalies (e.g., a situation where a specific file was accessed too many times by one or more users within the detection interval), user operation anomalies (e.g., a situation where a user has performed a file operation (e.g., create, delete, permission change) too many times within the detection interval), etc. In some examples, the anomaly detection service may be capable of going back to find anomalies missed when the anomaly detection service was unavailable.

Figure 6:
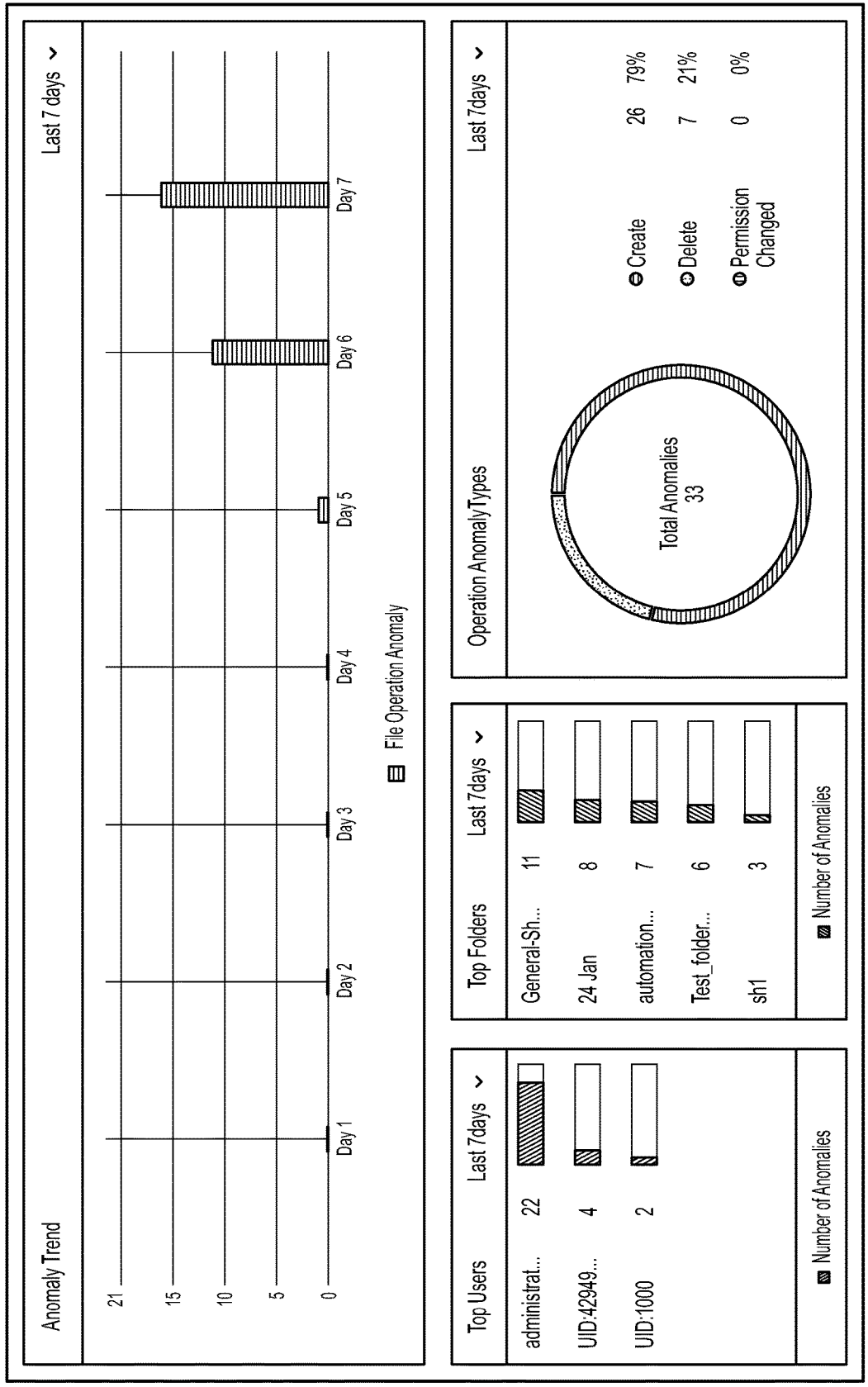
FIG. 6 depicts an example user interface reporting various anomaly-related data, according to particular embodiments.

In some examples, an file analytics system, e.g., AVM 270 of FIG. 2A, such as by using the machine learning layer 285, may be implemented to enhance detection of malicious software activity and/or anomalous user activity. FIG. 6 depicts an example user interface 600 reporting various anomaly-related data, according to particular embodiments. As shown in FIG. 6, the top portion of the user interface 600 shows changes in a number of detected anomalous events over time. The lower left portion of the user interface 600 depicts a list of users that have cause the most detected anomalous activity, the lower middle portion of the user interface 600 depicts a list of folders have experienced the most detected anomalous activity, and the lower right portion of the user interface 600 depicts frequency of each type of anomaly-inducing event. The user interface 600 depicted in FIG. 6 is exemplary. It is appreciated that the user interface 600 may be modified to arrange the information differently. It is also appreciated that the user interface 600 may be modified to include additional data, to exclude some of the depicted data, or any combination thereof.

In some examples, file analytics systems may detect and take action responsive to the detection of suspected or actual ransomware. Ransomware is a type of malicious software, examples of which may be designed to block access to a computer system or computer files until a sum of money is paid. Most ransomware variants encrypt user files on the affected computer, hold the decryption key, making them inaccessible, and demand a ransom payment to restore access. Ransomware is a growing threat enterprise is trying to address through a traditional approach OR through supervised machine learning and Artificial Intelligence solutions OR a combination of these two. Some of the traditional approaches to handle ransomware attacks are—

A) Intrusive detection at the network layer and monitor the end point—Network based systems typically focus on who and what are being attacked rather than detecting evidence of infection and are generally not designed to inform the end-user that an infection has been detected B) Taking a backup or snapshot of the file system on a regular interval—This approach may only have partial success as complete data recovery is generally not possible. Data created between two backups/snapshots is bound to be lost.

C) Detect ransomware through pre-defined digital signatures—This can help if there is a repetition of already known ransomware (currently contains around 3000+ known ransomware file name and extension patterns that are updated daily). However, this leads to significant system vulnerability to new and non-cataloged ransomware.

Virtualized file servers described herein, such as VFS 160 may have an ability to maintain an allowlist (e.g., contains all file extensions allowed for an enterprise or other user) and denylist (e.g., contains all file extensions that are not allowed for an enterprise or other user) file extensions based on the customer needs and act as a preventive layer.

Examples described herein include systems, methods, and computer readable media encoded with instructions to perform ransomware prevention, detection, remediation, and/or recovery. In some examples, an automated workflow is provided what may allow for ransomware to be detected based on events recorded from a file server, and upon detection, the workflow may take immediate action to remediate and/or recover from the ransomware attack.

As described herein, a files analytics system may be used to track events (e.g., reads, writes, change files). Virtualized file servers, such as VES 160 of FIG. 1 may include an API interface for file blocking, and may provide multiple snapshots of the files made available by the file server. Analytics systems may utilize events and/or patterns of events to detect suspected ransomware. For example, ransomware may follow certain steps for infecting files. In some examples, ransomware may delete shadow copies of files (e.g., default backups made by an OS), an executable for ransomware may be copied to a system folder and may receive elevated permissions, a service may be created that runs during encryption of files. During encryption of files, encrypted files are renamed and ransom notes may be created. A log file may be created listing the number of targeted files, the number of encrypted files, and the number for files not encrypted due to access issues, and then the service may be stopped and deleted. File analytics systems may review event data to detect ransomware behavior for example, analytics may identify the renaming of files during encryption and/or creation and storage of ransom notes. Each ransomware may have its own mechanism for renaming infected files and changing their extension and name. Known or suspected ransomware signatures (e.g., renaming patters and/or extensions) may be stored and acted on by file analytics systems.

File Analytics may use the virtualized file server's "File Blocking Policy" and "SSR" (Self Service Restore) capabilities to prevent attacks from known ransomware signatures. For example, the file analytics system may utilize an API interface to the VFS 160 of FIG. 1 to perform file blocking to block files from being created and/or renamed to names or properties of known ransomware file names or properties. Blocking generally refers to preventing create and/or rename file operations. The AVM 170 may add rules to a rule storage accessed by the VFS 160 to implement these policies and prevent certain actions and/or file extensions from occurring in the VFS 160. For example, the analytics VM 170 may maintain a database of known ransomware file extension(s) (example *.zzz or *.cfg) or matching file name and extension pattern (example—a*b.zzz, *-info.cfg*, info*.*-att). These extensions and/or rules may be communicated to the VFS 160 for use in implementing file blocking policies. Once configured, any files created or renamed in the VFS 160 may be blocked from being stored or renamed to prohibited extensions or extension patterns. The VFS 160 may provide an event to analytics VM 170 to notify the analytics system of the attempt to create or rename a file with a known ransomware signature. For example an "access denied [file blocking policy]" message may be generated (e.g., by an FSVM) when access and/or rename of a blocked file is attempted. This event may be provided to the analytics VM and logged in an events datastore. The virtualized file server may have an SSR policy definition which allows the virtualized file server to create a snapshot at a regular interval—e.g., an immutable copy of the file system. The analytics VM 170 may interface with the virtualized file server to display the current SSR configuration. If any of the shares or exports is not protected (e.g., SSR policy not enabled) or SSR policy is not defined, the analytics VM 170 may create and protect them.

Detection: analytics systems (e.g., analytics VM 170 of FIG. 1) may detect ransomware attacks through a set of file operation events. If an attack happens using existing ransomware signature, file blocking events may be analyzed to detect the attack. However, if any new ransomware signatures occur, the analytics VM may analyze the set of file operation events to detect the ransomware attack. For example, the analytics VM 170 may monitor and/or query events stored in the datastore 190 of FIG. 1 and/or datastore 320 of FIG. 3A to identify ransomware. Examples of event patterns which the analytics VM 170 may recognize as a ransomware attack are provided below.

Overwrite: This pattern may refer to a pattern of open, read, write, close, for a particular file. In this pattern, a user file is overwritten by opening the file, reading the content, writing the encrypted contents in-place, and then closing the file. The file may additionally be renamed. In some examples, the analytics VM 170 may recognize this pattern of events as a ransomware attack. When this pattern of events occurs, as identified by the pattern of events being received by the events processor 316 and/or being stored in the analytics datastore 320, the analytics VM 170 may identify the ransomware attack and issue a notification and/or take a remediation action.

Read-Encrypt-Delete: This pattern may refer to a pattern of read (e.g., open, read, close), encrypt (e.g., lock, open, write, close), and delete (e.g., open, delete, close). In this pattern, file contents may be read, encrypted contents may be written, the files deleted without wiping them from the storage. This could be accomplished by moving the file to temporary folders, doing the operations and moving back the encrypted files to the original directory.

In some examples, the analytics VM 170 may recognize this pattern of events as a ransomware attack. When this pattern of events occurs, analytics VM 170 may identify the ransomware attack and issue a notification and/or take a remediation action.

Read-Encrypt-Overwrite: This pattern may refer to a pattern of read (e.g., open, read, close), encrypt (e.g., open, write, close), overwrite (e.g., open, read, write, close). In this pattern, a user file may be read, a new encrypted version may be created and the original file may be securely deleted or overwritten (e.g., using a move). This uses two independent access streams to read and write the data.

In some examples, the event pattern analysis may be implemented by analytics VM 170 using a supervised machine learning algorithm and/or by similarity measurement and consideration of file entropy (e.g., a measure of the "randomness" of the data in a file—measured in a scale of 1 to 8 (8 bits in a byte), where typical text files will have a low value, and encrypted or compressed files will have a high measure). The machine learning algorithm may identify files that are or have been subject to a ransomware attack. In some example, the similarity measurement and/or file entropy measurement may be indicative that the file is or has been subject to a ransomware attack.

In some examples, events processor 280 of FIG. 2A and/or events processor 316 of FIG. 3A may be used to detect ransomware attacks. For example, the events processor may scan incoming events for "access denied [file blocking policy]" events based on requests to create and/or rename files. The events processor may then ascertain whether the extension of the file names and/or file name pattern associated with the attempted events matches with extensions and/or file name patterns stored in a denylisted set of known and/or suspected ransomware. Such a list may be stored in-memory by the events processor in some examples. Audit events determined to be associated with ransomware may be marked accordingly (e.g., by updating a field, e.g., a ransomware_attack field) in the record for the event stored in the datastore. Other indicators may also be used. Such an indicator may support later queries of the datastore for ransomware events and related analytics. The events processor may periodically reload (e.g., through an event driven framework supported by publish subscribe mechanism(s)) new and/or changed ransomware signatures for detection. The ransomware signatures may be added and/or changed, for example, by a user through a user interface.

Remediation: Once analytics VM 170 (e.g., using an anomaly engine detecting above-described patterns and/or running a machine learning algorithm) detects the ransomware attack, the analytics VM 170 may A) send an alert (such as an email alert, the alert specifics may be stored and adjusted in an alert policy accessible to File Analytics) B) Makes an API call to the virtualized file server 160 and mark the share READ only—e.g., the file share storing the affected file may be marked READ only so no further changes may be accepted. In some examples, the file share may include only the file subject to the detected ransomware attack; in some examples, the file share may include other files in addition to the file subject to the detected ransomware attack, such as all files in the file system stored at the same computing node and/or same block or volume; and/or C) Blocks the users/client IP address accessing the share subject to the ransomware attack (as defined in the File analytics policy). The system may also generate report on a number of files (and file details) impacted with details of the paths that can be used for recovery purpose.

For example, an event driven framework supported by a publish-subscribe mechanism may be used to send an email notification to end users when a ransomware attack is detected and/or suspected. Once a ransomware attack as been detected and/or suspected (e.g., by an events processor), the corresponding share of the VFS having the implicated file may be added to the existing topic (e.g., Kafka topic). The events processor may call a notify process to send an email notification.

Recovery: By the time a ransomware attack is detected and remediation kicks-in, there is a possibility of few files being compromised. The file analytics system may auto detect the compromised files by analyzing events data and building the path for the affected files. Once the files path and name is available, the files analytics system (e.g., analytics VM 170, which may have a client available to mount the share or snapshot) may—

Mount the immutable snapshot (\\share-name\snapshot) associated with the file and/or share subject to the ransomware attack. The analytics VM 170 may traverse the files of the snapshot based on the file path and copy those files in the "recover-temp" folder in the local file analytics system.

Mount the share where documents are compromised (e.g., \\share-name\folders\file-path) and delete those files. Once the folders/files are deleted, the analytics VM 170 may copy files from the "recover-temp" folder in the same directory. In this manner, the attacked files may be deleted and replaced with a most recent version of the files from prior to the attack from a stored snapshot.

Once this is completed, the analytics VM 170 may retrofit the configuration to file blocking policy to ensure the virtualized file server is resilient to future attack from a same ransomware attacker—e.g., filenames or signatures used by the ransomware attacker may be blocked and/or the IP address or other identifying indicia of the attacker may be blocked.

Accordingly, systems and methods for ransomware detection, remediation, and/or prevention may be provided which may improve resiliency of a virtualized file server to ransomware attack. A variety of user interfaces may be provided to administer, and/or receive information about ransomware in a virtualized file server (e.g., utilizing UI 272 of FIG. 2A). In some examples, the UI 272 may provide a ransomware policy management page allowing for a user to add and/or remove and/or modify file extensions and file name patterns that analytics VM 270 may recognize and report as ransomware. In some examples, the UI 272 may provide a display of a ransomware dashboard. The dashboard may display for example, an infection status (e.g., number of infected files, number of infected shares, and/or provide an infected file list for display and/or download). The dashboard may display SSR status (e.g., a list of shares that have SSR enabled). The dashboard may display a number of vulnerabilities (e.g., infection attempts)—this may include, for example, total vulnerabilities, vulnerable shares, and/or malicious clients. The dashboard may display most recent ransomware attack attempts (e.g., time of attach, share, client, and/or blocked file extension). The dashboard may display a list of vulnerable shares (e.g., share name, path, status, protection status, and/or vulnerabilities). The dashboard may display a list of malicious clients (e.g., client IP, user, share accessed, and/or operation performed).

The information for the dashboard may be obtained by analytics VM 270 querying metadata and/or events data maintained in analytics database 292 (e.g., datastore 320 of FIG. 3A). For example, the analytics VM may utilize a query for audit events having an indicator of ransomware attack (e.g., in a ransomware attack field of the event store). Counting the number of such events may provide a number of infection attempts, and the shares corresponding to files implicated by those events may provide a list of vulnerable shares.

Figure 7:
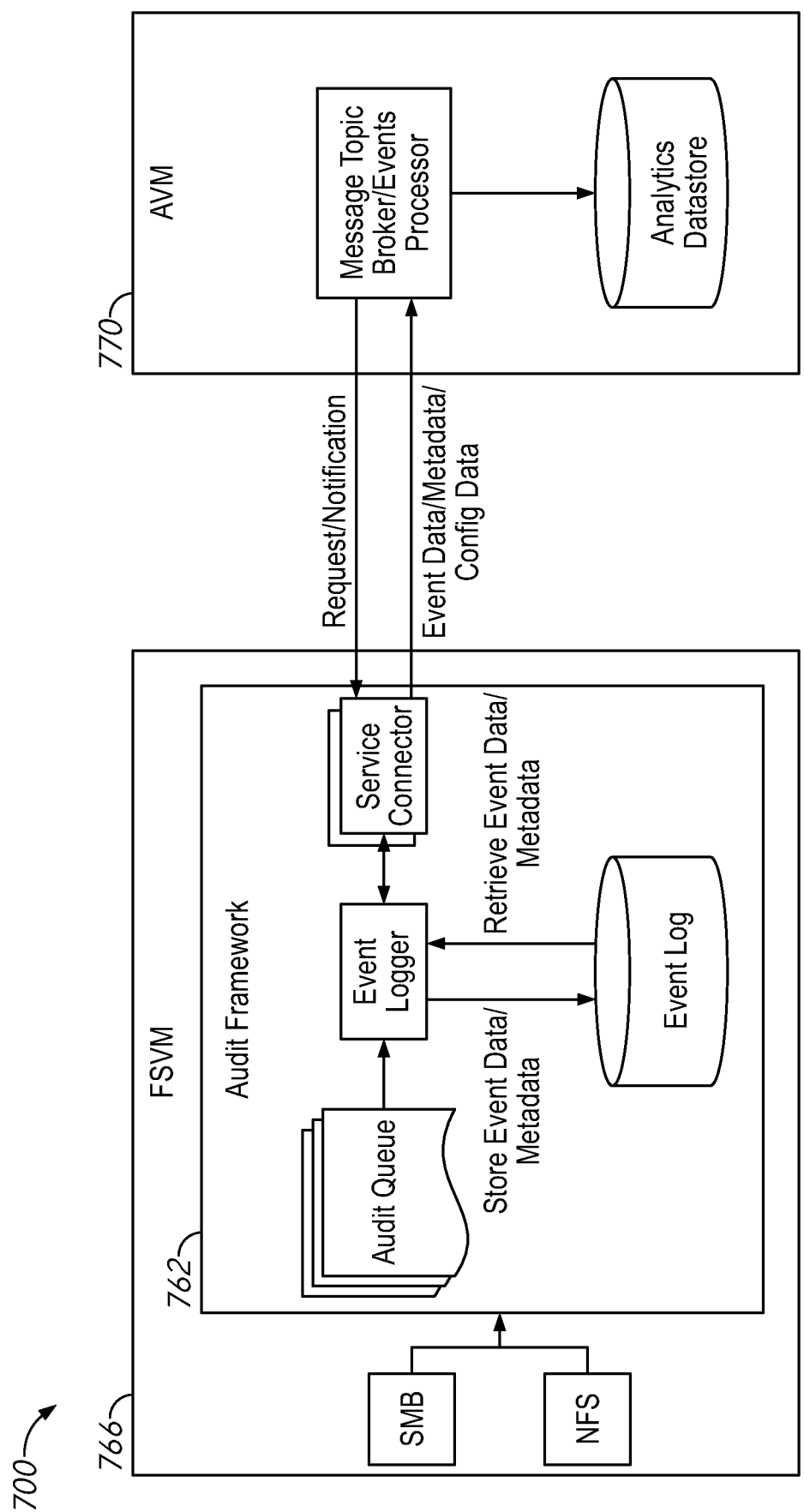
FIG. 7 illustrates a clustered virtualization environment implementing file server virtual machine of a virtualized file server (VFS) and an analytics VM according to particular embodiments.

FIG. 7 illustrates a clustered virtualization environment 700 implementing file server virtual machine 766 of a virtualized file server (VFS) and an analytics VM 770 according to particular embodiments. The analytics VM 770 may include an events processor to retrieve, organize, aggregate, and/or analyze information corresponding to the VFS file system in an analytics datastore. The VFS 160 and/or the analytics VM 170 of FIG. 1 and/or the VFS 260 and/or the analytics VM 270 of FIG. 2A, and/or the VFS 360 and/or the analytics VM 370 of FIG. 3A and/or the AVM 334 of FIG. 3B may be used to implement and/or be implemented by the FSVM 766 of the VFS file system and/or the analytics VM 770, respectively. The architecture of FIG. 7 can be implemented using a distributed platform that contains a cluster of multiple host machines that manage a storage pool, which may include multiple tiers of storage.

In some examples, the analytics VM 770 and/or the FSVM 766 may include protections to prevent event data from being lost. In some examples, the FSVM 766 may store event data until it is consumed by the analytics VM 770. For example, if the analytics VM 770 (e.g., or the message system) becomes unavailable, the FSVM 766 may store the event data until the analytics VM 770 (e.g., or the message system) becomes available.

To support the persistent storage, and well as provision of the event data to the analytics VM 270, the FSVM 766 may include an audit framework 762 that includes a dedicated event log (e.g., tied to a FSVM-specific volume group) that is capable of being scaled to store all event data and/or metadata for a particular FSVM until successfully sent to the analytics VM 770. The audit framework may include an audit queue, an event logger, an event log, and a service connector. The audit queue may be configured to receive event data and/or metadata from the FSVM 766 via network file server or server message block server communications, and to provide the event data and/or metadata to the mediator. The event logger may be configured to store the received event data and/or metadata from the audit queue, as well as retrieve requested event data and/or metadata from the event log in response to a request from the service connector. The service connector may be configured to communicate with other services (e.g., such as a message topic broker/events processor of the analytics VM 770) to respond to requests for provision of event data and/or metadata, as well as receive acknowledgments when event data and/or metadata are successfully received by the analytics VM 770. The events in the event log may be uniquely identified by a monotonically increasing sequence number, will be persisted to an event log and will be read from it when requested by the service connector.

The event logger may coordinate all of the event data and/or metadata writes and reads to and from the event log, which may facilitate the use of the event log for multiple services. The event logger may keep the in-memory state of the write index in the event log, and may persist it periodically to a control record (e.g., a master block). When the audit framework is started or restarted, the master record may be read to set the write index.

Multiple services may be able to read from event log via their own service connectors (e.g., Kafka connectors). A service connector may have the responsibility of sending event data and metadata to the requesting service (e.g., such as the message topic broker/events processor of the analytics VM 770) reliably, keeping track of its state, and reacting to its failure and recovery. Each service connector may be tasked with persisting its respective read index, as well as being able to communicate the respective read index to the event logger when initiating an event read. The service connector may increment the in-memory read index only after receiving acknowledgement from its corresponding service and will periodically persist in-memory state. The persisted read index value may be read at start/restart and used to set the in-memory read index to a value from which to start reading from.

During service start/recovery, service connector may detect its presence and initiate an event read by communicating the read index to the event logger to read from the event log as part of the read call. The event logger may use the read index to find the next event to read and send to the requesting service (e.g., the message topic broker/events processor of the analytics VM 770) via the service connector. As previously discussed, the audit framework and event log may be tied to a particular FSVM in its own volume group. Thus, if a FSVM is migrated to another computing node, the event log may move with the FSVM and be maintained in the separate volume group from event logs of other FSVMs.

Figure 8:
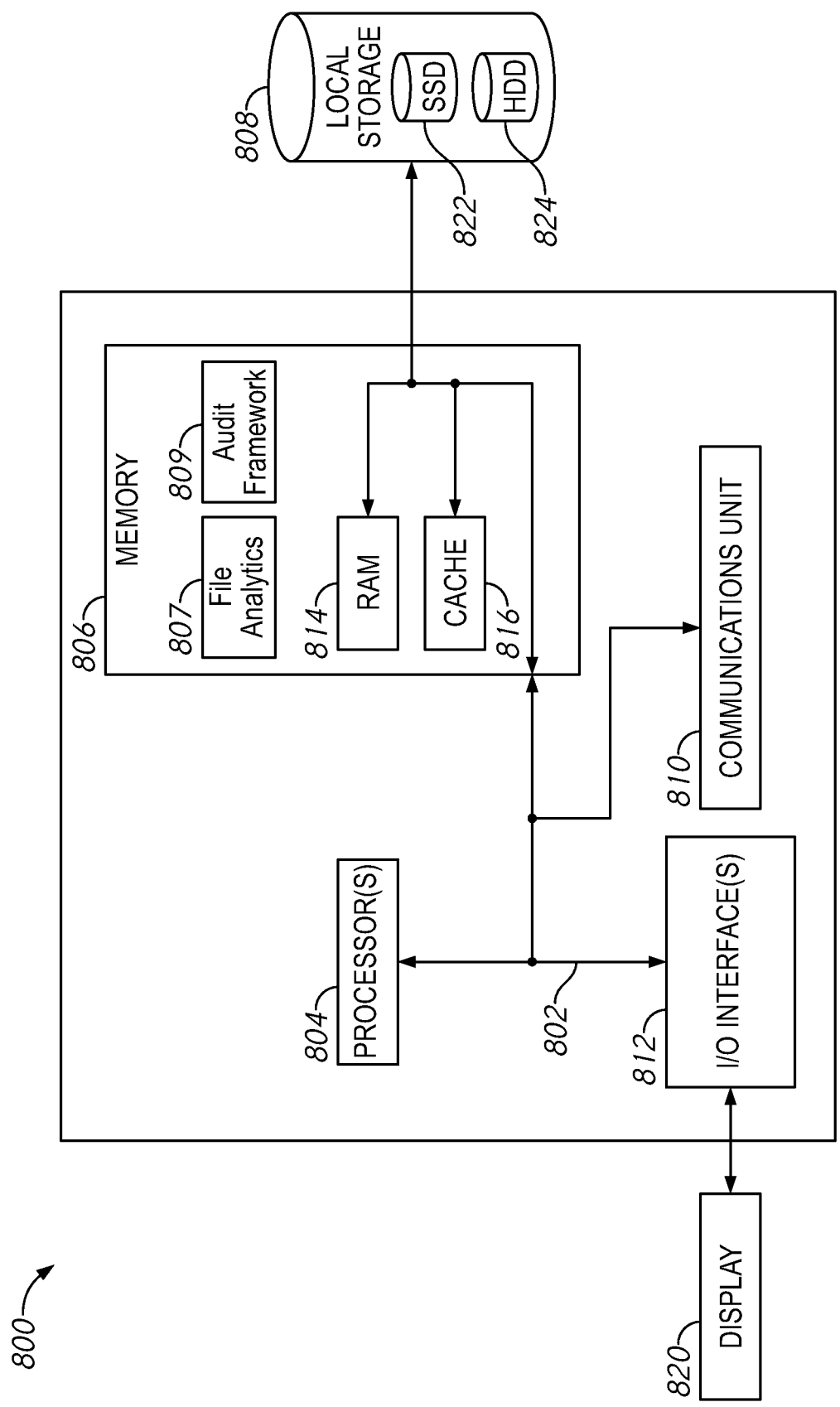
FIG. 8 depicts a block diagram of components of a computing node (e.g., device) in accordance with embodiments of the present disclosure.

FIG. 8 depicts a block diagram of components of a computing node (device) 800 in accordance with embodiments of the present disclosure. It should be appreciated that FIG. 8 provides only an illustration of one implementation and does not imply any limitations with regard to the environments in which different embodiments may be implemented. Many modifications to the depicted environment may be made. The computing node 800 may implemented as at least part of the system 100 of FIG. 1, the clustered virtualization environment 200 of FIG. 2A, and/or may be configured to perform host at least part of the virtualized file server 360 and/or the analytics virtual machine 370 of FIG. 3A, host at least part of the distributed file server 322 and/or the AVM 334 of FIG. 3B, and/or the FSVM 766 and/or the analytics virtual machine 770 of FIG. 7, In some examples, the computing node 800 may be a standalone computing node or part of a cluster of computing nodes configured to host a file analytics tool 807 (e.g., any of the analytics VMs described herein).

The computing node 800 includes a communications fabric 802, which provides communications between one or more processor(s) 804, memory 806, local storage 808, communications unit 810, I/O interface(s) 812. The communications fabric 802 can be implemented with any architecture designed for passing data and/or control information between processors (such as microprocessors, communications and network processors, etc.), system memory, peripheral devices, and any other hardware components within a system. For example, the communications fabric 802 can be implemented with one or more buses.

The memory 806 and the local storage 808 are computer-readable storage media. In this embodiment, the memory 806 includes random access memory RAM 814 and cache 816. In general, the memory 806 can include any suitable volatile or non-volatile computer-readable storage media. In an embodiment, the local storage 808 includes an SSD 822 and an HDD 824.

Various computer instructions, programs, files, images, etc. may be stored in local storage 808 for execution by one or more of the respective processor(s) 804 via one or more memories of memory 806. In some examples, local storage 808 includes a magnetic HDD 824. Alternatively, or in addition to a magnetic hard disk drive, local storage 808 can include the SSD 822, a semiconductor storage device, a read-only memory (ROM), an erasable programmable read-only memory (EPROM), a flash memory, or any other computer-readable storage media that is capable of storing program instructions or digital information.

The media used by local storage 808 may also be removable. For example, a removable hard drive may be used for local storage 808. Other examples include optical and magnetic disks, thumb drives, and smart cards that are inserted into a drive for transfer onto another computer-readable storage medium that is also part of local storage 808. The local storage may be configured to store executable instructions for the file analytics tool 807 or the audit framework 809. The file analytics tool 807 may perform operations described with reference to the AVM 170 of FIG. 1, the AVM 270 of FIG. 2, the analytics VM 370 of FIG. 3, and/or the analytics VM 770 of FIG. 7, in some examples. The audit framework 809 may perform operations described with reference to the audit framework of the VFS 160 of FIG. 1, the audit framework of the VFS 260 of FIG. 2, the audit framework 362 of FIG. 3, and/or the audit framework 762 of FIG. 7, in some examples.

Communications unit 810, in these examples, provides for communications with other data processing systems or devices. In these examples, communications unit 810 includes one or more network interface cards, Communications unit 810 may provide communications through the use of either or both physical and wireless communications links.

I/O interface(s) 812 allows for input and output of data with other devices that may be connected to computing node 800. For example, I/O interface(s) 812 may provide a connection to external device(s) 818 such as a keyboard, a keypad, a touch screen, and/or some other suitable input device. External device(s) 818 can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 808 via I/O interface(s) 812. I/O interface(s) 812 also connect to a display 820.

Display 820 provides a mechanism to display data to a user and may be, for example, a computer monitor. In some examples, any of the user interfaces, metrics, and/or widgets described herein may be displayed on the display 820.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

What is claimed is:

1. A non-transitory computer readable storage medium encoded with instructions, which, when executed, cause a system to:
   generate a lineage index configured to store a lineage between multiple files corresponding to a user action, including a first file requested in the user action and a temporary file generated at least in part responsive to the user action corresponding to the first file, wherein the generating further includes establishing a lineage between the first file and the temporary file;
   access the lineage index comprising a set of events from a file system pertaining to the multiple files including the first file and the temporary file;
   filter the set of events to retain selected events corresponding to the user action and remove at least one event ancillary to the user action; and
   report based on the selected events, wherein the reporting comprises providing a number of files associated with the file system, the number of files determined by excluding at least the temporary one or more of the multiple files based at least on the lineage index.

2. The non-transitory computer readable storage medium of claim 1, wherein the instructions, when executed, cause the system to generate the lineage index at least in part by storing an association between the first file requested in the user action and the temporary file generated at least in part by renaming the first file.

3. The non-transitory computer readable storage medium of claim 1, wherein the instructions, when executed, cause the system to generate the lineage index at least in part by storing an association between the temporary file generated responsive to the user action and a new file generated by renaming the temporary file.

4. The non-transitory computer readable storage medium of claim 1, wherein the instructions, when executed, cause the system to filter the set of events to exclude events corresponding to application processing of the user action.

5. The non-transitory computer readable storage medium of claim 1, wherein the instructions, when executed, cause the system to receive the set of events through an events pipeline from multiple file server virtual machines (FSVMs) hosting the file system.

6. The non-transitory computer readable storage medium of claim 1, wherein the instructions, when executed, cause the system to generate the lineage index corresponding to the user action comprising a write to a file using an application, and wherein at least one of the multiple files comprises the file and another comprises the temporary file generated by the application responsive to the user action.

7. The non-transitory computer readable storage medium of claim 1, wherein the instructions, when executed, cause the system to report based on the selected events including to provide a count of actions associated with the user, wherein the count of actions includes a count of the selected events.

8. The non-transitory computer readable storage medium of claim 1, wherein the instructions, when executed, cause the system to report based on the selected events including to provide the number of files associated with the file system, wherein the number of files is determined based at least in part on the lineage index.

9. The non-transitory computer readable storage medium of claim 1, wherein the number of files is further determined based at least on excluding one or more of the multiple files ancillary to the user action.

10. A method comprising:
    generating a lineage index comprising a lineage between multiple files corresponding to a user action, including a first file requested in the user action and a temporary file generated at least in part responsive to the user action corresponding to the first file, wherein the generating further includes establishing a lineage between the first file and the temporary file;
    accessing the lineage index comprising a set of events from a file system pertaining to the multiple files including the first file and the temporary file;
    filtering the set of events to retain selected events corresponding to the user action and remove at least one event ancillary to the user action; and
    reporting based at least on the selected events, wherein the reporting comprises providing a number of files associated with the file system, the number of files determined by excluding at least the temporary file based at least on the lineage index.

11. The method of claim 10, wherein generating the lineage index is based at least in part by storing an association between the first file requested in the user action and the temporary file generated at least in part by renaming the first file, the multiple files comprising the first file and the temporary file.

12. The method of claim 10, wherein generating the lineage index is further based at least in part by storing an association between the temporary file generated responsive to the user action and a new file generated by renaming the temporary file, the multiple files comprising the temporary file and the new file.

13. The method of claim 10, the method further comprising filtering the set of events to exclude events corresponding to application processing of the user action.

14. The method of claim 10, the method further comprising receiving the set of events through an events pipeline from multiple file server virtual machines (FSVMs) hosting the file system.

15. The method of claim 10, the method further comprising generating the lineage index corresponding to the user action comprising a write to a file using an application, and wherein at least one of the multiple files comprises the file and another comprises the temporary file generated by the application responsive to the user action.

16. The method of claim 10, wherein the reporting is further based on the selected events including to provide a count of actions associated with the user, wherein the count of actions includes a count of the selected events.

17. The method of claim 10, wherein the reporting is further based on the selected events including to provide the number of files associated with the file system, wherein the number of files is determined based at least in part on the lineage index.

18. The method of claim 10, wherein the number of files is further determined based at least on excluding one or more of the multiple files ancillary to the user action.

19. A system comprising:
 a distributed file server comprising a plurality of file server virtual machines (FSVMs); and
 an analytics system, the analytics system configured to:
  generate a lineage index configured to store a lineage between multiple files corresponding to a user action, including a first file requested in the user action and a temporary file generated at least in part responsive to the user action corresponding to the first file, wherein the generating further includes establishing a lineage between the first file and the temporary file;
  access the lineage index comprising a set of events from a file system pertaining to the multiple files including the first file and the temporary file;
  filter the set of events to retain selected events corresponding to the user action and remove at least one event ancillary to the user action; and
  report based at least on the selected events, wherein the reporting comprises providing a number of files associated with the file system, the number of files determined by excluding at least the temporary file based at least on the lineage index.

20. The system of claim 19, wherein the analytics system is configured to generate the lineage index based at least in part on storing an association between the first file requested in the user action and the temporary file generated at least in part by renaming the first file, the multiple files comprising the first file and the temporary file.

21. The system of claim 19, wherein the analytics system is configured to generate the lineage index based at least in part on storing an association between the temporary file generated responsive to the user action and a new file generated by renaming the temporary file, the multiple files comprising the temporary file and the new file.

22. The system of claim 19, wherein the analytics system is configured to filter the set of events to exclude events corresponding to application processing of the user action.

23. The system of claim 19, wherein the analytics system is configured to receive the set of events through an events pipeline from multiple file server virtual machines (FSVMs) hosting the file system.

24. The system of claim 19, wherein the analytics system is configured to generate the lineage index corresponding to the user action comprising a write to a file using an application, and wherein at least one of the multiple files comprises the file and another comprises the temporary file generated by the application responsive to the user action.

25. The system of claim 19, wherein the reporting is further based on the selected events including to provide a count of actions associated with the user, wherein the count of actions includes a count of the selected events.

26. The system of claim 19, the reporting is further based on the selected events including to provide the number of files associated with the file system, wherein the number of files is determined based at least in part on the lineage index.

27. The system of claim 19, wherein the reporting is further based on the selected events including to provide a number of files associated with the file system, wherein the number of files is determined by excluding one or more of the multiple files based at least on the lineage index.

28. The system of claim 19, wherein, plurality of file server virtual machines (FSVMs) is a cluster of FSVMs.

29. The system of claim 27, wherein the number of files is further determined based at least on excluding one or more multiple files ancillary to the user action.

\* \* \* \* \*